United States Patent
Imaoka

(10) Patent No.: US 12,554,188 B2
(45) Date of Patent: Feb. 17, 2026

(54) OPTICAL SYSTEM, IMAGING DEVICE, OPTICAL CONTACT SENSOR, AND IMAGE-PROJECTING DEVICE

(71) Applicant: Panasonic Intellectual Property Management Co., Ltd., Osaka (JP)

(72) Inventor: Takuya Imaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 307 days.

(21) Appl. No.: 18/545,433

(22) Filed: Dec. 19, 2023

(65) Prior Publication Data

US 2024/0126157 A1    Apr. 18, 2024

Related U.S. Application Data

(63) Continuation of application No. PCT/JP2022/001072, filed on Jan. 14, 2022.

(30) Foreign Application Priority Data

Jul. 9, 2021    (JP) .................. 2021-114029

(51) Int. Cl.
G03B 21/28    (2006.01)
G02B 13/00    (2006.01)
G02B 17/08    (2006.01)

(52) U.S. Cl.
CPC ......... *G03B 21/28* (2013.01); *G02B 13/0065* (2013.01); *G02B 17/0856* (2013.01)

(58) Field of Classification Search
CPC ........ G03B 21/28; G03B 21/00; G03B 17/17; G02B 13/0065; G02B 13/007;

(Continued)

(56) References Cited

U.S. PATENT DOCUMENTS 11,181,746 B2 *  11/2021  Hua ................... G02B 17/086
2006/0098294 A1   5/2006  Suzuki et al.

(Continued)

FOREIGN PATENT DOCUMENTS

| JP | 2020-194115 | 12/2020 |
|----|---|---|
| JP | 2021-117315 | 8/2021 |
| WO | 2019/012795 | 1/2019 |

OTHER PUBLICATIONS

Extended European Search Report issued Oct. 7, 2024 in European Patent Application No. 22837195.1.

(Continued)

*Primary Examiner* — William R Alexander
(74) *Attorney, Agent, or Firm* — Wenderoth, Lind & Ponack, L.L.P.

(57) ABSTRACT

An optical system includes lenses and a prism. The prism includes a first transmissive surface, a first reflective surface, a second reflective surface, and a second transmissive surface. A first rectangular region at a reduction conjugate point: has an imaging relationship in which the first rectangular region is conjugate to a second rectangular region at a magnification conjugate point; and does not intersect with an optical axis. When a space is divided into a first space and a second space, all principal rays passing through the first rectangular region pass through the first rectangular region, the first transmissive surface, and the first reflective surface in the first space, and pass through the second reflective surface and the second transmissive surface in the second space.

19 Claims, 24 Drawing Sheets

(58) Field of Classification Search
CPC .............. G02B 17/0856; G02B 17/086; G02B 2027/0123; G02B 27/0101
USPC ........................................................ 359/629
See application file for complete search history.

(56) References Cited

U.S. PATENT DOCUMENTS

| | | |
|---|---|---|
| 2006/0132723 A1 | 6/2006 | Yamagishi |
| 2012/0162549 A1* | 6/2012 | Gao ........................ G02B 6/003 359/651 |
| 2012/0249978 A1 | 10/2012 | Morikuni |
| 2016/0154245 A1* | 6/2016 | Gao ..................... G02B 27/283 359/630 |
| 2019/0243113 A1 | 8/2019 | Trouboul |
| 2020/0142291 A1 | 5/2020 | Nishikawa |
| 2021/0231932 A1* | 7/2021 | Morikuni ........... G02B 17/0856 |
| 2021/0232034 A1 | 7/2021 | Morikuni |
| 2021/0255464 A1* | 8/2021 | Hua .................. G02B 27/0093 |
| 2022/0082805 A1 | 3/2022 | Uchida et al. |
| 2023/0288685 A1* | 9/2023 | Uchida .............. G02B 17/0856 |

OTHER PUBLICATIONS

International Search Report issued Apr. 5, 2022 in International (PCT) Application No. PCT/JP2022/001072.

* cited by examiner

OPTICAL SYSTEM, IMAGING DEVICE, OPTICAL CONTACT SENSOR, AND IMAGE-PROJECTING DEVICE

CROSS REFERENCE TO RELATED APPLICATIONS

This is a continuation application of PCT International Application No. PCT/JP2022/001072 filed on Jan. 14, 2022, designating the United States of America, which is based on and claims priority of Japanese Patent Application No. 2021-114029 filed on Jul. 9, 2021. The entire disclosures of the above-identified applications, including the specifications, drawings and claims are incorporated herein by reference in their entirety.

FIELD

The present disclosure relates to an optical system, an imaging device, an optical contact sensor, and an image-projecting device.

BACKGROUND

Patent Literature (PTL) 1 discloses an optical system that enables projection or image capturing with a short focal length and a large screen using a small prism.

CITATION LIST

Patent Literature

PTL 1: Japanese Unexamined Patent Application Publication No. 2020-194115

SUMMARY

Technical Problem

The present disclosure provides a small-size or low-profile optical system and provides an imaging device, an optical contact sensor, and an image-projecting device that include the optical system.

Solution to Problem

An optical system according to one aspect of the present disclosure is an optical system that includes a reduction conjugate point on a reduction side and a magnification conjugate point on a magnification side, and includes: a plurality of lenses; and a prism provided on the magnification side with respect to the plurality of lenses. The prism includes: a first transmissive surface; a first reflective surface; a second reflective surface; and a second transmissive surface provided on the reduction side with respect to the first transmissive surface. A first rectangular region at the reduction conjugate point: has an imaging relationship in which the first rectangular region is conjugate to a second rectangular region at the magnification conjugate point; and does not intersect with an optical axis that passes through centers of a largest number of lenses among the plurality of lenses. When a space in which the optical system is disposed is divided into a first space and a second space by using, as a boundary, a first plane that is a virtual plane perpendicular to the first rectangular region and passing through the optical axis and is a virtual plane parallel to a first side whose shortest distance to the optical axis is shortest among four sides of the first rectangular region, all principal rays passing through the first rectangular region pass through the first rectangular region, the first transmissive surface, and the first reflective surface in the first space, and pass through the second reflective surface and the second transmissive surface in the second space. When the space is divided into a third space and a fourth space by using, as a boundary, a second plane that is a virtual plane passing through the optical axis and perpendicular to the first plane, all principal rays passing through the first rectangular region pass through the second rectangular region and the first transmissive surface in the third space.

An imaging device according to one aspect of the present disclosure includes: the optical system according to the one aspect described above; and an imaging sensor that receives light passing through the optical system.

An optical contact sensor according to one aspect of the present disclosure includes: the imaging device according to the one aspect described above; and a light source that emits light toward the second rectangular region, wherein the optical contact sensor detects contact with the second rectangular region.

An image-projecting device according to one aspect of the present disclosure includes: the optical system according the one aspect described above; and an image forming element that projects an image on a screen via the optical system.

Advantageous Effects

According to the present disclosure, a small-size or low-profile optical system and so on can be provided.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Outline of the Present Disclosure

Figure 1:
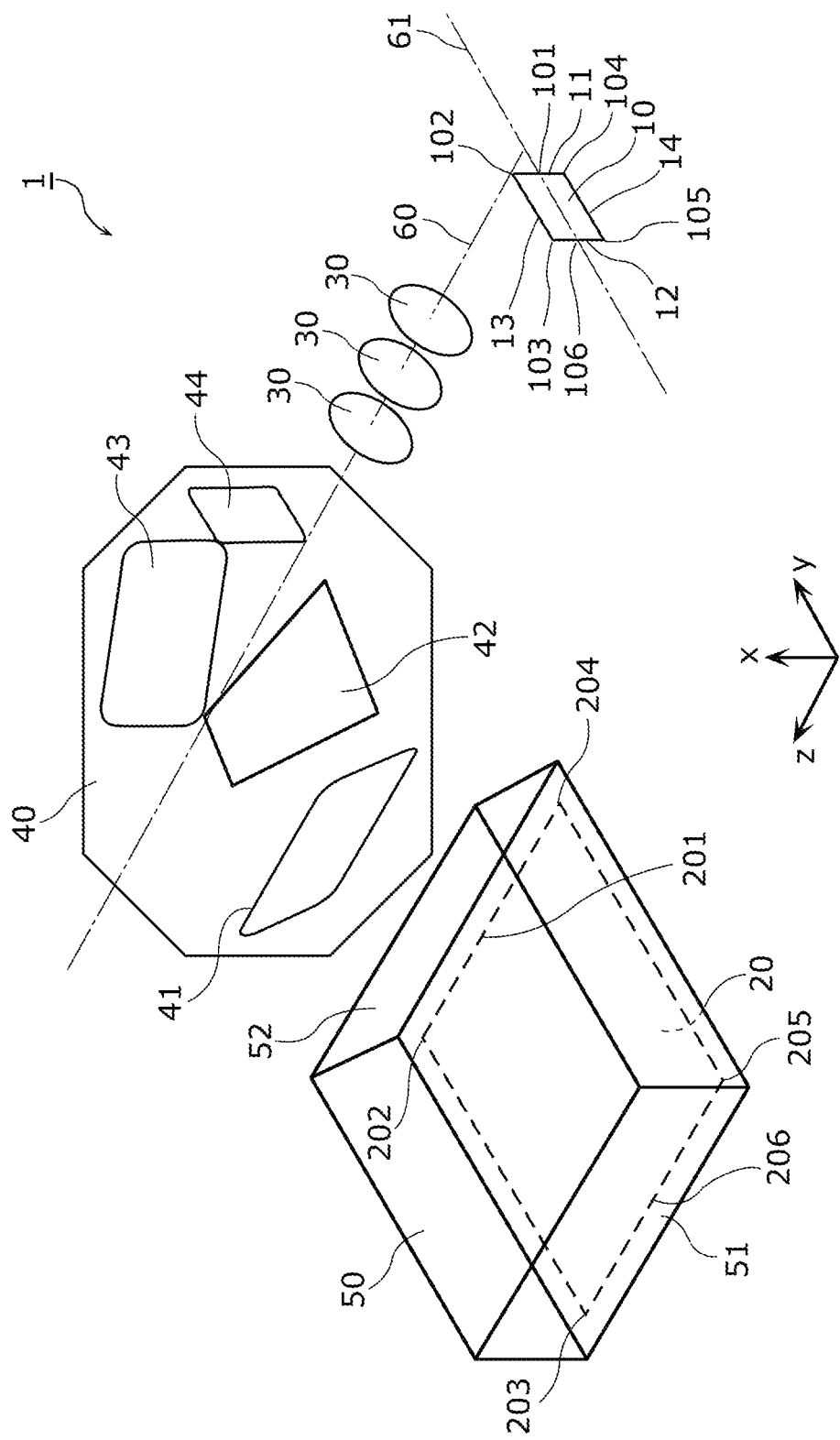
FIG. 1 is a schematic perspective view illustrating a configuration of an optical system according to an embodiment.

An optical system according to one aspect of the present disclosure is an optical system that includes a reduction conjugate point on a reduction side and a magnification conjugate point on a magnification side, and includes: a plurality of lenses; and a prism provided on the magnification side with respect to the plurality of lenses. The prism includes: a first transmissive surface in a shape of a free-form surface; a first reflective surface; a second reflective surface in a shape of a free-form surface; and a second transmissive surface in a shape of a free-form surface, the second transmissive surface being provided on the reduction side with respect to the first transmissive surface. A first rectangular region at the reduction conjugate point: has an imaging relationship in which the first rectangular region is conjugate to a second rectangular region at the magnification conjugate point; and does not intersect with an optical axis that passes through centers of a largest number of lenses among the plurality of lenses. When a space in which the optical system is disposed is divided into a first space and a second space by using, as a boundary, a first plane that is a virtual plane perpendicular to the first rectangular region and passing through the optical axis and is a virtual plane parallel to a first side whose shortest distance to the optical axis is shortest among four sides of the first rectangular region, all principal rays passing through the first rectangular region pass through the first rectangular region, the first transmissive surface, and the first reflective surface in the first space, and pass through the second reflective surface and the second transmissive surface in the second space. When the space is divided into a third space and a fourth space by using, as a boundary, a second plane that is a virtual plane passing through the optical axis and perpendicular to the first plane, all principal rays passing through the first rectangular region pass through the second rectangular region and the first transmissive surface in the third space.

Accordingly, since the prism including the reflective surface and the transmissive surfaces each being in a shape of a free-form surface is included, it is possible both to make the optical system wide-angle and to reduce the size of the optical system.

Furthermore, an optical system according to another aspect of the present disclosure is an optical system that includes a reduction conjugate point on a reduction side and a magnification conjugate point on a magnification side, and includes: a plurality of lenses; and a prism provided on the magnification side with respect to the plurality of lenses. A first rectangular region at the reduction conjugate point: has an imaging relationship in which the first rectangular region is conjugate to a second rectangular region at the magnification conjugate point; and does not intersect with an optical axis that passes through centers of a largest number of lenses among the plurality of lenses. The prism includes: a first reflective surface tilted at an angle greater than 40 degrees and less than 50 degrees with respect to a direction parallel to a first side whose shortest distance to the optical axis is shortest among four sides of the first rectangular region; and a second reflective surface having a positive power.

Accordingly, since the prism including the reflective surface tilted at an angle greater than 40 degrees and less than 50 degrees is included, it is possible both to make the optical system wide-angle and to reduce the size of the optical system.

Furthermore, for example, the prism further includes: a first transmissive surface in a shape of a free-form surface; and a second transmissive surface in a shape of a free-form surface, the second transmissive surface being provided on the reduction side with respect to the first transmissive surface. The optical system may cause a principal ray to pass through the first transmissive surface, the first reflective surface, the second reflective surface, and the second transmissive surface in stated order or reverse order.

Accordingly, since the prism includes the transmissive surfaces each being in a shape of a free-form surface, it is possible both to make the optical system wide-angle and to reduce the thickness of the optical system. For example, it is possible to provide a large region as the second rectangular region.

Furthermore, an optical system according to another aspect of the present disclosure is an optical system that includes a reduction conjugate point on a reduction side and a magnification conjugate point on a magnification side. A first rectangular region at the reduction conjugate point has an imaging relationship in which the first rectangular region is conjugate to a second rectangular region at the magnification conjugate point. The optical system causes a principal ray to pass through a transparent body that includes a first surface including the second rectangular region and a second surface, the principal ray passing through the first rectangular region, the second surface, and the second rectangular region in stated order or reverse order. The second surface may be a surface that is not parallel to the first surface. Furthermore, for example, the second surface may share one side with the first surface.

Accordingly, it is possible both to make the optical system wide-angle and to reduce the thickness of the optical system. When the optical system is used in an imaging device, reflection at the second plane can be reduced. For example, it is possible to reduce occurrence of a ghost image. Furthermore, the optical system is not located on the back side of the first surface of the transparent body. Therefore, when force caused by contact is applied to the first surface, application of strong stress to the optical system can be avoided.

Furthermore, for example, the optical system according to one aspect of the present disclosure may satisfy a condition (a) below:

$$\omega i < \omega o \qquad (a)$$

where
- $\omega o$ denotes a maximum angle between a normal to the second rectangular region and a principal ray passing through the second rectangular region, and
- $\omega i$ denotes an angle between a normal to the second surface and the principal ray passing through the second rectangular region at the maximum angle when the principal ray passes through the second surface.

Accordingly, it is possible both to make the optical system wide-angle and to reduce the thickness of the optical system. When the optical system is used in an imaging device, reflection at the second plane can be reduced.

Furthermore, for example, the optical system according to one aspect of the present disclosure may include a plurality of lenses, wherein the first rectangular region may be a region that does not intersect with an optical axis that passes through centers of a largest number of lenses among the plurality of lenses.

Accordingly, it is possible to inhibit the second rectangular region and the optical system from overlapping when viewed from a normal direction of the second rectangular region. This means that the optical system is not located on the back side of the first surface of the transparent body. Therefore, when force caused by contact is applied to the first surface, application of stress to the optical system can be avoided.

Furthermore, for example, the optical system according to one aspect of the present disclosure may include the transparent body, wherein, when a line segment connecting a center of a first side whose shortest distance to the optical axis is shortest among four sides of the first rectangular region and a center of a second side parallel to the first side is determined as a center line, the optical system may satisfy a condition (b) below:

$$0.1 < H1o/H1i \times Vi/Vo < 0.4 \qquad (b)$$

where
- H1i denotes a distance connecting, on the second surface, two points through which principal rays forming images at two ends of the first side pass,
- Vi denotes a distance connecting, on the second surface, two points through which principal rays forming images at two ends of the center line pass,
- H1o denotes a distance connecting, on the first surface, two points through which principal rays forming images at two ends of the first side pass, and
- Vo denotes a distance connecting, on the first surface, two points through which principal rays forming images at two ends of the center line pass.

Accordingly, it is possible to provide a large region as the second rectangular region. When the optical system is used in an imaging device, it is possible to take out light having a sufficient amount of light from the back of the transparent body.

Furthermore, for example, the optical system according to one aspect of the present disclosure may include: the transparent body, wherein, when a side whose shortest distance to the optical axis is shortest among four sides of the first rectangular region is determined as a first side, and a side parallel to the first side is determined as a second side, the optical system may satisfy a condition (c) below:

$$0.1 < H1o/H1i \times H2i/H2o < 0.4 \qquad (c)$$

where
- H1i denotes a distance connecting, on the second surface, two points through which principal rays forming images at two ends of the first side pass,
- H2i denotes a distance connecting, on the second surface, two points through which principal rays forming images at two ends of the second side pass,
- H1o denotes a distance connecting, on the first surface, two points through which principal rays forming images at two ends of the first side pass, and
- H2o denotes a distance connecting, on the first surface, two points through which principal rays forming images at two ends of the second side pass.

Accordingly, it is possible to provide a large region as the second rectangular region. When the optical system is used in an imaging device, it is possible to take out light having a sufficient amount of light from the back of the transparent body.

Furthermore, for example, the optical system according to one aspect of the present disclosure may include a prism provided on the magnification side with respect to the plurality of lenses. The prism includes: a first transmissive surface in a shape of a free-form surface; a first reflective surface; a second reflective surface having a positive power; and a second transmissive surface in a shape of a free-form surface, the second transmissive surface being provided on the reduction side with respect to the first transmissive surface. The optical system causes a principal ray to pass through the first transmissive surface, the first reflective surface, the second reflective surface, and the second transmissive surface in stated order or reverse order.

Accordingly, since the prism including the transmissive surface being in a shape of a free-form surface and the reflective surface having a positive power is included, it is possible both to make the optical system wide-angle and to reduce the thickness of the optical system. For example, it is possible to provide a large region as the second rectangular region.

Furthermore, for example, the first transmissive surface may cause a principal ray passing through a first point to diverge in a direction parallel to the optical axis and converge in a direction perpendicular to the optical axis, the first point being a point located closest to the optical axis among points on the first side whose shortest distance to the optical axis is shortest among the four sides of the first rectangular region.

Accordingly, it is possible to achieve reduction in the profile of the optical system while reducing distortion.

Furthermore, for example, the second transmissive surface may cause a principal ray passing through a first point to diverge in a direction parallel to the first side and converge in a direction perpendicular to the first side, the first point being a point located closest to the optical axis among points on the first side whose shortest distance to the optical axis is shortest among the four sides of the first rectangular region.

Accordingly, it is possible to achieve reduction in the profile of the optical system while reducing distortion.

Furthermore, for example, an effect, brought about by the second reflective surface, of converging a principal ray passing through a first point may be greater in a direction parallel to the first side than in a direction perpendicular to the first side, the first point being a point located closest to the optical axis among points on the first side whose shortest distance to the optical axis is shortest among the four sides of the first rectangular region.

Accordingly, it is possible to achieve reduction in the profile of the optical system.

Furthermore, for example, the optical system according to one aspect of the present disclosure may have an intermediate imaging position conjugate to each of the reduction conjugate point and the magnification conjugate point, and the intermediate imaging position may be located between the second reflective surface and the second transmissive surface.

Accordingly, a working distance can be shortened.

Furthermore, for example, when (i) among points on the first side, a point located farthest from the second rectangular region is determined as a second point, (ii) among the points on the first side, a point located closest to the second rectangular region is determined as a fourth point, (iii) among points on a second side that is parallel to the first side among the four sides of the first rectangular region, a point located farthest from the second rectangular region is determined as a third point, and (iv) among the points on the second side, a point located closest to the second rectangular region is determined as a fifth point, the optical system according to one aspect of the present disclosure may satisfy a condition (d) below:

$$i1 < i2 < i3 < i4 \quad (d)$$

where
  i1 denotes an incident angle at which a principal ray passing through the second point is incident on the first reflective surface,
  i2 denotes an incident angle at which a principal ray passing through the third point is incident on the first reflective surface,
  i3 denotes an incident angle at which a principal ray passing through the fourth point is incident on the first reflective surface, and
  i4 denotes an incident angle at which a principal ray passing through the fifth point is incident on the first reflective surface.

Accordingly, it is possible to achieve reduction in the profile and the size of the optical system.

Furthermore, for example, the incident angle at which the principal ray passing through the fifth point is incident on the first reflective surface may be greater than 65 degrees and less than 85 degrees.

Accordingly, when incident angle i4 is less than 85 degrees, it is possible to decrease sensitivity to a shape error in the first reflective surface, thus increasing ease of manufacturing. When incident angle i4 is greater than 65 degrees, it is possible to achieve reduction in the size of the prism.

Furthermore, for example, the optical system according to one aspect of the present disclosure may include a transparent body that includes a first surface including the second rectangular region and a second surface. The optical system may cause a principal ray to pass through the transparent body, the principal ray passing through the first rectangular region, the second surface, and the second rectangular region in stated order or reverse order.

Accordingly, when the optical system is used in an imaging device, it is possible to image, for example, an object that is in contact with the second surface of the transparent body. In other words, the imaging device can be used as an optical contact sensor.

Furthermore, for example, the transparent body may include: a first medium including the first surface; and a second medium including the second surface and being smaller than the first medium, the second medium being in a shape of a plate. The second surface may be in contact with air, and the second medium includes a surface opposed to the second surface, and the surface opposed to the second surface may be in contact with a surface different from the first surface of the first medium.

Accordingly, it is possible to select an optimal material for a function of each surface of the transparent body.

Furthermore, for example, the optical system according to one aspect of the present disclosure may satisfy a condition (e) below:

$$n1 < n2 \quad (e)$$

where
  n1 denotes a refractive index of the first medium, and
  n2 denotes a refractive index of the second medium.

Accordingly, curvature of field can be kept small.

Furthermore, for example, refractive index n2 of the second medium may be greater than 1.45.

Accordingly, curvature of field can be kept small.

Furthermore, for example, refractive index n1 of the first medium may be greater than 1.3 and less than 1.5.

Accordingly, when refractive index n1 is greater than 1.3, it is possible to reduce a loss by reflection at an interface between the first medium and the second medium. When refractive index n1 is less than 1.5, it is possible to provide a large angle of view.

Furthermore, for example, the optical system according to one aspect of the present disclosure may satisfy a condition (f) below:

$$E1 < E2 \quad (f)$$

where
  E1 denotes a Young's modulus of the first medium, and
  E2 denotes a Young's modulus of the second medium.

Accordingly, it is possible to reduce deformation of the second medium caused by deformation of the first medium by contact with the first surface. When the optical system is used in an imaging device, a shape for emitting light at the second surface does not change. Therefore, it is possible to image a change in a shape of the first surface.

Furthermore, for example, the Young's modulus of the second medium may be greater than 400 MPa and less than 200000 MPa.

Accordingly, when the optical system is used in an imaging device, a shape for emitting light at the second surface does not change. Therefore, it is possible to image a change in a shape of the first surface.

Furthermore, for example, the Young's modulus of the first medium may be greater than 0.01 MPa and less than 3 MPa.

Accordingly, it is possible to easily change the shape of the first surface. Accordingly, when the optical system is used in an imaging device, it is possible to image a change in the shape of the first surface.

Furthermore, for example, when (i) among points on a first side whose shortest distance to the optical axis is shortest among four sides of the first rectangular region, a point located closest to the optical axis is determined as a first point, and (ii) among points on a second side that is parallel to the first side among the four sides of the first rectangular region, a point located closest to the optical axis is determined as a sixth point, the optical system according to one aspect of the present disclosure may satisfy a condition (g) below:

$$5 < Lb/La < 15 \tag{g}$$

where
- La denotes an optical path length, in the transparent body, of a principal ray passing through the first point, and
- Lb denotes an optical path length, in the transparent body, of a principal ray passing through the sixth point.

Accordingly, it is possible to achieve reduction in the thickness of the transparent body while increasing the second rectangular region.

Furthermore, for example, when a principal ray passing through the second rectangular region at a maximum angle with respect to a normal to the second rectangular region passes through the second surface, an angle between the principal ray and a normal to the second surface may be less than 30 degrees.

Accordingly, it is possible to reduce reflection at the second plane.

Furthermore, for example, an angle between a plane including the second surface and a plane including the first surface may be greater than 45 degrees and less than 85 degrees.

Accordingly, when the optical system is used in an imaging device, it is possible to decrease an emission angle of light from the second surface.

Furthermore, for example, a maximum angle of a principal ray passing through the second rectangular region may be greater than 65 degrees.

Accordingly, it is possible to achieve the reduction in the profile of the optical system while increasing the second rectangular region.

Furthermore, for example, the optical system according to one aspect of the present disclosure may satisfy a condition (h) below:

$$L1 < L2 \tag{h}$$

where
- L1 denotes a length of the first side whose shortest distance to the optical axis is shortest among the four sides of the first rectangular region, and
- L2 denotes a length of a third side orthogonal to the first side among the four sides of the first rectangular region.

Accordingly, it is possible to make the second rectangular region elongated.

Furthermore, for example, the optical system according to one aspect of the present disclosure may satisfy a condition (i) below:

$$0.1 < d/D < 0.3 \tag{i}$$

where
- d denotes a shortest distance between the optical axis and the first side whose shortest distance to the optical axis is shortest among the four sides of the first rectangular region, and
- D denotes a length of a third side orthogonal to the first side among the four sides of the first rectangular region.

Accordingly, it is possible to achieve the reduction in the size of the optical system. When the optical system is used in an imaging device, it is possible to inhibit an emission angle from the second rectangular region from being excessively large and to inhibit a decrease in an amount of light. In addition, it is possible to avoid overlap between the prism and the second rectangular region when viewed from a normal direction of the second rectangular region.

Furthermore, for example, when (i) among points on the first side whose shortest distance to the optical axis is shortest among the four sides of the first rectangular region, a point located closest to the optical axis is determined as a first point, and (ii) a point included in the second rectangular region and having an imaging relationship with the first point is determined as a seventh point, the optical system according to one aspect of the present disclosure may satisfy conditions (j1) and (j2) below:

$$5 < X/d < 20 \tag{j1}$$

$$5 < Y/d < 20 \tag{j2}$$

where
- d denotes a shortest distance between the optical axis and the first side whose shortest distance to the optical axis is shortest among the four sides of the first rectangular region,
- X denotes a distance between the first point and the seventh point in a direction parallel to the first side, and
- Y denotes a distance between the first point and the seventh point in a direction orthogonal to each of the first side and the optical axis.

Accordingly, it is possible to achieve the reduction in the size of the optical system while providing a large region as the second rectangular region. For example, when X/d satisfies condition (j1), it is possible both to reduce the profile of the optical system and to inhibit a decrease in an amount of light in a circumferential region. In addition, when Y/d satisfies condition (j2), it is possible both to reduce the size of the optical system and to make the optical system wide-angle.

Furthermore, for example, the optical system according to one aspect of the present disclosure may satisfy a condition (j3) below:

$$10 < Z/d < 30 \tag{j3}$$

where
- Z denotes a distance between the first point and the seventh point in a direction parallel to the optical axis.

Accordingly, it is possible both to reduce the size of the optical system and to inhibit an increase in lateral chromatic aberration.

Furthermore, for example, when (i) among points on the first side whose shortest distance to the optical axis is shortest among the four sides of the first rectangular region, a point located closest to the optical axis is determined as a first point, and (ii) a point included in the second rectangular region and having an imaging relationship with the first point is determined as a seventh point, the optical system according to one aspect of the present disclosure may satisfy a condition (k) below:

$$0.1 < \theta o/\theta i < 0.3 \tag{k}$$

where

θi denotes a width of an incident angle or an emission angle that a principal ray passing through the first point forms in a plane that passes through the first side and is parallel to each of the first side and the optical axis, and θo denotes a width of an angle that a principal ray forms when passing through the seventh point, the principal ray being the principal ray that forms θi.

Accordingly, it is possible to achieve the reduction in the size of the optical system while making the second rectangular region large.

Furthermore, for example, among the plurality of lenses, a lens located closest to the first rectangular region have a D-cut on a side not including the optical axis in a direction perpendicular to the first side.

Accordingly, it is possible to achieve the reduction in the profile of the optical system.

Furthermore, for example, an angle between a plane including the second rectangular region and a plane including the first rectangular region may be greater than 85 degrees and less than 95 degrees.

Accordingly, it is possible to achieve the reduction in the profile of the optical system.

Furthermore, an imaging device according to one aspect of the present disclosure includes: the optical system according to the one aspect described above; and an imaging sensor that receives light passing through the optical system.

Accordingly, it is possible to provide the same advantageous effect as with the optical system described above.

Furthermore, an optical contact sensor according to one aspect of the present disclosure includes: the imaging device according to the one aspect described above; and a light source that emits light toward the second rectangular region, wherein the optical contact sensor detects contact with the second rectangular region.

Accordingly, it is possible to provide the same advantageous effect as with the optical system described above.

Furthermore, an image-projecting device according to one aspect of the present disclosure includes: the optical system according to the one aspect described above; and an image forming element that projects an image on a screen via the optical system.

Accordingly, it is possible to provide the same advantageous effect as with the optical system described above.

Hereinafter, embodiments will be specifically described with reference to the drawings.

Is should be noted that the following embodiments each illustrate a general or specific example. The numerical values, shapes, materials, constituent elements, the arrangement and connection of the constituent elements, steps, the processing order of the steps etc. illustrated in the following embodiments are mere examples, and are not intended to limit the present disclosure. Among the constituent elements in the following embodiments, those not recited in any of the independent claims will be described as optional constituent elements.

Furthermore, the drawings are represented schematically and are not necessarily precise illustrations. Therefore, the scales, for example, are not necessarily consistent from drawing to drawing. Constituent elements that are substantially the same are given the same reference signs in the drawings, and redundant descriptions will be omitted or simplified.

In the present specification, terms indicating a relationship between elements, such as "parallel" and "perpendicular," terms indicating shapes of elements, such as "rectangular," and numerical value ranges do not express the strict meanings only, but also include substantially equivalent ranges, e.g., differences of several percent, as well.

In the present specification and drawings, the x-axis, the y-axis, and the z-axis indicate three axes of a three-dimensional Cartesian coordinate system. In the embodiments, the x-axis and the y-axis are parallel to two orthogonal sides of the first rectangular region. The z-axis direction is a normal direction of the first rectangular region.

The x-axis direction is the height direction of the optical system. That is, in the present specification, the phrase "reducing the profile" means shortening the height in the x-axis direction. In the present specification, the phrase "reducing the size" means shortening the length in the direction along at least one of the x-axis, the y-axis, and the z-axis.

In the present specification, the phrase "a ray passes through a surface" means that the ray is incident on the surface and is reflected by or penetrates the surface. That is, the phrase "a ray passes through a reflective surface" means that the ray is incident on the reflective surface and is reflected by the reflective surface. The reflection is mirror reflection on a microscopic surface. The phrase "a ray passes through a transmissive surface" means that the ray is incident on the transmissive surface and penetrates the transmissive surface. When penetrating the transmissive surface, the ray is refracted in accordance with a difference in refractive index.

In the present specification, ordinal numerals such as "first" and "second" do not mean the number or ranks of constituent elements but are used for distinction, avoiding confusion among constituent elements of the same type unless otherwise particularly stated.

Embodiment

Outline

First, an outline of an optical system according to an embodiment will be described with reference to FIG. 1. FIG. 1 is a schematic perspective view illustrating a configuration of optical system 1 according to the present embodiment.

Optical system illustrated in FIG. 1 includes a reduction conjugate point on a reduction side and a magnification conjugate point on a magnification side. The reduction conjugate point is an imaging position on the reduction side of optical system 1 and is defined as first rectangular region 10. The magnification conjugate point is an imaging position on the magnification side of optical system 1 and is defined as second rectangular region 20. First rectangular region 10 has an imaging relationship in which first rectangular region 10 is conjugate to second rectangular region 20. It should be noted that second rectangular region 20 may become an imperfect rectangle due to distortion.

When optical system 1 is used in an imaging device, first rectangular region 10 serves as a region where an imaging surface is located, and second rectangular region 20 serves as a region where an object surface is located. When optical system 1 is used in an image-projecting device, first rectangular region 10 serves as an image-displaying region where an image to be projected is formed, and second rectangular region 20 serves as a region where a projection surface, such as a screen, is located. An optical relationship between first rectangular region 10 and second rectangular region 20 will be described later in detail.

The following description will be given mainly of the case where optical system 1 is used in an imaging device, as an example. In this case, optical system 1 guides light emitted from second rectangular region 20 on the magnification side to first rectangular region 10 on the reduction side. When optical system 1 is used in an image-projecting device, a traveling direction of the light is reversed. In addition, a relation between an incident angle and an emission angle (or a reflection angle) with respect to a predetermined surface is reversed.

As illustrated in FIG. 1, optical system 1 includes a plurality of lenses 30, prism 40, and transparent body 50. Lenses 30, prism 40, and transparent body 50 are disposed from the reduction side to the magnification side of optical system 1 in the stated order.

Each lens 30 has a predetermined lens curved surface on at least one of its reduction side or its magnification side. For example, each lens 30 is a double-convex lens, a plano-convex lens, a convex meniscus lens, a double-concave lens, a plano-concave lens, or a concave meniscus lens. The lens curved surface may be an aspheric lens having a free-form surface. Lenses 30 include a lens that has a rotationally symmetric shape.

Optical system 1 also includes an aperture stop that is not illustrated in FIG. 1. The aperture stop is disposed between lenses 30. The aperture stop is an optical member that defines a range within which a light beam passes through optical system 1. Rays that pass through a center of the aperture stop are principal rays.

Prism 40 is provided on a magnification side with respect to lenses 30. Prism 40 includes first transmissive surface 41, first reflective surface 42, second reflective surface 43, and second transmissive surface 44. In the present embodiment, each of first transmissive surface 41, second reflective surface 43, and second transmissive surface 44 is in a shape of a free-form surface. First reflective surface 42 is a flat surface.

Prism 40 is formed of a transparent medium such as glass or resin. First transmissive surface 41, first reflective surface 42, second reflective surface 43, and second transmissive surface 44 are each a part of an outer surface of prism 40. A specific configuration example of prism 40 will be described later.

Transparent body 50 includes first surface 51 and second surface 52, and first surface 51 includes second rectangular region 20. Second surface 52 is a plane through which principal rays passing through first surface 51 pass. First surface 51 and second surface 52 are flat surfaces. In the present embodiment, second surface 52 is not parallel to first surface 51. Specifically, second surface 52 shares one side with first surface 51. Second surface 52 is tilted at a predetermined angle with respect to first surface 51.

Transparent body 50 is formed of a transparent medium such as glass or resin. It should be noted that optical system 1 need not include transparent body 50.

FIG. 1 illustrates optical axis 60 and reference axis 61 that is orthogonal to optical axis 60. Optical axis 60 and reference axis 61 are each a virtual straight line extending in one direction. Optical axis 60 is an axis that passes through the centers of the largest number of lenses among the plurality of lenses 30. Reference axis 61 is an axis that is orthogonal to optical axis 60 and orthogonal to first side 11 whose shortest distance to optical axis 60 is the shortest among the four sides of first rectangular region 10.

Disposition of constituent elements of optical system 1 is determined based on a virtual plane that passes through optical axis 60 and/or reference axis 61. The disposition in optical system 1 will be described below with reference to FIG. 2 and FIG. 3.

Figure 2:
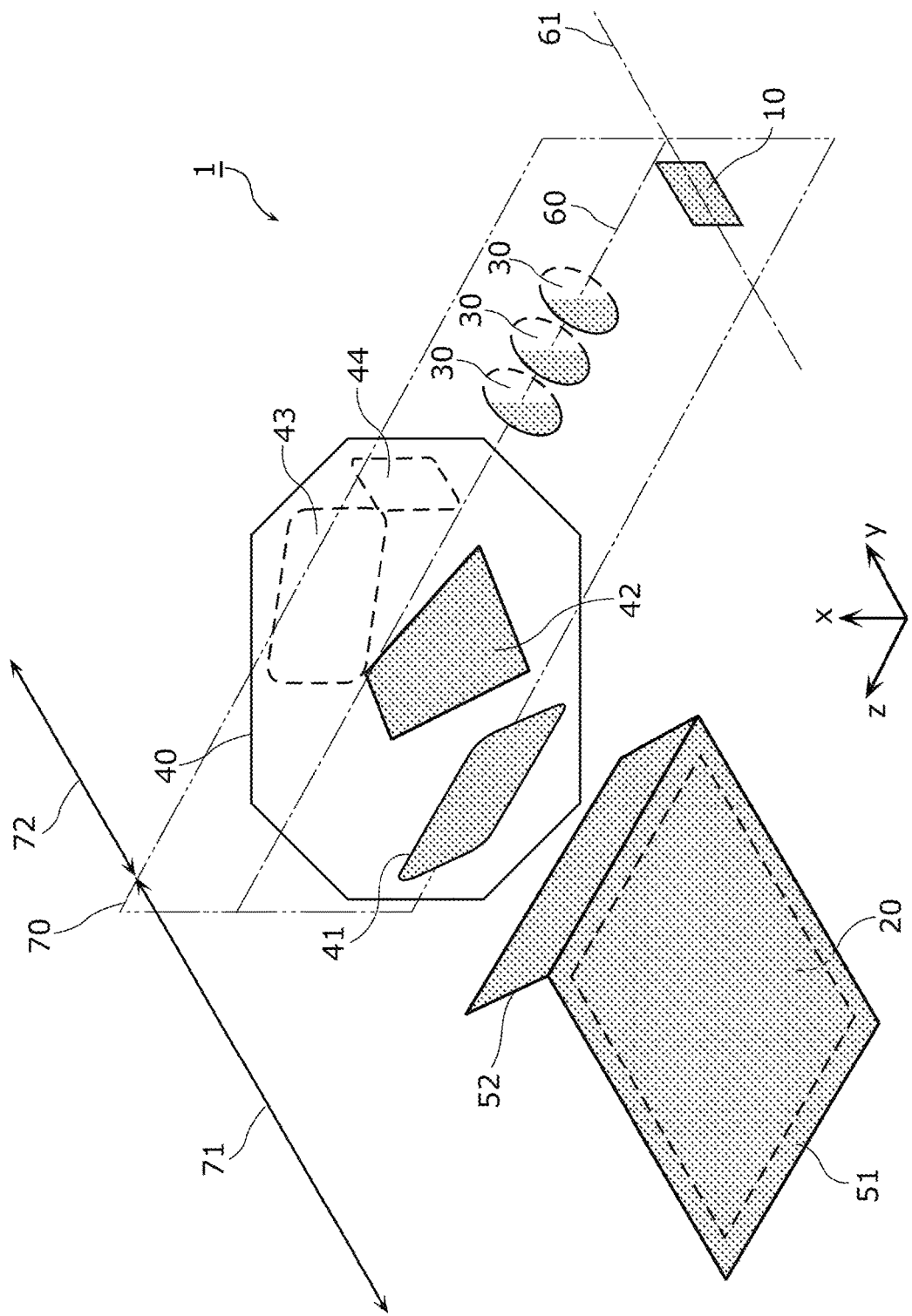
FIG. 2 is a schematic perspective view for describing, using a first plane, which is a virtual plane, the disposition in the optical system according to the embodiment.

FIG. 2 is a schematic perspective view for describing, using first plane 70, which is a virtual plane, the disposition in optical system 1 according to the present embodiment. First plane 70 illustrated in FIG. 2 is a virtual plane perpendicular to first rectangular region 10 and passing through optical axis 60, and is a virtual plane parallel to first side 11 of first rectangular region 10. First plane 70 is an xz plane.

As illustrated in FIG. 2, the space in which optical system 1 is disposed can be divided into first space 71 and second space 72 by using first plane 70 as the boundary. First space 71 is a space on a y-axis negative side, and second space 72 is a space on a y-axis positive side.

In the present embodiment, all principal rays passing through first rectangular region 10 pass through first rectangular region 10, first transmissive surface 41, and first reflective surface 42 in first space 71. In other words, the generally whole area of each of first rectangular region 10, first transmissive surface 41, and first reflective surface 42 is disposed substantially in first space 71.

Also, all principal rays passing through first rectangular region 10 pass through second reflective surface 43 and second transmissive surface 44 in second space 72. In other words, the generally whole area of each of second reflective surface 43 and second transmissive surface 44 is disposed substantially in second space 72.

In this manner, prism 40 is disposed in both first space 71 and second space 72. Likewise, lenses 30 are disposed in both first space 71 and second space 72. In transparent body 50, second rectangular region 20 and at least a portion of second surface 52 are disposed in first space 71. In FIG. 2, surfaces disposed in first space 71 are shaded. In addition, contours of surfaces disposed in second space 72 are drawn by broken lines (except a contour of second rectangular region 20).

Figure 3:
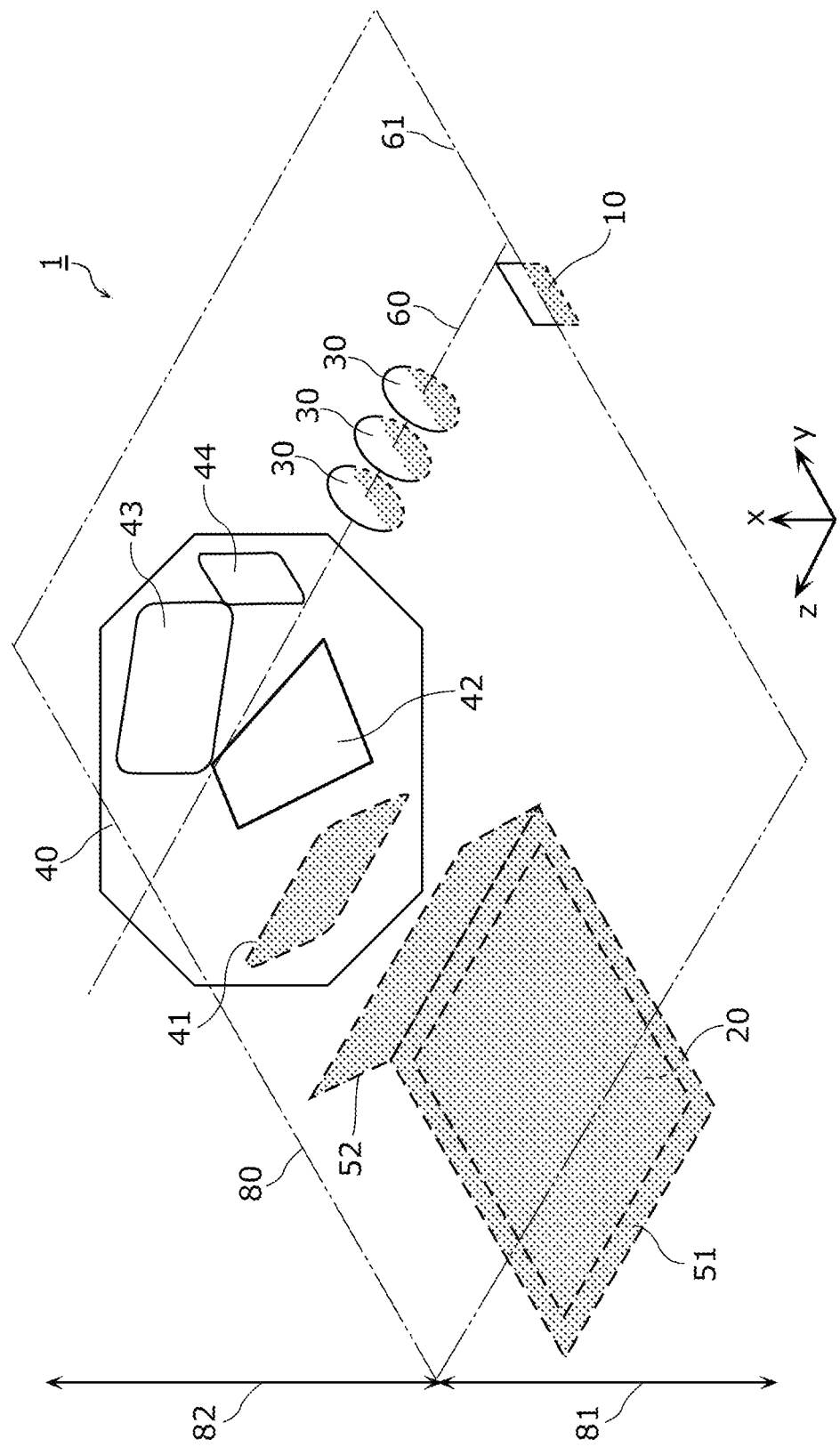
FIG. 3 is a schematic perspective view for describing, using a second plane, which is a virtual plane, the disposition in the optical system according to the embodiment.

FIG. 3 is a schematic perspective view for describing, using second plane 80, which is the virtual plane, the disposition in optical system 1 according to the present embodiment. Second plane 80 illustrated in FIG. 3 is a virtual plane that passes through optical axis 60 and is perpendicular to first plane 70. Second plane 80 includes optical axis 60 and reference axis 61. Second plane 80 is a yz plane.

As illustrated in FIG. 3, a space in which optical system 1 is disposed can be divided into third space 81 and fourth space 82 by using second plane 80 as a boundary. Third space 81 is a space on an x-axis negative side, and fourth space 82 is a space on an x-axis positive side.

In the present embodiment, all principal rays passing through first rectangular region 10 pass through second rectangular region 20 and first transmissive surface 41 in third space 81. In other words, the generally whole area of each of second rectangular region 20 and first transmissive surface 41 is disposed substantially in third space 81.

First reflective surface 42, second reflective surface 43, and second transmissive surface 44 are each disposed in only third space 81, only fourth space 82, or both third space 81 and fourth space 82. Lenses 30 and first rectangular region 10 are disposed in both third space 81 and fourth space 82. At least a portion of second surface 52 of transparent body 50 is disposed in third space 81. In FIG. 3, surfaces disposed in third space 81 are shaded, and contours of the surfaces are drawn by broken lines.

[First Rectangular Region and Second Rectangular Region]

Next, a correspondence relationship between first rectangular region 10 at the reduction conjugate point and second rectangular region 20 at the magnification conjugate point in optical system 1 will be described with reference to FIG. 4 and FIG. 5 while FIG. 1 is referred to as appropriate.

Figure 4:
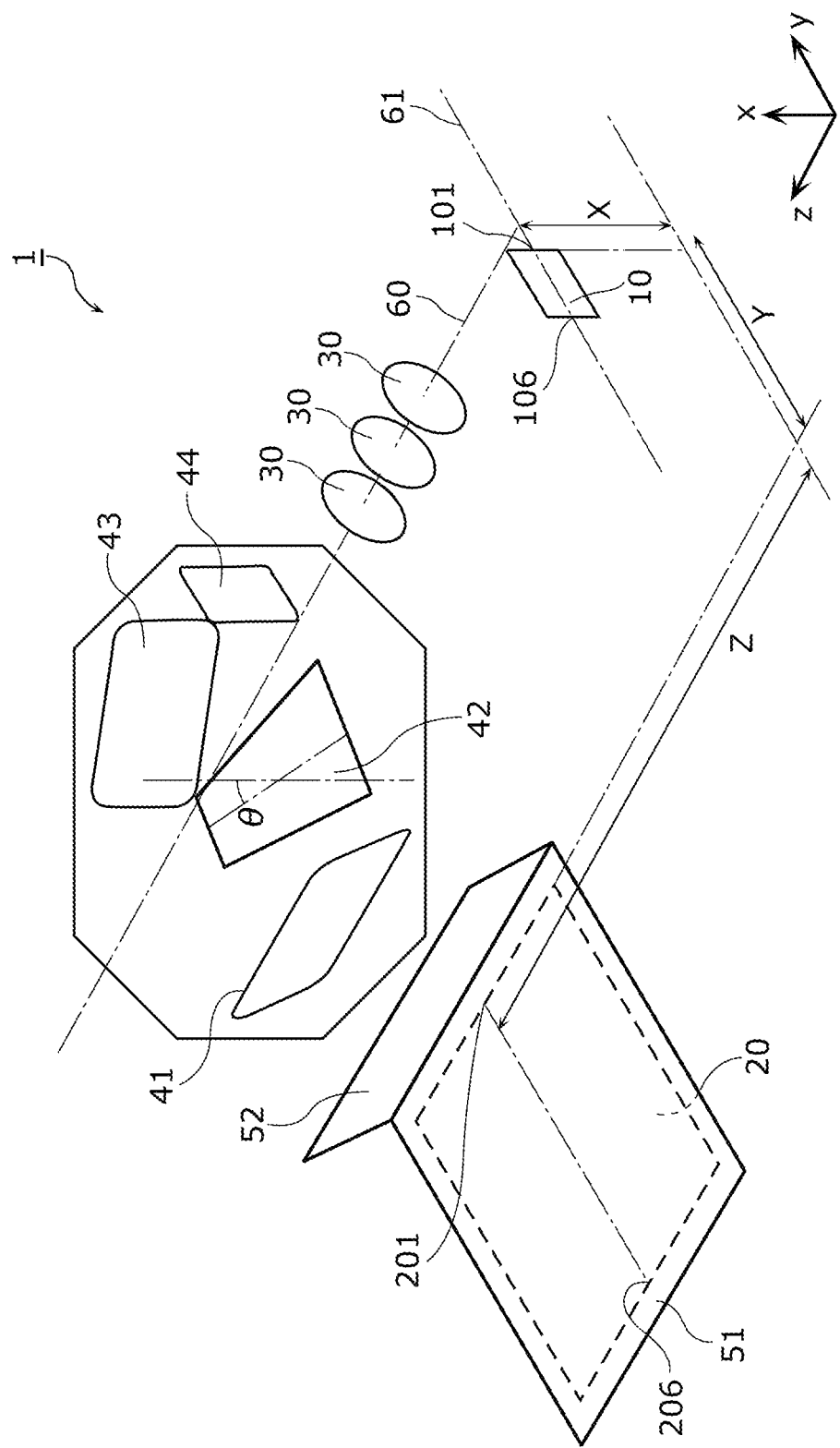
FIG. 4 is a schematic perspective view for describing a position relationship between a reduction conjugate point and a magnification conjugate point of the optical system according to the embodiment.

FIG. 4 is a schematic perspective view for describing a position relationship between the reduction conjugate point and the magnification conjugate point of optical system 1 according to the present embodiment. As illustrated in FIG. 4, first rectangular region 10 at the reduction conjugate point does not intersect with optical axis 60. That is, first rectangular region 10 is located at a position that is shifted from optical axis 60 in one direction by a predetermined distance.

First rectangular region 10 and second rectangular region 20 have an imaging relationship. For example, an aspect ratio of first rectangular region 10 and an aspect ratio of second rectangular region 20 are equal to each other. The aspect ratio of each rectangular region is a ratio of lengths of a short side and a long side of the rectangular region. Second rectangular region 20 on the magnification side has an area larger than an area of first rectangular region 10 on the reduction side. It should be noted that second rectangular region 20 may become an imperfect rectangle due to distortion.

An angle between a plane including second rectangular region 20 and a plane including first rectangular region 10 is greater than 85 degrees and less than 95 degrees. Specifically, second rectangular region 20 and first rectangular region 10 are perpendicular to each other. In the present embodiment, a plane formed by first rectangular region 10 is defined as an xy plane. In this case, second rectangular region 20 is parallel to the yz plane.

FIG. 4 illustrates seventh point 201 that is included in second rectangular region 20 and has an imaging relationship with first point 101 on first side 11 on first rectangular region 10. When optical system 1 is used in an imaging device, principal rays emitted from seventh point 201 pass through prism 40 and lenses 30, forming an image at first point 101.

Similarly, FIG. 1 illustrates second point 102, third point 103, fourth point 104, fifth point 105, sixth point 106 that are included in first rectangular region 10 and eighth point 202, ninth point 203, tenth point 204, eleventh point 205, and twelfth point 206 that are included in second rectangular region 20. Second point 102 and eighth point 202 have an imaging relationship. Third point 103 and ninth point 203 have an imaging relationship. Fourth point 104 and tenth point 204 have an imaging relationship. Fifth point 105 and eleventh point 205 have an imaging relationship. Sixth point 106 and twelfth point 206 have an imaging relationship.

Figure 5:
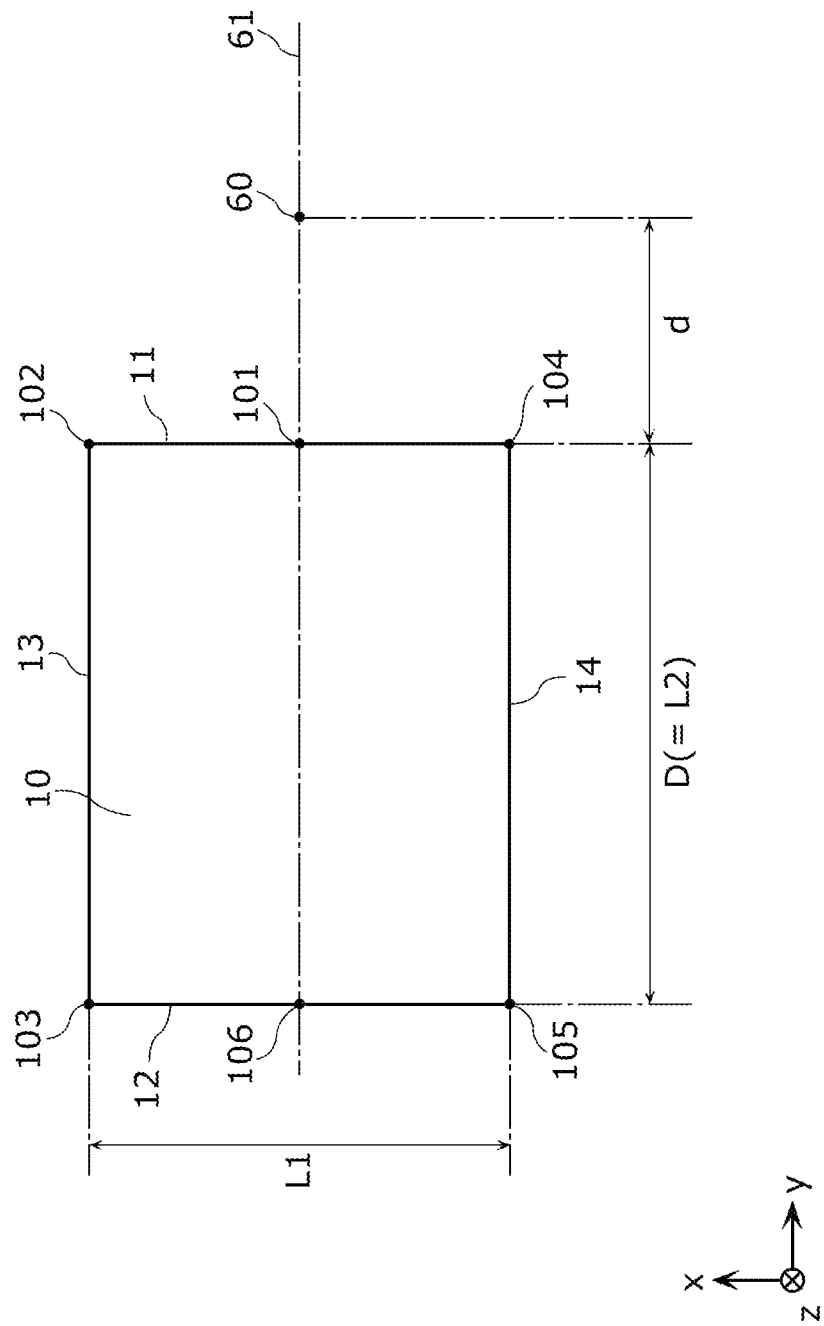
FIG. 5 is a plan view illustrating a first rectangular region at the reduction conjugate point of the optical system according to the embodiment.

FIG. 5 is a plan view illustrating first rectangular region 10 at the reduction conjugate point of optical system 1 according to the embodiment. As illustrated in FIG. 5, a shape of first rectangular region 10 in plan view is a rectangle that is long in the y-axis direction. First rectangular region 10 includes first side 11, second side 12, third side 13, and fourth side 14.

First side 11 is a side whose shortest distance to optical axis 60 is shortest among the four sides of first rectangular region 10. First point 101 illustrated in FIG. 5 is a point located closest to optical axis 60 among points on first side 11. That is, first point 101 is a foot of a perpendicular line from optical axis 60 to first side 11. For example, first point 101 is the midpoint of first side 11. On the xy plane, a straight line that connects first point 101 and optical axis 60 is reference axis 61.

Second side 12 is a side parallel to first side 11. Sixth point 106 illustrated in FIG. 5 is a point located closest to optical axis 60 among points on second side 12. For example, sixth point 106 is the midpoint of second side 12. Sixth point 106 is an intersection of second side 12 and reference axis 61.

Third side 13 is the farther of two sides orthogonal to first side 11 and second side 12 from second rectangular region 20. Fourth side 14 is the closer of two sides orthogonal to first side 11 and second side 12 to second rectangular region 20.

Second point 102 is a point located farthest from second rectangular region 20 among points on first side 11. Second point 102 is an endpoint of first side 11 and an intersection of first side 11 and third side 13.

Third point 103 is a point located farthest from second rectangular region 20 among points on second side 12. Third point 103 is an endpoint of second side 12 and an intersection of second side 12 and third side 13.

Fourth point 104 is a point located closest to second rectangular region 20 among points on first side 11. Fourth point 104 is an endpoint of first side 11 and an intersection of first side 11 and fourth side 14.

Fifth point 105 is a point located closest to second rectangular region 20 among points on second side 12. Fifth point 105 is an endpoint of second side 12 and an intersection of second side 12 and fourth side 14.

Here, as illustrated in FIG. 5, the length of first side 11 (=length of second side 12) is defined as L1. In addition, the length of third side 13 (=length of fourth side 14) is defined as L2 or D. In this case, the condition (h) below is satisfied.

$$L1<L2 \tag{h}$$

The aspect ratio of first rectangular region 10 is, for example, a ratio between L2 and L1. L2:L1 is, for example, but not particularly limited to, 3:2, 4:3, 16:9, or 256:135.

A shortest distance between first point 101 and optical axis 60 is defined as d. d corresponds to a decenter value of first rectangular region 10 from optical axis 60. In this case, shortest distance d is shorter than length D of a long side of first rectangular region 10. The condition (i) below is satisfied.

$$0.1<d/D<0.3 \tag{i}$$

When d/D is less than 0.3, it is possible to inhibit an increase in the size of optical system 1. If d/D is excessively high when optical system 1 is used in an imaging device, an emission angle from second rectangular region 20 is excessively large, which may decrease an amount of light. In the present embodiment, when d/D is less than 0.3, it is possible to inhibit a decrease in the amount of light. In addition, when d/D is greater than 0.1, it is possible to avoid overlap between prism 40 and second rectangular region 20 when viewed from a normal direction of second rectangular region 20.

A position relationship between first rectangular region 10 and second rectangular region 20 can be represented based on a position relationship between first point 101 illustrated in FIG. 4 and seventh point 201. Specifically, optical system 1 according to the present embodiment satisfies the conditions (j1) and (j2) below.

$$5<X/d<20 \tag{j1}$$

$$5<Y/d<20 \tag{j2}$$

Here, X is the distance between first point 101 and seventh point 201 in a direction parallel to first side 11 (i.e., the x-axis direction). Y is the distance between first point 101 and seventh point 201 in a direction orthogonal to each of first side 11 and optical axis 60 (i.e., the y-axis direction). Note that d is a decenter value indicated in FIG. 5.

When X/d is greater than 5, it is possible to inhibit a decrease in an amount of light in a circumferential region (e.g., on sides of the rectangular region). In addition, when X/d is less than 20, it is possible to reduce the profile of optical system 1. In addition, X/d may be preferably less than 15.

When Y/d is greater than 5, it is possible to widen an angle of view easily. When Y/d is less than 20, it is possible to reduce the size of optical system 1. In addition, Y/d may be preferably less than 15.

Optical system 1 further satisfies the condition (j3).

$$10 < Z/d < 30 \quad (j3)$$

Here, Z is the distance between first point 101 and seventh point 201 in a direction parallel to optical axis 60 (i.e., the z-axis direction).

When Z/d is greater than 10, it is possible to inhibit an increase in lateral chromatic aberration. When Z/d is less than 30, it is possible to reduce the size of optical system 1. In addition, Z/d may be preferably less than 25.

[Prism]

Next, a specific configuration of prism 40 will be described with reference to FIG. 6, FIG. 7, FIG. 8, and FIG. 9.

Figure 6:
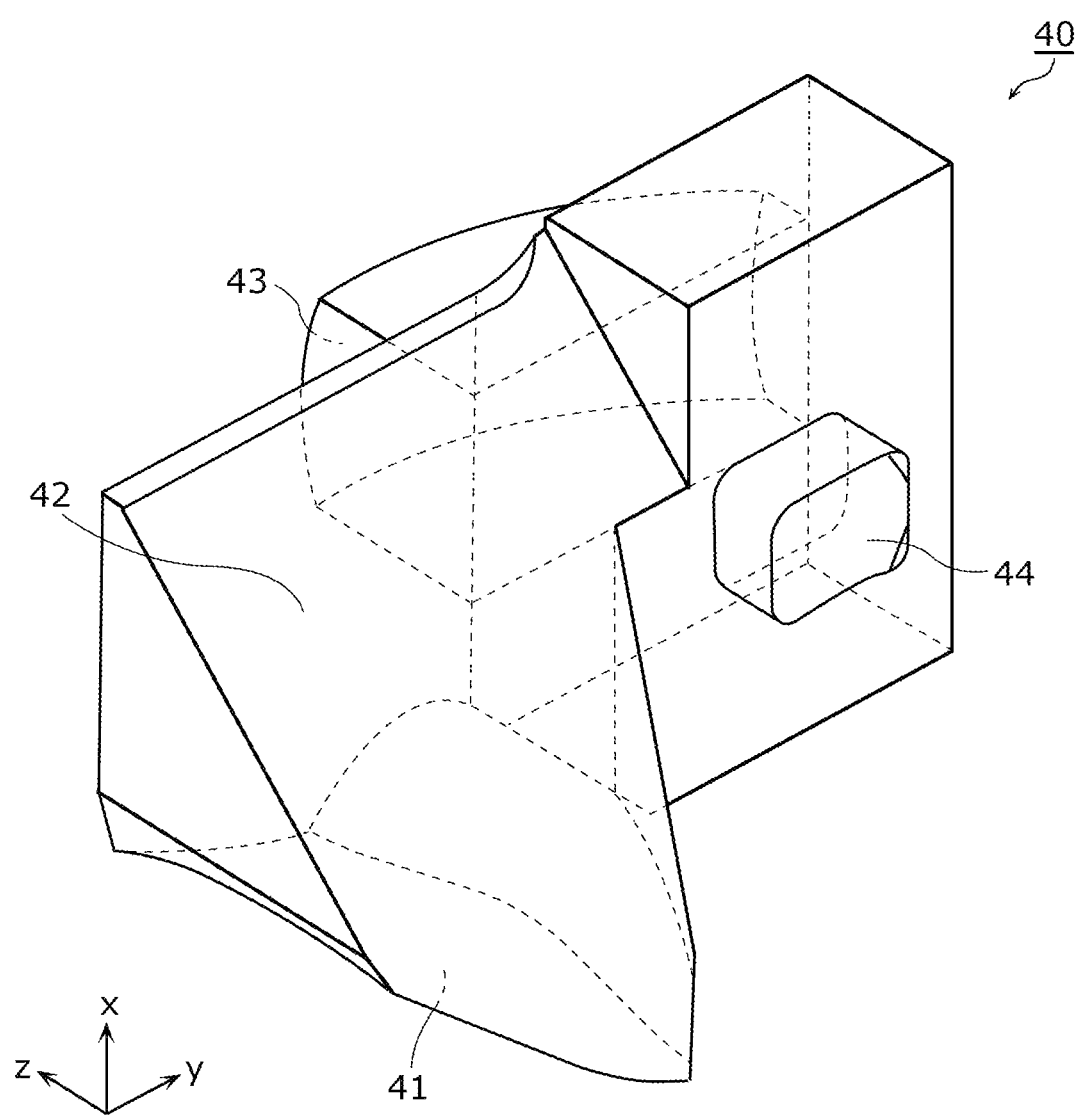
FIG. 6 is a perspective view illustrating an example of a prism included in the optical system according to the embodiment.
Figure 7:
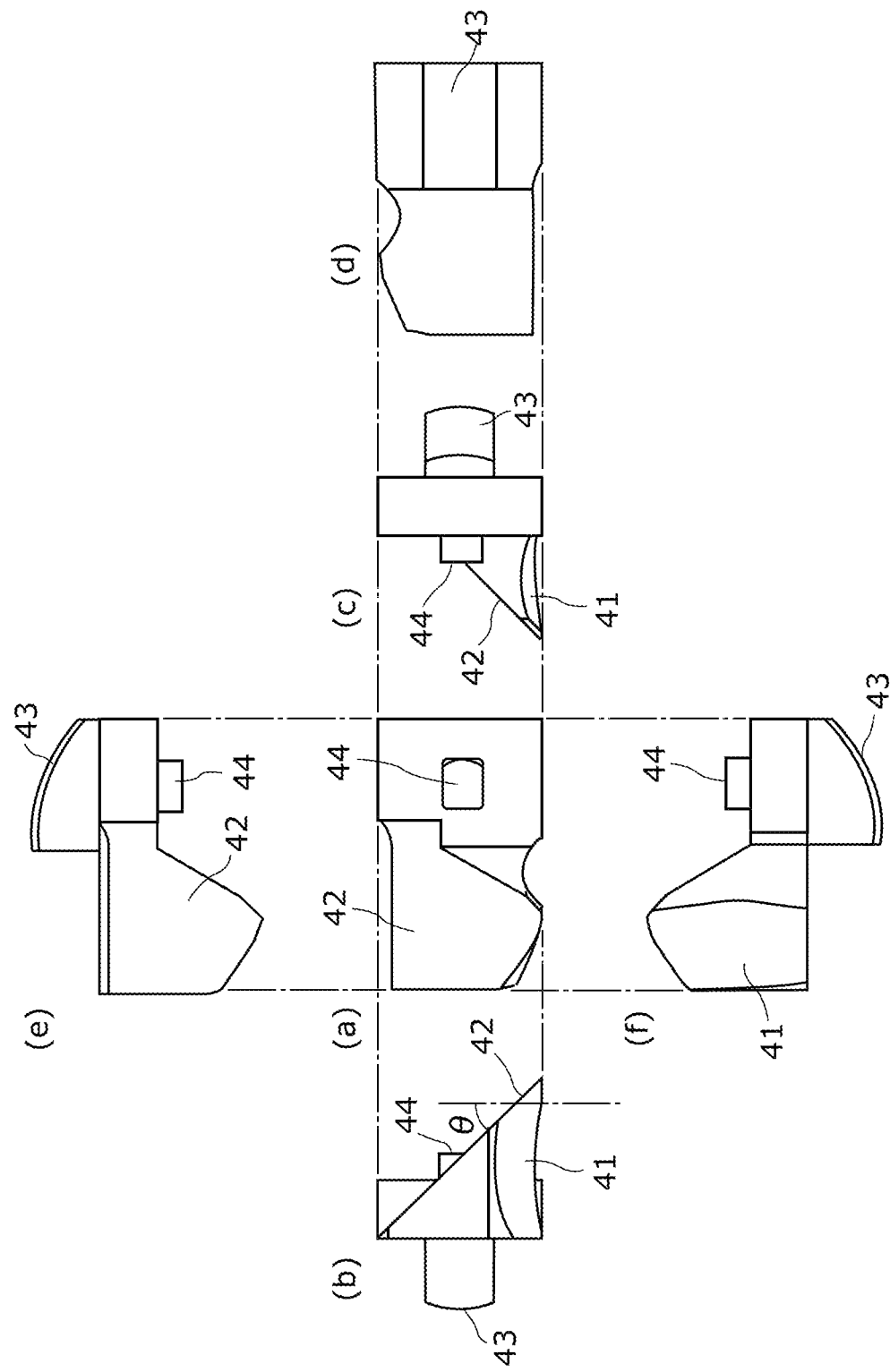
FIG. 7 is a six-view drawing of the prism illustrated in FIG. 6.

FIG. 6 is a perspective view illustrating an example of prism 40 included in optical system 1 according to the present embodiment. FIG. 7 is a six-view drawing of prism 40 illustrated in FIG. 6. Specifically, (a) is a front view, (b) is a left side view, (c) is a right side view, (d) is a rear view, (e) is a top view, and (f) is a bottom view. It should be noted that the front of prism 40 is here considered to be a view of prism 40 from a first rectangular region 10 side along optical axis 60. Specifically, a z-axis negative side of prism 40 is considered to be the front side of prism 40, the x-axis positive side is considered to be the upper side, the x-axis negative side is considered to be the lower side, the y-axis positive side is considered to be the right side, and the y-axis negative side is considered to be the left side.

Figure 8:
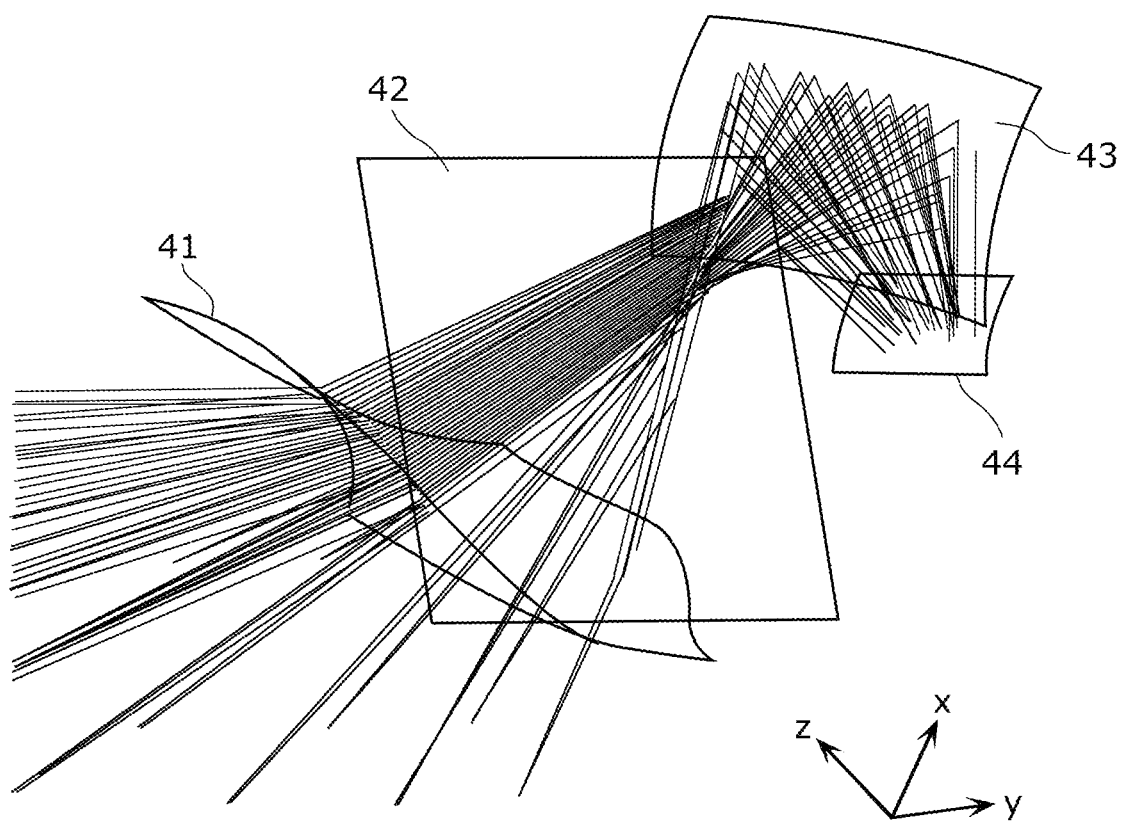
FIG. 8 is a schematic perspective view illustrating rays passing through the prism illustrated in FIG. 6.
Figure 9:
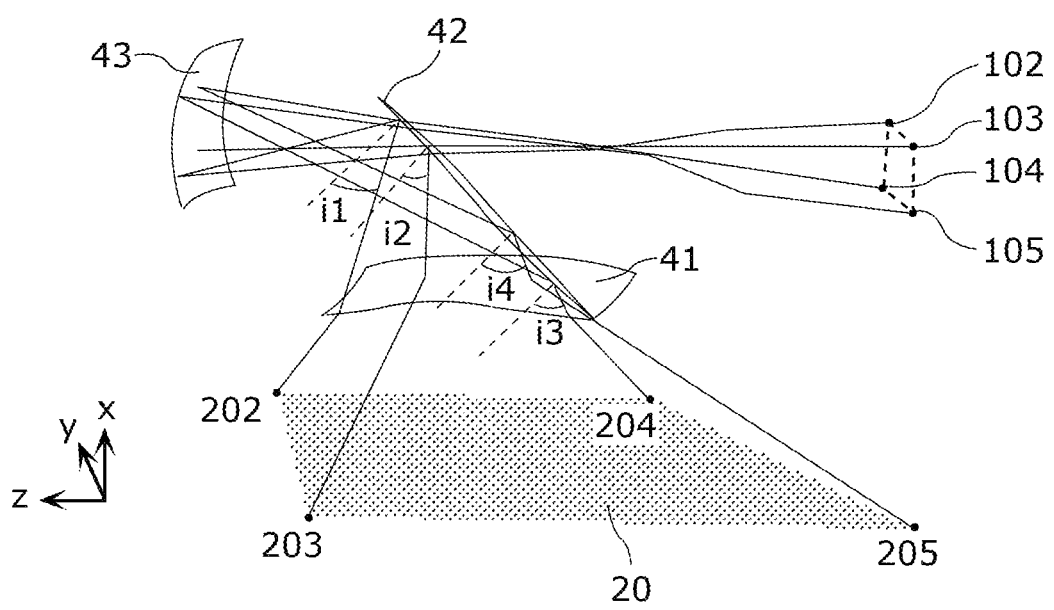
FIG. 9 is a schematic perspective view illustrating incident angles of light beams with respect to a first reflective surface of the prism illustrated in FIG. 6.

FIG. 8 is a schematic perspective view illustrating rays passing through prism 40 illustrated in FIG. 6. FIG. 9 is a schematic perspective view illustrating incident angles of light beams with respect to first reflective surface 42 of prism 40 illustrated in FIG. 6.

As described above, prism 40 includes first transmissive surface 41, first reflective surface 42, second reflective surface 43, and second transmissive surface 44. Specifically, portions of the outer surface of prism 40 function as first transmissive surface 41, first reflective surface 42, second reflective surface 43, and second transmissive surface 44.

In the present embodiment, as illustrated in FIG. 8 and FIG. 9, optical system 1 causes a principal ray to pass through first transmissive surface 41, first reflective surface 42, second reflective surface 43, and second transmissive surface 44 (not illustrated in FIG. 9) in the stated order or reverse order. When optical system 1 is used in an imaging device, a principal ray passes through first transmissive surface 41, first reflective surface 42, second reflective surface 43, and second transmissive surface 44 in this order. When optical system 1 is used in an image-projecting device, a principal ray passes through second transmissive surface 44, second reflective surface 43, first reflective surface 42, and first transmissive surface 41 in this order.

First transmissive surface 41 faces the x-axis negative side as illustrated in FIG. 6, and (b), (c), and (f) of FIG. 7. When optical system 1 is used in an imaging device, first transmissive surface 41 functions as an incident surface for the principal rays with respect to prism 40. When optical system 1 is used in an image-projecting device, first transmissive surface 41 functions as an emission surface for the principal rays from prism 40.

When optical system 1 is used in an imaging device, first transmissive surface 41 causes a principal ray passing through first point 101 to diverge in a direction parallel to optical axis 60 (i.e., the z-axis direction) and converge in a direction perpendicular to optical axis 60. Accordingly, it is possible to achieve reduction in the size of prism 40 and to achieve the reduction in the profile of optical system 1 while reducing distortion.

First reflective surface 42 faces the x-axis positive side and the y-axis positive side as illustrated in FIGS. 6 and (a), (b), (c), and (e) of FIG. 7. First reflective surface 42 totally reflects the principal rays by a difference in refractive index between prism 40 and the air. First reflective surface 42 reflects light that has passed through first transmissive surface 41 toward second reflective surface 43 as illustrated in FIG. 8. Alternatively, first reflective surface 42 reflects light that has been reflected by second reflective surface 43 toward first transmissive surface 41.

In the present embodiment, first reflective surface 42 is a flat surface. First reflective surface 42 is tilted at an angle greater than 40 degrees and less than 50 degrees with respect to a direction parallel to first side 11 of first rectangular region 10 (i.e., the x-axis direction). Angle θ illustrated in (b) of FIG. 7 is a tilt angle of first reflective surface 42 with respect to the x-axis. Angle θ is, for example, 45 degrees.

As illustrated in FIG. 9, angles at which principal rays are incident on first reflective surface 42 are defined as i1, i2, i3, and i4. The incident angles are angles between rays and a normal of a surface. For example, the incident angles are angles between the principal rays and a normal of first reflective surface 42. Specifically, incident angle i1 is an angle at which a principal ray passing through second point 102 and eighth point 202 is incident on first reflective surface 42. Incident angle i2 is an angle at which a principal ray passing through third point 103 and ninth point 203 is incident on first reflective surface 42. Incident angle i3 is an angle at which a principal ray passing through fourth point 104 and tenth point 204 is incident on first reflective surface 42. Incident angle i4 is an angle at which a principal ray passing through fifth point 105 and eleventh point 205 is incident on first reflective surface 42.

In this case, first reflective surface 42 satisfies the condition (d) below.

$$i1 < i2 < i3 < i4 \quad (d)$$

That is, the more distant a principal ray among all the principal rays passing through first rectangular region 10 is from second rectangular region 20 along the x-axis and the more distant from second rectangular region 20 along the y-axis (the closer to optical axis 60), the larger an incident angle of the principal ray with respect to first reflective surface 42 is. Therefore, incident angle i1 of a principal ray passing through second point 102, which is the farthest point among points on first rectangular region 10 from second rectangular region 20 along the x-axis and the y-axis, is the smallest incident angle. Incident angle i4 of a principal ray passing through fifth point 105, which is the closest point among points on first rectangular region 10 to second rectangular region 20 along the x-axis and the y-axis is the largest incident angle. Accordingly, it is possible to achieve the reduction in the profile and the size of optical system 1.

It should be noted that incident angle i4 is greater than 65 degrees and less than 85 degrees, for example. When incident angle i4 is less than 85 degrees, it is possible to reduce occurrence of an aberration when a shape error occurs in first reflective surface 42, thus increasing ease of manufacturing. When incident angle i4 is greater than 65 degrees, it is possible to achieve the reduction in the size of prism 40. Incident angle i4 may be preferably greater than 70 degrees. Incident angle i4 may be less than 82 degrees.

Second reflective surface 43 faces a z-axis positive side as illustrated in FIG. 6, and (b), (c), (d), (e), and (f) of FIG. 7. Second reflective surface 43 totally reflects the principal rays by a difference in refractive index between prism 40 and the air. Second reflective surface 43 reflects light that has been reflected by first reflective surface 42 toward second transmissive surface 44 as illustrated in FIG. 8. Alternatively, second reflective surface 43 reflects light that has passed through second transmissive surface 44 toward first reflective surface 42.

Second reflective surface 43 has a positive power. Specifically, an effect, brought about by second reflective surface 43, of converging a principal ray passing through first point 101 is greater in a direction parallel to first side 11 (i.e., the x-axis direction) than in a direction perpendicular to first side 11 (specifically, the y-axis direction). Accordingly, it is possible to achieve reduction in the size of prism 40 and to achieve the reduction in the profile of optical system 1.

Second transmissive surface 44 faces the z-axis negative side as illustrated in FIG. 6, and (a), (e), and (f) of FIG. 7. Second transmissive surface 44 is provided on the reduction side with respect to first transmissive surface 41. When optical system 1 is used in an imaging device, second transmissive surface 44 functions as an emission surface for the principal rays from prism 40. When optical system 1 is used in an image-projecting device, second transmissive surface 44 functions as an incident surface for the principal rays with respect to prism 40.

When optical system 1 is used in an imaging device, second transmissive surface 44 causes a principal ray passing through first point 101 to diverge in a direction parallel to first side 11 (i.e., the x-axis direction) and converge in a direction perpendicular to first side 11 (specifically, the y-axis direction). Accordingly, it is possible to achieve reduction in the size of prism 40 and to achieve the reduction in the profile of optical system 1 while reducing distortion.

Figure 10:
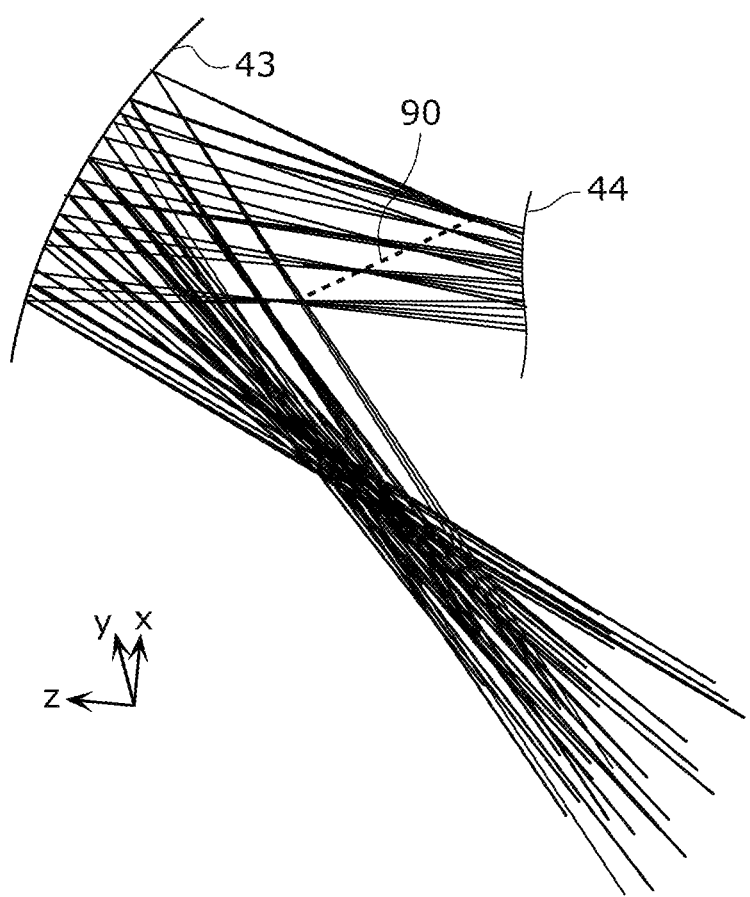
FIG. 10 is a diagram illustrating an intermediate imaging position of the optical system according to the embodiment.

It should be noted that in the present embodiment, optical system 1 has an intermediate imaging position conjugate to each of the reduction conjugate point and the magnification conjugate point. As illustrated in FIG. 10, intermediate imaging position 90 is located between second reflective surface 43 and second transmissive surface 44. FIG. 10 is a diagram illustrating intermediate imaging position 90 of optical system 1 according to the present embodiment. Accordingly, a working distance can be shortened.

Figure 11:
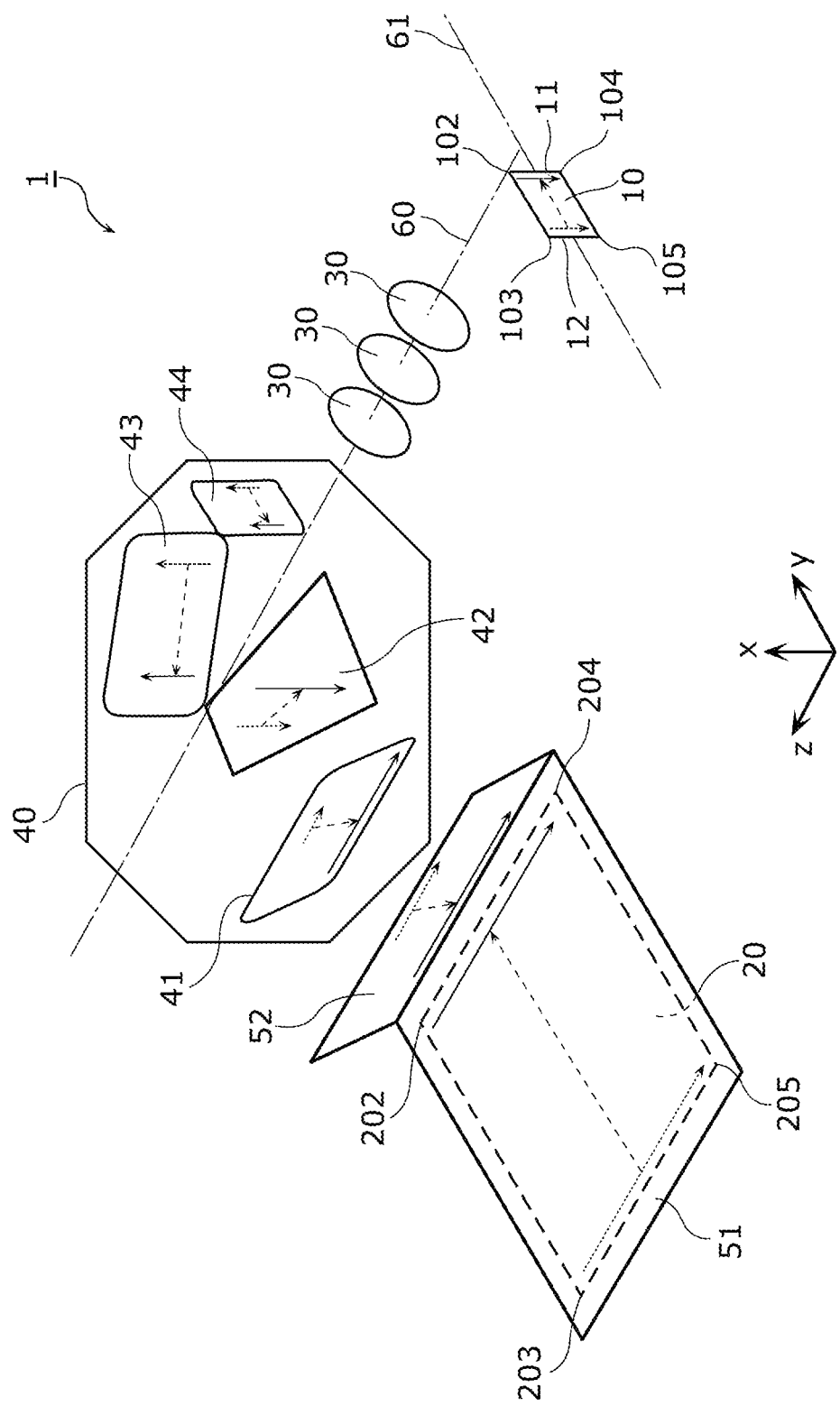
FIG. 11 is a schematic perspective view schematically illustrating an image on principal surfaces included in the optical system according to the embodiment.

FIG. 11 is a schematic perspective view schematically illustrating an image on principal surfaces included in optical system 1 according to the present embodiment. In FIG. 11, three arrows are drawn with a solid line, a broken line, and a dotted line on each surface. For example, in first rectangular region 10, a solid arrow extending along first side 11 from second point 102 toward fourth point 104 is illustrated. Likewise, a dotted arrow extending along second side 12 from third point 103 toward fifth point 105 is illustrated. In addition, a broken arrow extending from a center of the dotted arrow toward a center of the solid arrow is illustrated.

On the surfaces, an arrow of the same line style schematically represents the same image. For example, when solid arrows are focused on, a zigzag line (not illustrated) that passes through tips of the solid arrows from second rectangular region 20 to first rectangular region 10 corresponds to a schematic optical path of a principal ray. In the present embodiment, the principal rays pass through second rectangular region 20, second surface 52 of transparent body 50, first transmissive surface 41, first reflective surface 42, second reflective surface 43, second transmissive surface 44, lenses 30, and first rectangular region 10 in the stated order or reverse order.

In the present embodiment, each of first transmissive surface 41, second reflective surface 43, and second transmissive surface 44 is in a shape of a free-form surface. Working examples of specific shapes of the surfaces will be exemplified later.

[Transparent Body]

Next, a specific configuration of transparent body 50 will be described with reference to FIG. 12, FIG. 13, and FIG. 14 while FIG. 1 is referred to as appropriate.

Figure 12:
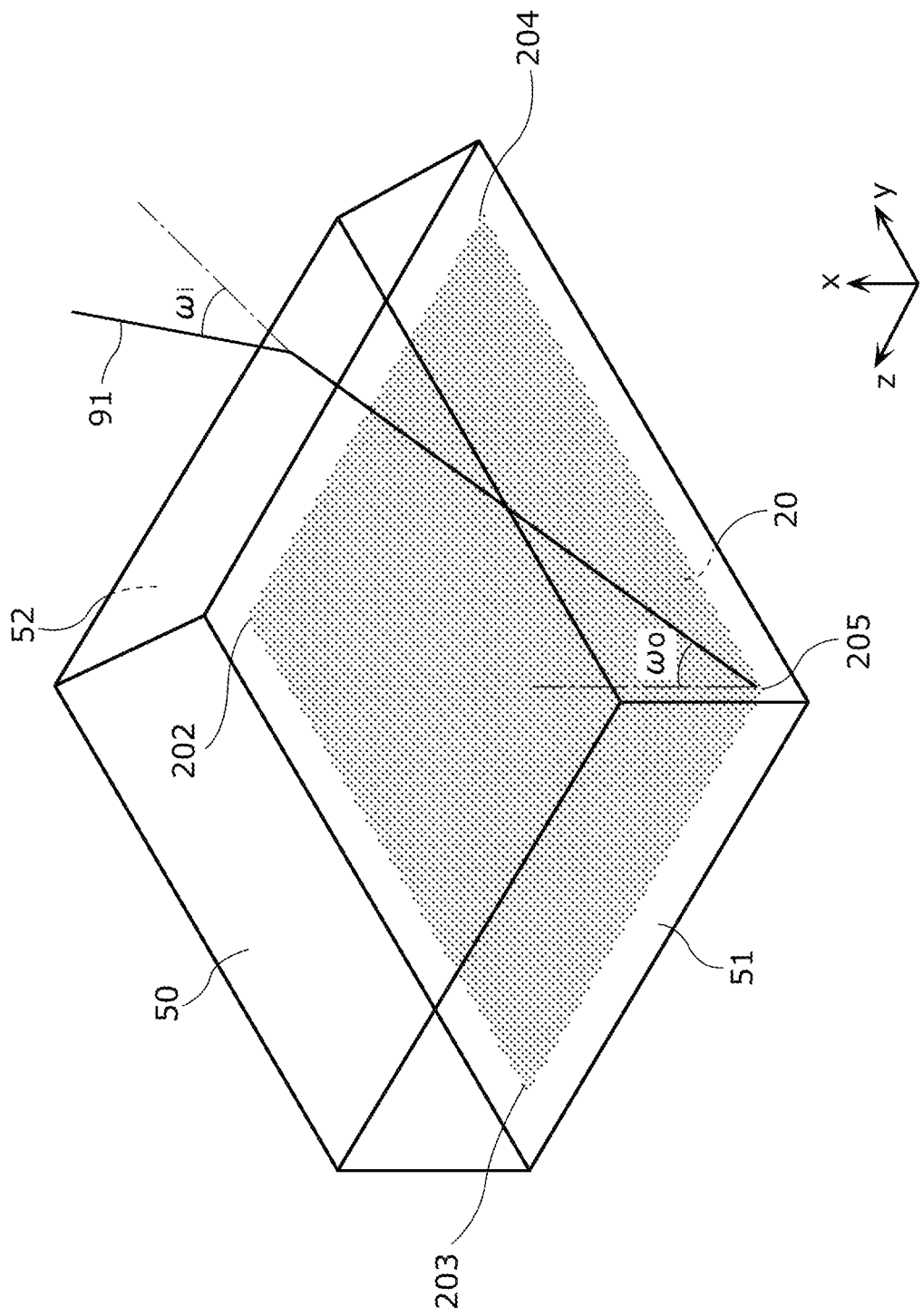
FIG. 12 is a schematic perspective view illustrating a maximum angle of a principal ray passing through a second rectangular region at the magnification conjugate point of the optical system according to the embodiment and an angle of the principal ray passing through a second surface of a transparent body.

FIG. 12 is a schematic perspective view illustrating maximum angle ωo of a principal ray passing through second rectangular region 20 of optical system 1 according to the present embodiment and angle ωi of the principal ray passing through second surface 52 of transparent body 50. FIG. 13 is a schematic perspective view illustrating a passing region of principal rays through each of first surface 51 and second surface 52 of transparent body 50 according to the present embodiment. FIG. 14 is a schematic cross-sectional view illustrating optical path lengths of principal rays in transparent body 50 according to the present embodiment.

Figure 13:
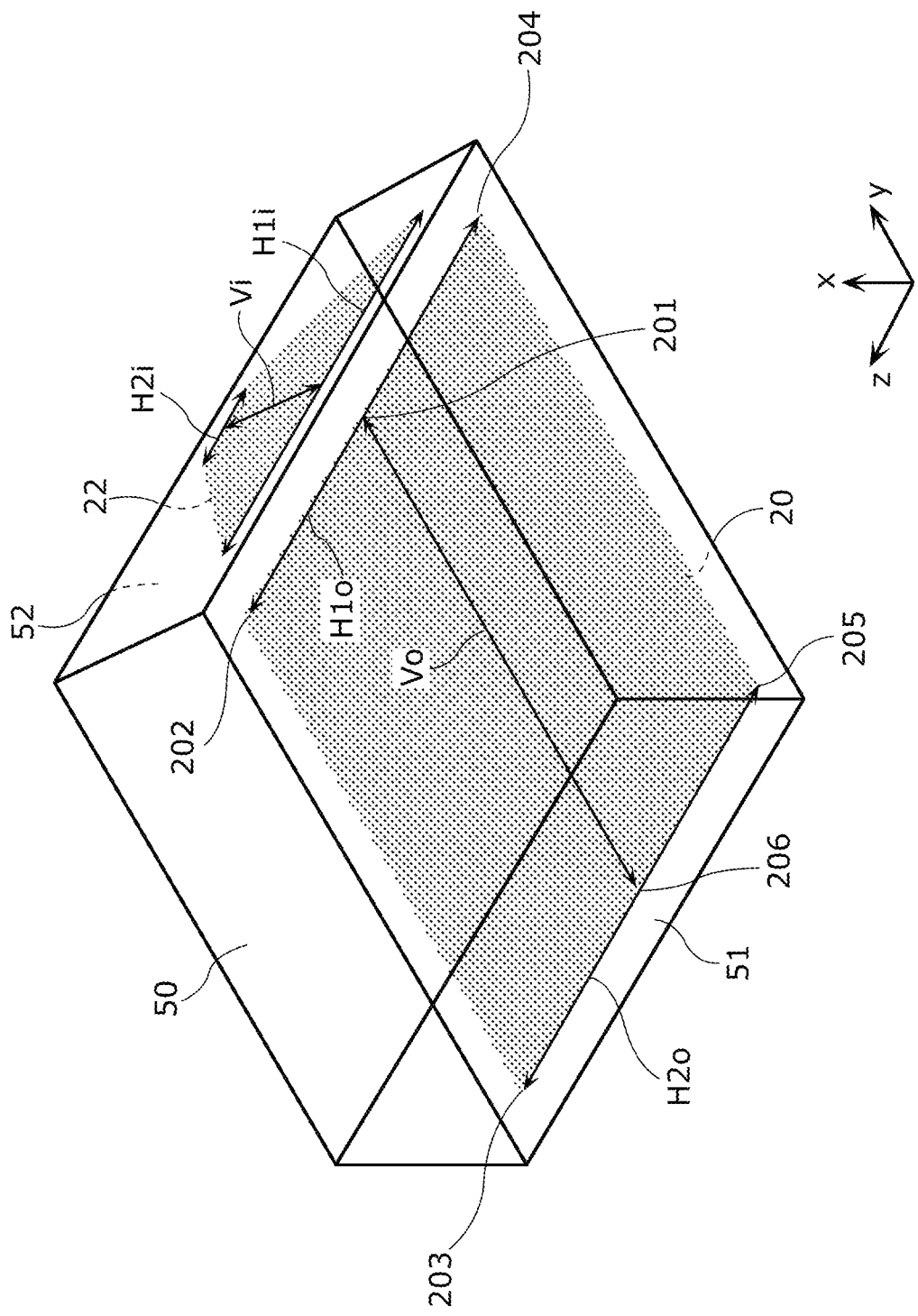
FIG. 13 is a schematic perspective view illustrating a passing region of principal rays through each of a first surface and the second surface of the transparent body according to the embodiment.
Figure 14:
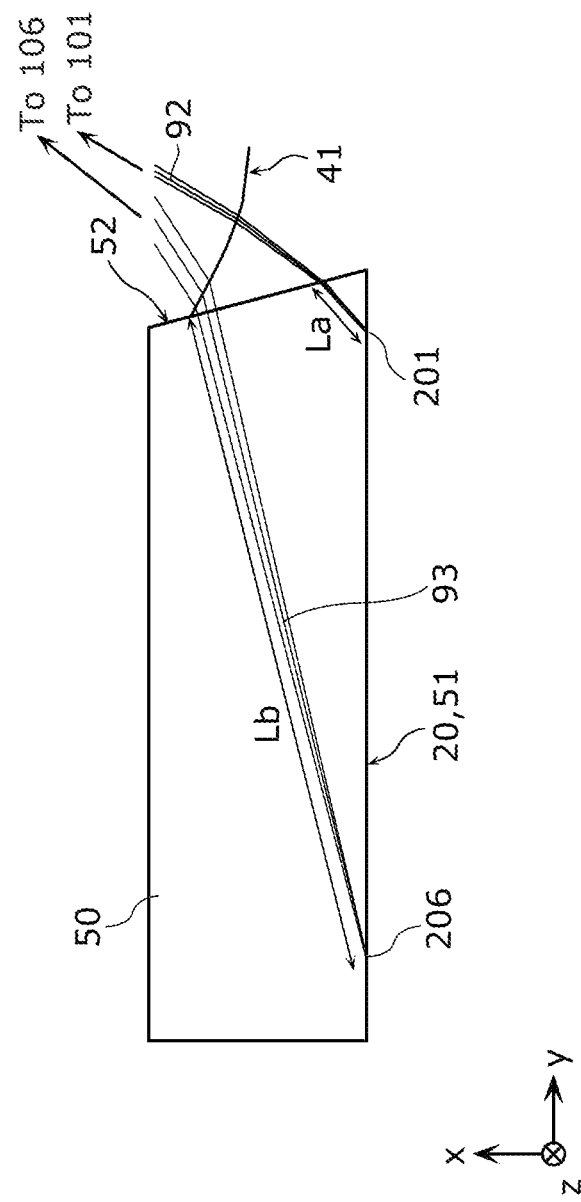
FIG. 14 is a schematic cross-sectional view illustrating optical path lengths of principal rays in the transparent body according to the embodiment.

As illustrated in FIG. 12 to FIG. 14, transparent body 50 includes first surface 51 including second rectangular region 20 and second surface 52. Transparent body 50 has, for example, a flat shape including first surface 51 and a surface opposed to first surface 51 as its principal surfaces.

In the present embodiment, a principal ray passing through second rectangular region 20 passes second surface 52 as illustrated in FIG. 12. In other words, first transmissive surface 41 of prism 40 is disposed such that first transmissive surface 41 faces second surface 52. For example, first transmissive surface 41 is disposed such that first transmissive surface 41 does not overlap second rectangular region 20 of first surface 51 of transparent body 50 as viewed from a normal direction of second rectangular region 20.

FIG. 12 illustrates, with a solid line, principal ray 91 whose incident angle (or an emission angle) with respect to second rectangular region 20 is the largest among principal rays passing through second rectangular region 20. Maximum angle ωo in FIG. 12 is a maximum angle of the principal rays passing through second rectangular region 20, namely a maximum angle of the incident angle (or the emission angle) of principal ray 91 with respect to second rectangular region 20. In addition, angle ωi is an angle at which principal ray 91 passes through second surface 52. Specifically, angle ωi is an emission angle of principal ray 91 from second rectangular region 20 with respect to second surface 52 or is an incident angle of principal ray 91 incident on second rectangular region 20 with respect to second surface 52.

In this case, optical system 1 according to the present embodiment satisfies the condition (a) below.

$$\omega i < \omega o \qquad (a)$$

Accordingly, it is possible both to make optical system 1 wide-angle and to reduce the thickness of optical system 1. When optical system 1 is used in an imaging device, reflection at second surface 52 can be reduced.

Maximum angle ωo is, for example, greater than 65 degrees. Accordingly, it is possible to achieve the reduction in the profile of optical system 1 while increasing second rectangular region 20. Maximum angle ωo may be preferably greater than 70 degrees.

Angle ωi is, for example, less than 30 degrees. Accordingly, reflection at second surface 52 can be reduced. Angle ωi may be preferably less than 20 degrees.

In FIG. 13, region 22 in which principal rays passing through second rectangular region 20 pass through second surface 52 is shaded. A shape of region 22 is a trapezoidal shape. In FIG. 13, lengths H1o, H2o, and Vo relating to second rectangular region 20 are indicated with double-headed arrows. Lengths H1i, H2i, and Vi relating to region 22 are indicated with double-headed arrows.

Length H1o is the distance connecting, on first surface 51, two points through which principal rays forming images at two ends of first side 11 of first rectangular region 10 pass. The two ends of first side 11 are second point 102 and fourth point 104 as illustrated in FIG. 5. Length H1o is the distance between eighth point 202 and tenth point 204 of second rectangular region 20 that correspond to second point 102 and fourth point 104, respectively.

Length H2o is the distance connecting, on first surface 51, two points through which principal rays forming images at two ends of second side 12 of first rectangular region 10 pass. The two ends of second side 12 are third point 103 and fifth point 105 as illustrated in FIG. 5. Length H2o is the distance between ninth point 203 and eleventh point 205 of second rectangular region 20 that correspond to third point 103 and fifth point 105, respectively.

When a line segment connecting the centers of first side 11 and second side 12 of first rectangular region 10 is determined as a center line, length Vo is the distance connecting, on first surface 51, two points through which principal rays forming images at two ends of the center line pass. As illustrated in FIG. 5, the center of first side 11 is first point 101, and the center of second side 12 is sixth point 106.

Length H1i is the distance connecting, on second surface 52, two points through which principal rays forming images at two ends of first side 11 of first rectangular region 10 pass.

H2i is the distance connecting, on second surface 52, two points through which principal rays forming images at two ends of second side 12 of first rectangular region 10 pass.

When a line segment connecting the centers of first side 11 and second side 12 of first rectangular region 10 is determined as a center line, length Vi is the distance connecting, on second surface 52, two points through which principal rays forming images at two ends of the center line pass.

When lengths H1o, H2o, Vo, H1i, H2i, and Vi are defined as above, optical system 1 according to the present embodiment satisfies the condition (b1) below.

$$H1o/H1i \times Vi/Vo > 0.1 \qquad (b1)$$

Accordingly, it is possible to provide a large region as second rectangular region 20. When optical system 1 is used in an imaging device, it is possible to take out light having a sufficient amount of light from the back of transparent body 50.

Further, optical system 1 may satisfy the condition (b2) below.

$$H1o/H1i \times Vi/Vo < 0.4 \qquad (b2)$$

Accordingly, it is possible to achieve reduction in the profile of transparent body 50. The condition (b3) or (b4) below may be preferably satisfied.

$$H1o/H1i \times Vi/Vo > 0.15 \qquad (b3)$$

$$H1o/H1i \times Vi/Vo < 0.3 \qquad (b4)$$

Further, optical system 1 satisfies the condition (c1) below.

$$H1o/H1i \times H2i/H2o > 0.1 \qquad (c1)$$

Accordingly, it is possible to provide a large region as second rectangular region 20. When optical system 1 is used in an imaging device, it is possible to take out light having a sufficient amount of light from the back of transparent body 50.

Further, optical system 1 may satisfy the condition (c2) below.

$$H1o/H1i \times H2i/H2o < 0.4 \qquad (c2)$$

Accordingly, it is possible to achieve reduction in the profile of transparent body 50. The condition (c3) or (c4) below may be preferably satisfied.

$$H1o/H1i \times H2i/H2o > 0.15 \qquad (c3)$$

$$H1o/H1i \times H2i/H2o < 0.35 \qquad (c4)$$

FIG. 14 illustrates principal ray 92 that passes through first point 101 of first rectangular region 10 and seventh point 201 of second rectangular region 20 and principal ray 93 that passes through sixth point 106 of first rectangular region 10 and twelfth point 206 of second rectangular region 20. Here, the optical path length, in transparent body 50, of principal ray 92 is defined as La. The optical path length, in transparent body 50, of principal ray 93 is defined as Lb. In this case, the condition (g) below is satisfied.

$$5 < Lb/La < 15 \qquad (g)$$

Accordingly, it is possible to achieve reduction in the thickness of transparent body 50 while increasing second rectangular region 20. That is, light having a sufficient amount of light can be taken out from the back of transparent body 50, or light having a sufficient amount of light can be delivered to the back of transparent body 50.

It should be noted that the width of an incident angle or the width of an emission angle of principal ray 92 differs between the case where principal ray 92 is incident on or emitted to first point 101 and the case where principal ray 92 is incident on or emitted to seventh point 201. This will be described below with reference to FIG. 15 and FIG. 16, with the case where optical system 1 is used in an imaging device taken as an example.

Figure 15:
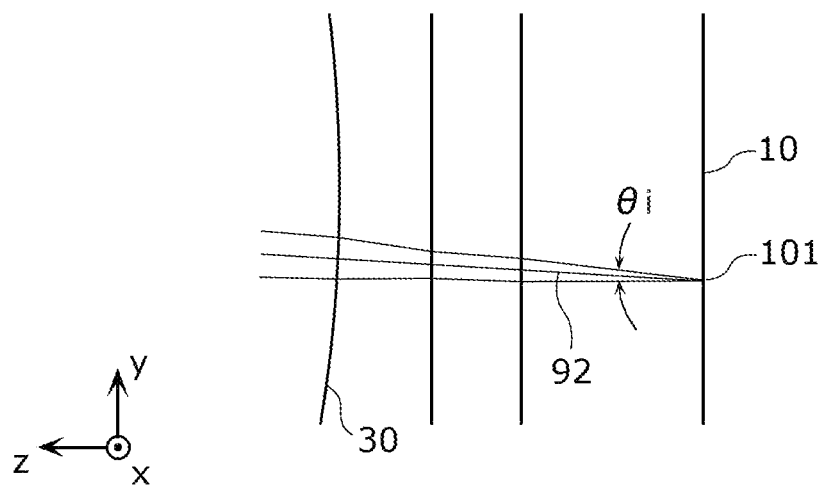
FIG. 15 is a schematic plan view illustrating a principal ray incident on a first point, which is the closest to the optical axis among the four sides of the first rectangular region at the reduction conjugate point of the optical system according to the embodiment.

FIG. 15 is a schematic plan view illustrating principal ray 92 incident on first point 101, which is the closest to optical axis 60 among the four sides of first rectangular region 10 at the reduction conjugate point of optical system 1 according to the present embodiment. Incident angle θi illustrated in FIG. 15 is the width of an incident angle formed by principal ray 92 incident on first point 101 in a plane that passes through first side 11 and is parallel to each of first side 11 and optical axis 60.

It should be noted that, in FIG. 15, a cover member that is transmissive and flat-shaped is disposed between lens 30 and first rectangular region 10 and the member has no lens function.

Figure 16:
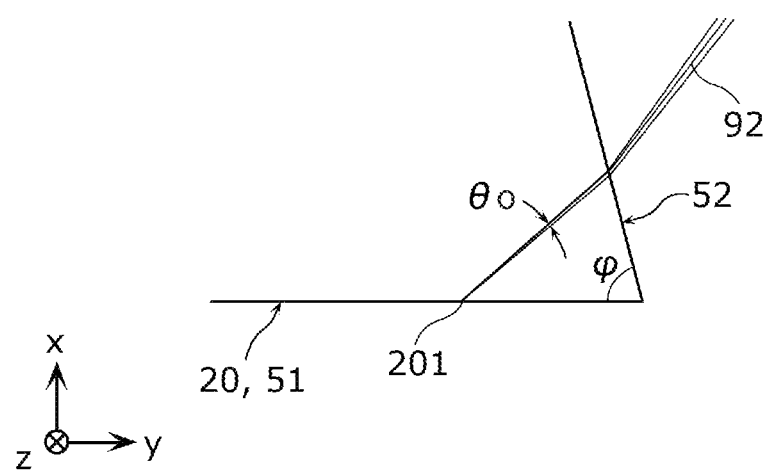
FIG. 16 is a schematic side view illustrating an angle at which the principal ray illustrated in FIG. 15 is incident on the second rectangular region at the magnification conjugate point of the optical system according to the embodiment.

FIG. 16 is a schematic cross-sectional view illustrating an angle at which principal ray 92 illustrated in FIG. 15 is incident on second rectangular region 20 at the magnification conjugate point of optical system 1 according to the present embodiment. Angle θo illustrated in FIG. 16 is an angle formed by principal ray 92 forming incident angle θi when principal ray 92 is emitted from seventh point 201.

In this case, angle θo is less than incident angle θi. Specifically, optical system 1 according to the present embodiment satisfies the condition (k) below.

$$0.1 < \theta o/\theta i < 0.3 \quad (k)$$

Accordingly, it is possible to achieve the reduction in the size of optical system 1 while making second rectangular region 20 large.

In the present embodiment, as illustrated in FIG. 16, second surface 52 is tilted with respect to first surface 51. Tilt angle φ is an angle greater than 45 degrees and less than 85 degrees. When optical system 1 is used in an imaging device, second surface 52 being tilted can decrease an emission angle of light from second surface 52.

Transparent body 50 is formed of, for example, but not limited to, uniform, transparent material. Transparent body 50 may be formed of a plurality of different materials. A variation of transparent body 50 that can be used instead of the transparent body will be described below with reference to FIG. 17.

Figure 17:
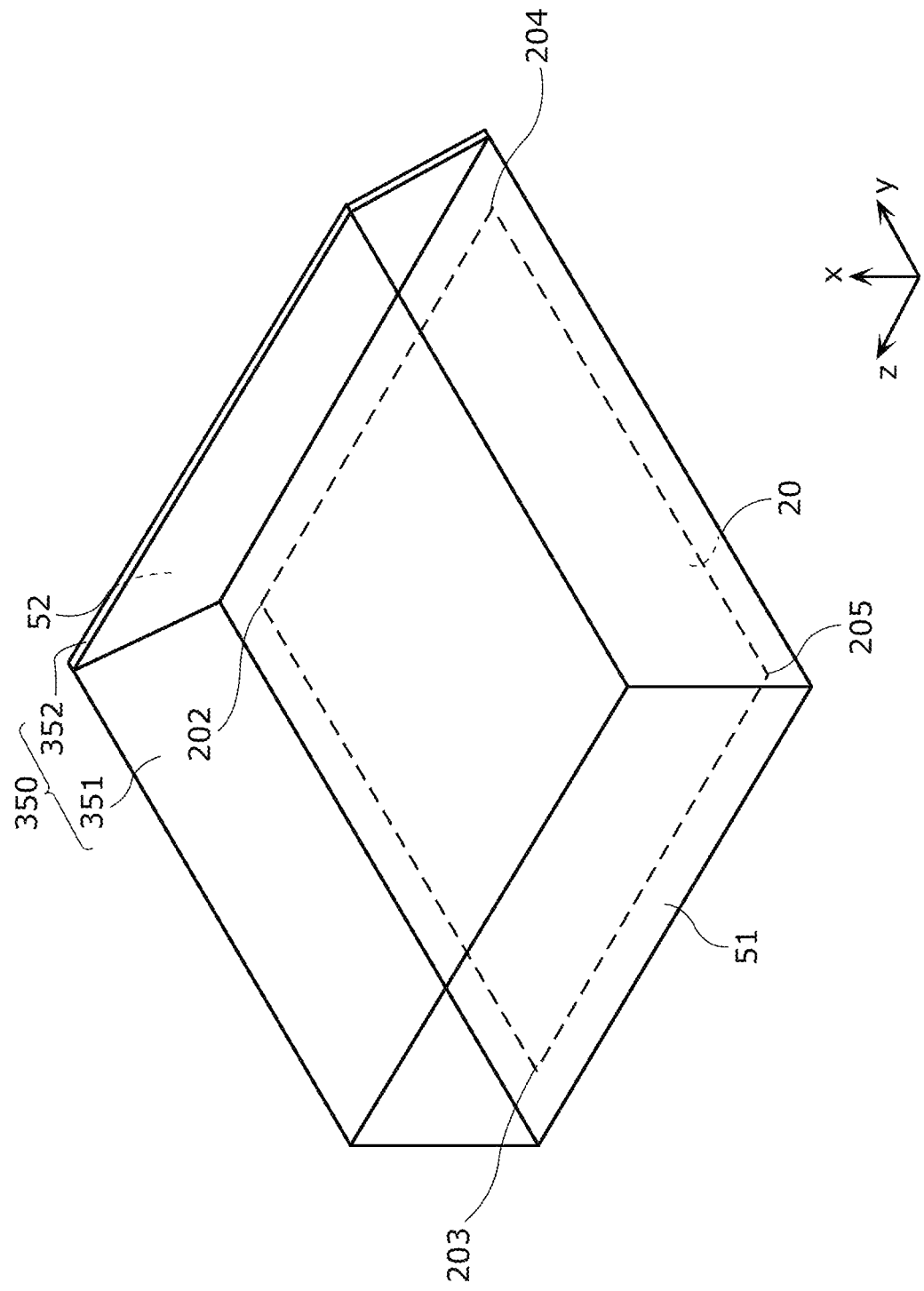
FIG. 17 is a schematic perspective view illustrating a variation of the transparent body.

FIG. 17 is a schematic perspective view illustrating the variation of the transparent body. Transparent body 350 illustrated in FIG. 17 includes first medium 351 including first surface 51 and second medium 352 that includes second surface 52 and is in a shape of a plate. Second surface 52 is in contact with the air.

First medium 351 is a body part of transparent body 350 and has a flat shape having first surface 51 and a surface opposed to first surface 51 as its principal surfaces. First medium 351 is formed of, for example, a resin material such as silicon and urethane.

Second medium 352 is in contact with first medium 351. Specifically, a surface of second medium 352 opposed to second surface 52 is in contact with first medium 351. Second medium 352 is, for example, but not limited to, a cover glass. Second medium 352 may be a transparent resin plate.

First medium 351 and second medium 352 are each formed of a material that is transmissive to visible light. First medium 351 and second medium 352 have different refractive indices. Here, the refractive index of first medium 351 is defined as n1, and the refractive index of second medium 352 is defined as n2. In this case, transparent body 350 satisfies the condition (e) below.

$$n1 < n2 \quad (e)$$

For example, refractive index n2 is greater than 1.45. Accordingly, curvature of field can be reduced. Also, refractive index n1 is greater than 1.3 and less than 1.5. Since refractive index n1 is greater than 1.3, it is possible to reduce a return loss at an interface between first medium 351 and second medium 352. Further, since refractive index n1 is less than 1.5, it is possible to provide a large angle of view.

In the present variation, first medium 351 is flexible. Specifically, first medium 351 is formed of a material that is soft to the extent that the material can be deformed easily by a human hand. Second medium 352 is harder than first medium 351.

Here, a Young's modulus of first medium 351 is defined as E1, and a Young's modulus of second medium 352 is defined as E2. In this case, transparent body 350 satisfies the condition (f) below.

$$E1 < E2 \quad (f)$$

For example, Young's modulus E1 is greater than 0.01 MPa and less than 3 MPa. Accordingly, the shape of first medium 351 can be changed easily. For example, first medium 351 deforms when a person touches first medium 351 with a hand or when first medium 351 comes into contact with another object. When optical system 1 is used in an imaging device, changes in shapes of first surface 51 and second rectangular region 20 caused by deformation of first surface 51 and second rectangular region 20 can be imaged.

Further, for example, Young's modulus E2 is greater than 400 MPa and less than 200000 MPa (200 GPa). Accordingly, a change in a shape of second medium 352 caused by deformation of first medium 351 is reduced. When optical system 1 is used in an imaging device, second surface 52 of second medium 352 functions as an emission surface for light from transparent body 350. A shape of the emission surface can be kept in a fixed shape without being changed. Therefore, the change in the shape of first surface 51 can be imaged. When optical system 1 is used in an image-projecting device, second surface 52 functions as an incident surface for light incident on transparent body 350. Therefore, a projected image can be stabilized.

WORKING EXAMPLES

Working Example 1 to Working Example 5, which are specific working examples of optical system 1 above, will be described below.

Figure 18:
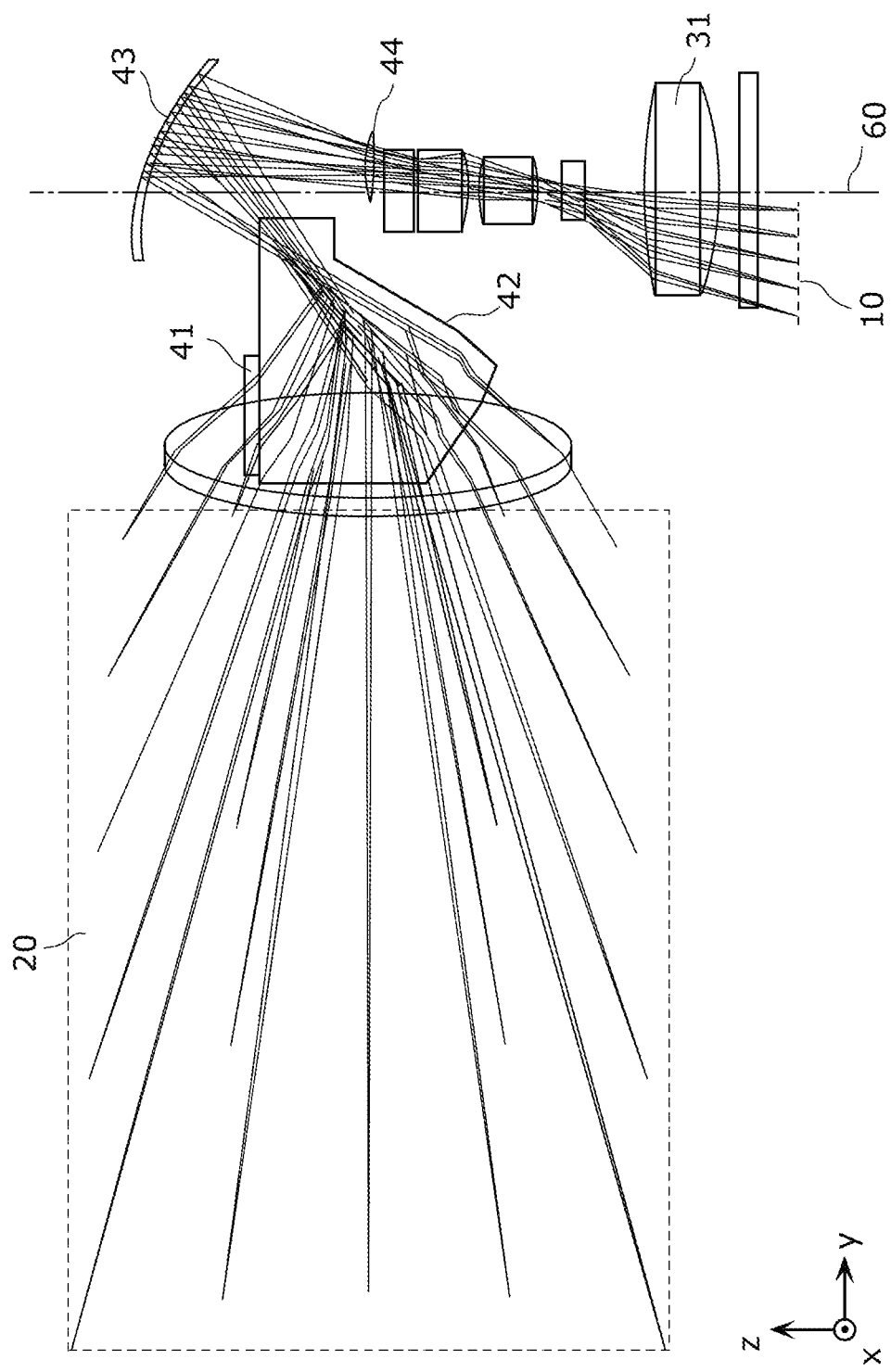
FIG. 18 is a plan view illustrating principal rays passing through an optical system according to Working Example 1.

FIG. 18 is a plan view illustrating principal rays passing through an optical system according to Working Example 1. In an optical system according to Working Example 2 and an optical system according to Working Example 3, principal rays passing through each optical system can be given in a plan view equivalent to the plan view in FIG. 18. The optical systems according to Working Example 1, Working Example 2, and Working Example 3 are each disposed at a position at which the optical system does not overlap second rectangular region 20 with respect to optical axis 60 in front view of second rectangular region 20, as with optical system 1 illustrated in FIG. 1 and the like.

Figure 19:
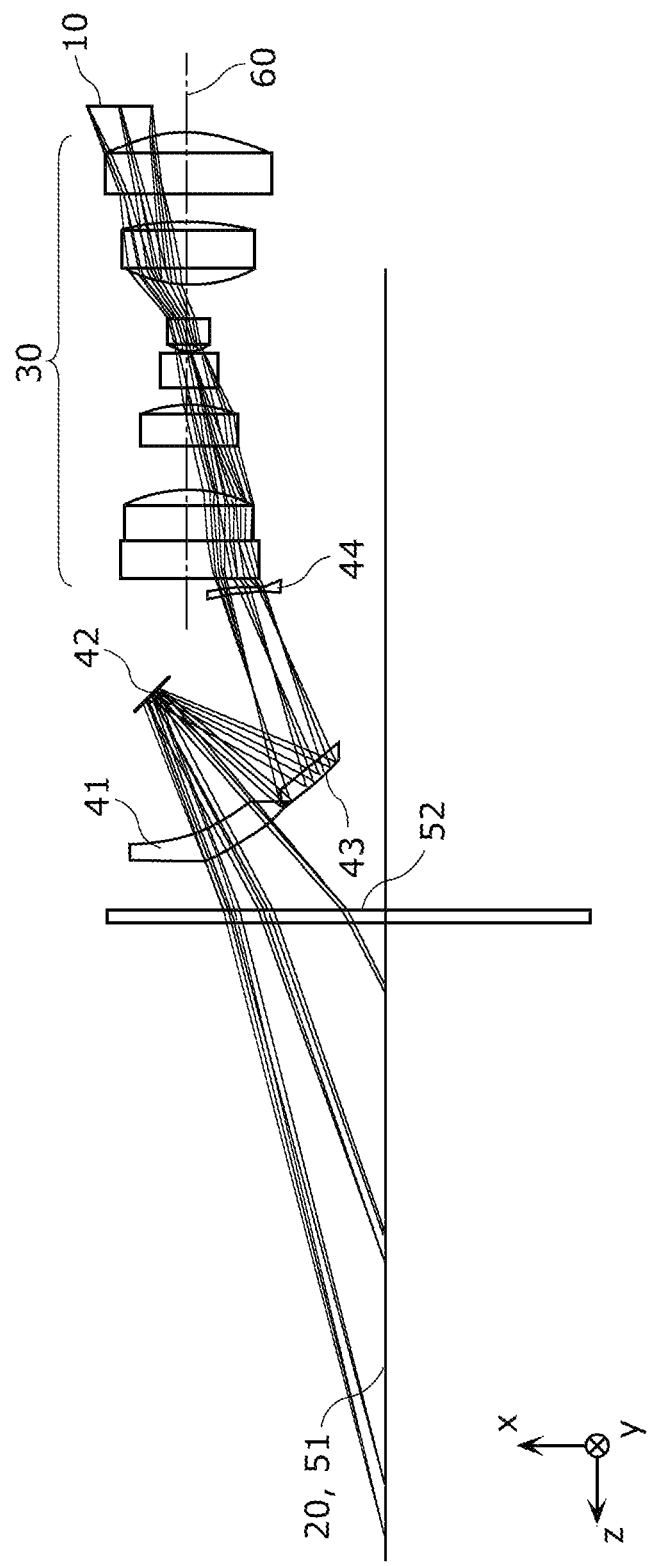
FIG. 19 is a side view illustrating principal rays passing through an optical system according to Working Example 5.
Figure 20:
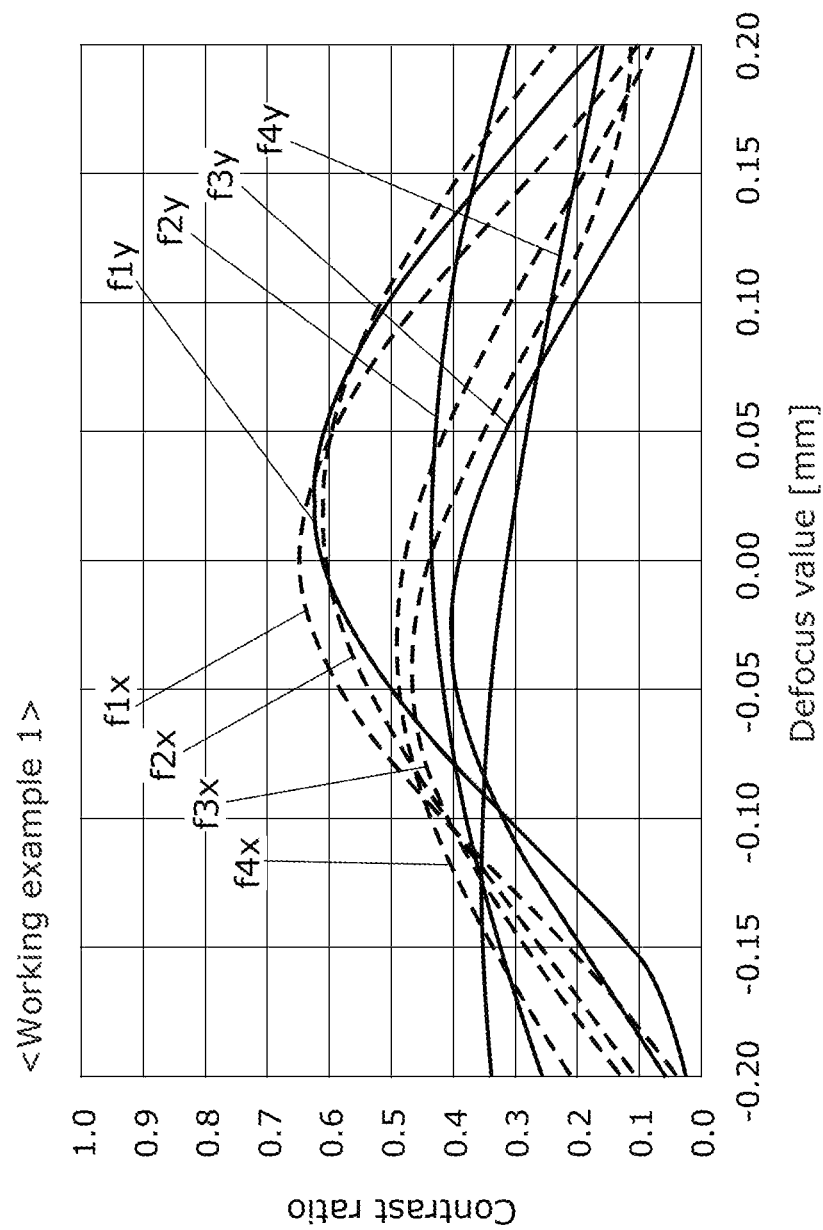
FIG. 20 is a graph illustrating MTF properties of the optical system according to Working Example 1.
Figure 21:
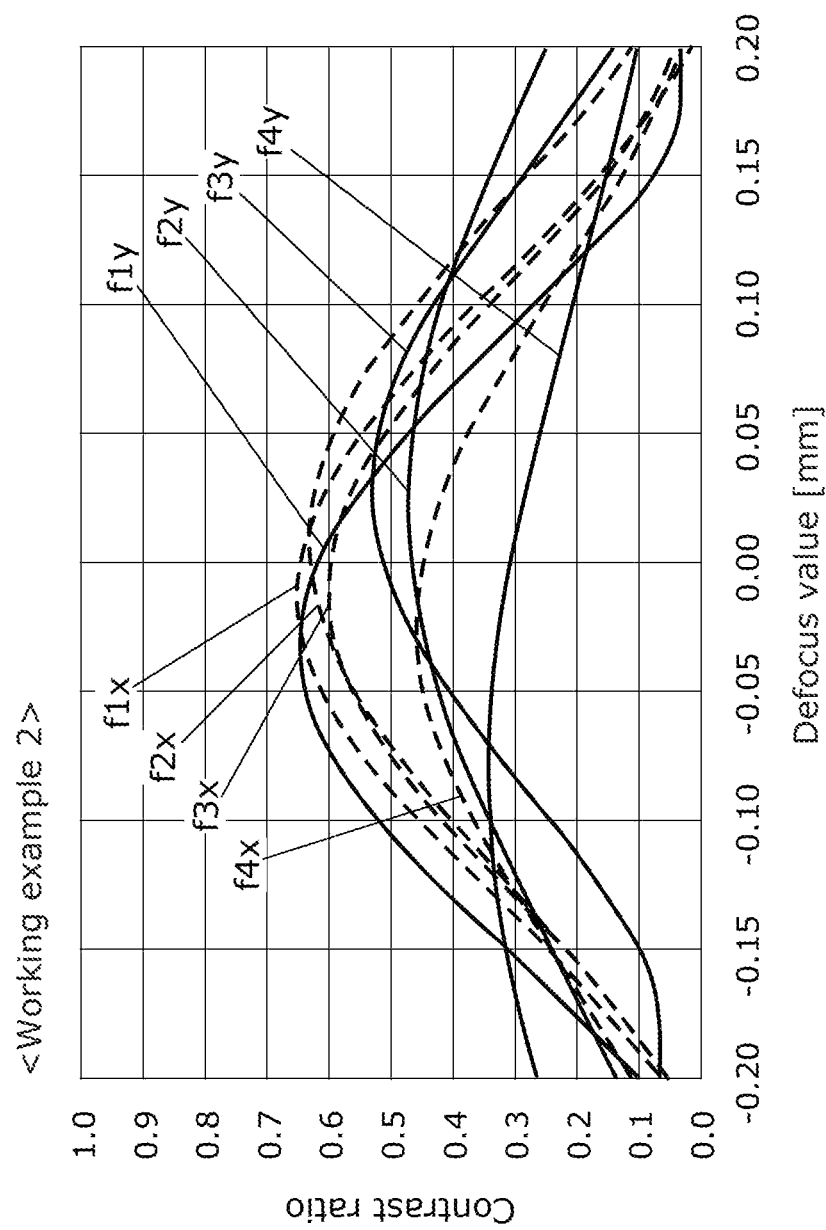
FIG. 21 is a graph illustrating MTF properties of an optical system according to Working Example 2.
Figure 22:
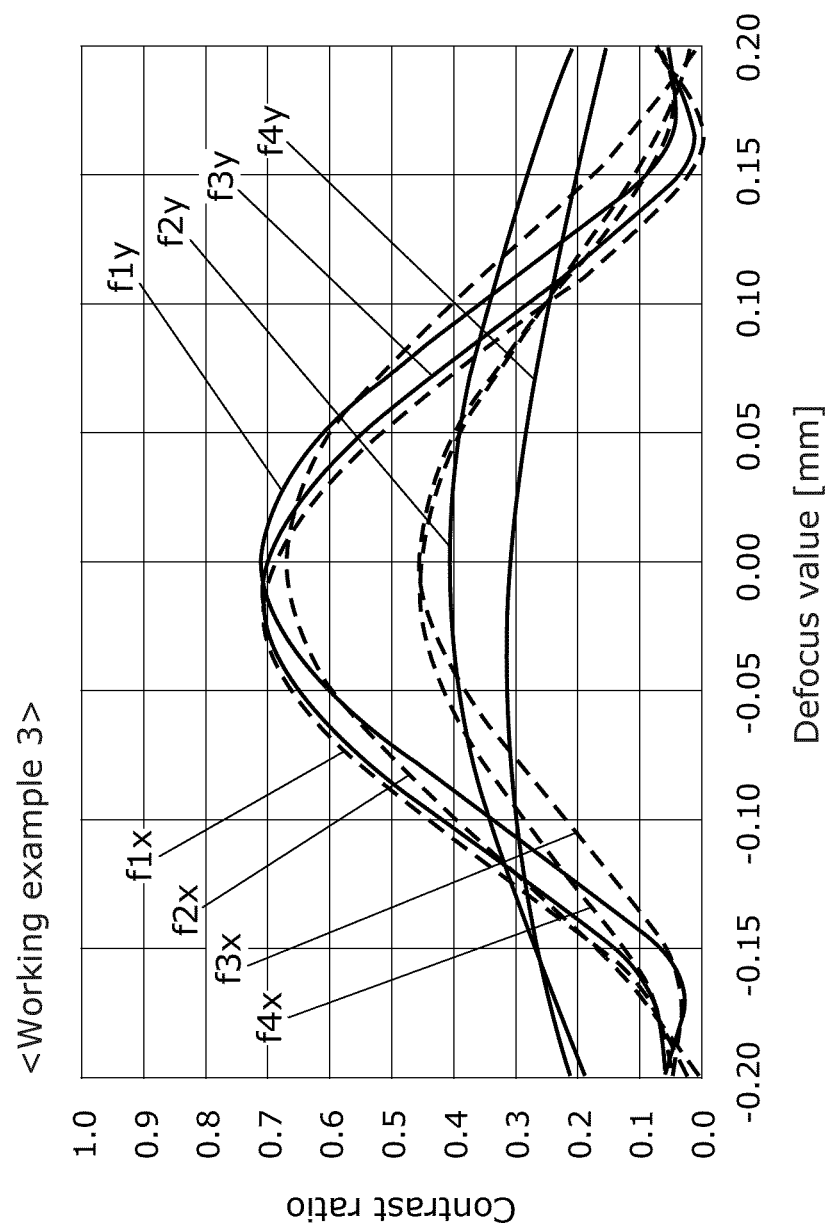
FIG. 22 is a graph illustrating MTF properties of an optical system according to Working Example 3.
Figure 23:
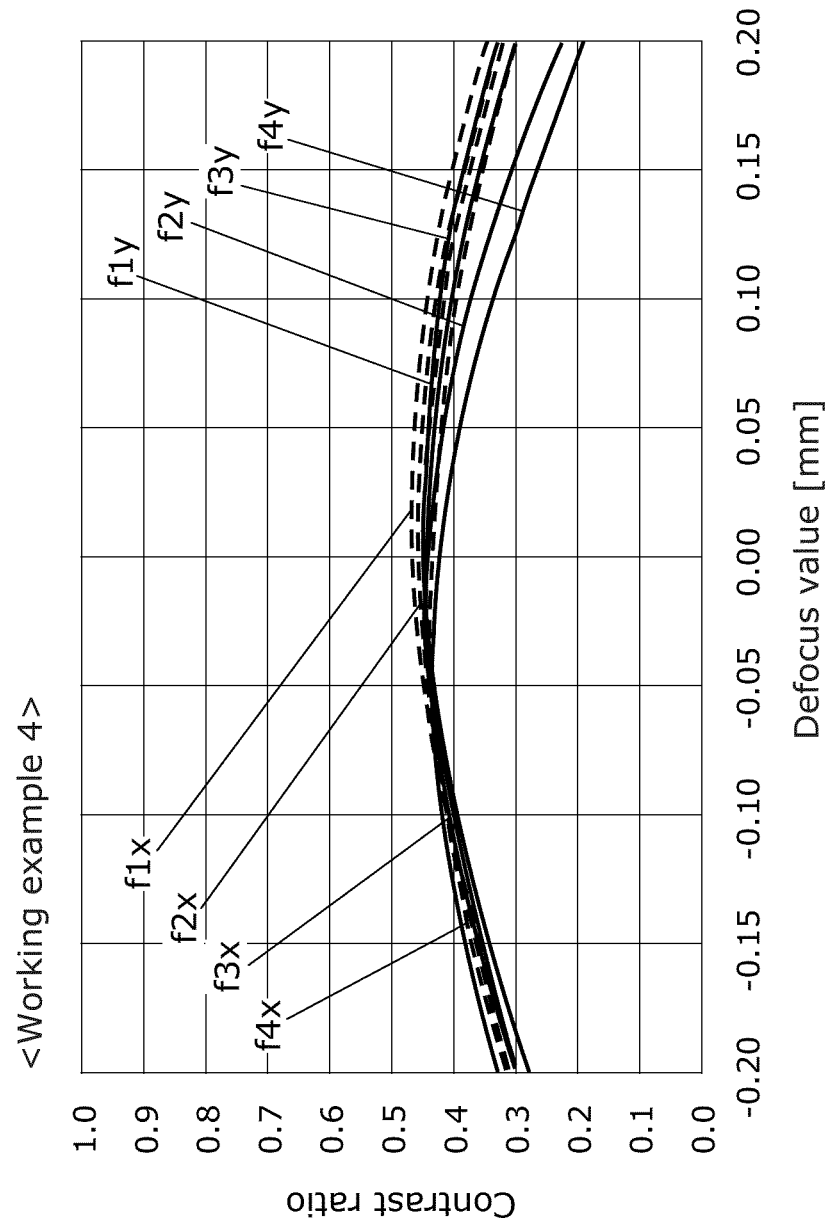
FIG. 23 is a graph illustrating MTF properties of an optical system according to Working Example 4.
Figure 24:
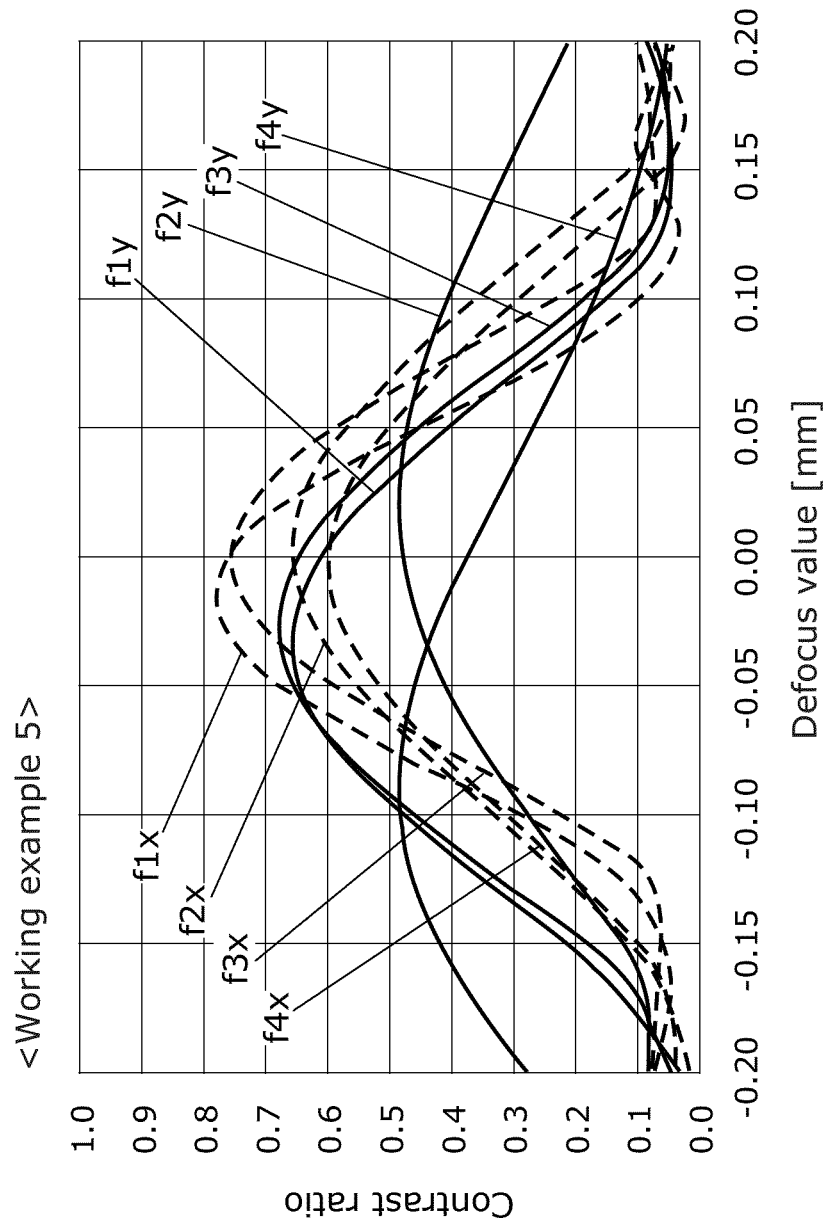
FIG. 24 is a graph illustrating MTF properties of the optical system according to Working Example 5.

FIG. 19 is a side view illustrating principal rays passing through an optical system according to Working Example 5. In an optical system according to Working Example 5, second rectangular region 20 is disposed at a position at which the optical system overlaps second rectangular region 20 and first rectangular region 10 with respect to optical axis 60 in front view of second rectangular region 20. That is, the optical system is disposed in an array from first rectangular region 10 to second rectangular region 20 in a direction in which optical axis 60 extends. An optical system according to Working Example 4 is the same as in Working Example 5.

As illustrated in FIG. 18, lens 31, which is the closest to first rectangular region 10 among lenses 30, may be a D-cut lens. Specifically, lens 31 may have a D-cut on a side not including optical axis 60 in a direction perpendicular to first side 11. For example, lens 31 has a plane parallel to a yz plane on the x-axis positive side. Accordingly, it is possible to achieve the reduction in the size of the optical system. It should be noted that, in FIG. 18, a cover member that is transmissive and flat-shaped is disposed between lens 31 and first rectangular region 10 and the member has no lens function. The cover member is the same as that illustrated in FIG. 15.

Specific numerical working examples in Working Example 1 to Working Example 5 will be described below.

In tables shown below, all lengths are in "mm." All angles of view are in "degrees." In the working examples, a plurality of surfaces that have influences on rays are each given a surface number. The surface numbers are numbered in ascending order from the magnification side (second rectangular region 20) to the reduction side (first rectangular region 10). In the working examples, surface types, Y curvature radii (curvature radii in the y-axis direction), conic constants, spacings, nd (refractive indices with respect to line d), vd (Abbe's numbers with respect to line d), and decentering data items are shown. The decentering data items indicate amounts of displacement X, Y, and Z of a current surface with respect to a previous surface in the optical system and normal directions α, β, and γ of the current surface with respect to the previous surface.

In the working examples, the optical system is assumed to be used in an imaging device. That is, in each table, an "object" denotes an object surface, namely, second rectangular region 20. An "image" denotes an imaging surface, namely, first rectangular region 10.

A shape of a free-form surface is defined by the following equations based on a local Cartesian coordinate system (x, y, z) whose original is an apex of the surface.

$$z = \frac{cr^2}{1 + \sqrt{1 - (1+k)c^2 r^2}} + \sum_{j=2}^{137} C_j x^m y^n \quad \text{[Math. 1]}$$

$$j = \frac{(m+n)^2 + m + 3n}{2} + 1$$

Here, z is a sag of a surface parallel to the z-axis. r is a distance in a radial direction, namely, a square root of $(x^2+y^2)$. c is a curvature at an apex of the surface. k is a conic constant. $C_j$ is a coefficient of a monomial $x^m y^n$.

Hereinafter, coefficients of i-th order terms of x and j-th order terms of y in the polynomial representing the shape of a free-form surface are shown using a table in which $x^i$ are arranged in its vertical direction from i=0 to i=10, and $y^j$ are arranged in its horizontal direction from j=0 to j=10 (e.g., Table 3, etc.). Specifically, an intersection of one of the rows and one of the columns indicates a coefficient of its corresponding term. For example, a numerical value at an intersection of the row of "$x^2$" and the column of "y" is a coefficient of $x^2 y$.

Working Example 1

Data on principal surfaces of an optical system according to Working Example 1 are shown in Table 1.

TABLE 1

| ex1 | Surface number | Surface type | Y curvature radius | Conic constant | Spacing | nd | vd | Type | X | Y | Z | α | β | γ |
|---|---|---|---|---|---|---|---|---|---|---|---|---|---|---|
| Object | | | | | 1.1000 | 1.40000 | 50.00 | | | | | | | |
| | 1 | | ∞ | | 0.5000 | 1.50000 | 50.00 | Normal | 0.000 | 0.000 | 0.000 | 75.00 | 0.00 | 0.00 |
| | 2 | | ∞ | | 3.4000 | | | | | | | | | |
| | 3 | | ∞ | | 0.0000 | | | Normal | 0.000 | 0.000 | 0.000 | −75.00 | 0.00 | 0.00 |
| | 4 | Free-form | 6.7941 | | 4.6742 | 1.53996 | 59.46 | Decenter and return | 0.000 | −5.940 | 4.960 | 77.09 | 0.00 | 0.00 |
| | 5 | | ∞ | | 0.0000 | 1.53996 | 59.46 | Normal | 0.000 | 0.000 | 0.000 | 0.00 | −45.00 | 0.00 |
| Reflection | 6 | | ∞ | | 0.0000 | 1.53996 | 59.46 | | | | | | | |
| | 7 | | ∞ | | 0.0000 | 1.53996 | 59.46 | Normal | 0.000 | 0.000 | 0.000 | 0.00 | −45.00 | 0.00 |
| | 8 | | ∞ | | −6.0000 | 1.53996 | 59.46 | | | | | | | |
| | 9 | | ∞ | | 0.0000 | 1.53996 | 59.46 | Normal | 0.000 | 0.000 | 0.000 | 0.00 | 0.00 | 0.00 |
| Reflection | 10 | Free-form | 2.1189 | −0.9081 | 0.0000 | 1.53996 | 59.46 | Decenter and return | 0.000 | 1.735 | 0.000 | 0.00 | 0.00 | 0.00 |
| | 11 | | ∞ | | 0.0000 | 1.53996 | 59.46 | Normal | 0.000 | 0.000 | 0.000 | 0.00 | 0.00 | 0.00 |
| | 12 | | ∞ | | 6.0000 | 1.53996 | 59.46 | | | | | | | |
| | 13 | Free-form | −3.5648 | | 0.4500 | | | Decenter and return | 0.000 | 1.169 | 0.000 | 0.00 | 0.00 | 0.00 |
| | 14 | | −4.4200 | | 0.6425 | 1.98613 | 16.48 | Normal | 0.000 | 2.677 | 0.000 | 0.00 | 0.00 | 0.00 |
| | 15 | | 2.9388 | | 0.2658 | | | | | | | | | |
| | 16 | | 15.0545 | | 1.3829 | 2.00100 | 29.13 | | | | | | | |
| | 17 | | −2.9162 | | 0.1000 | | | | | | | | | |
| | 18 | | 2.133 | | 1.5956 | 1.72916 | 54.67 | | | | | | | |
| | 19 | | −6.3610 | | 0.1000 | | | | | | | | | |
| Aperture | 20 | | ∞ | | 0.7698 | | | | | | | | | |
| | 21 | | −1.5540 | | 0.5000 | 1.98613 | 16.48 | | | | | | | |
| | 22 | | −4.0666 | | 0.9964 | | | | | | | | | |
| | 23 | | 33.1042 | | 2.1989 | 1.77250 | 49.62 | | | | | | | |
| | 24 | | −5.2130 | | 0.1000 | | | | | | | | | |
| | 25 | | ∞ | | 0.5000 | 1.51680 | 64.17 | | | | | | | |
| | 26 | | ∞ | | 0.4000 | | | Normal | 0.000 | −0.500 | 0.000 | 0.00 | 0.00 | 0.00 |
| Image | | | | | 0.0000 | | | | | | | | | |

The aperture diameter is 0.55 mm. A minimum value and a maximum value of the size of an image formed in first rectangular region 10 are shown in Table 2.

TABLE 2

|       |   | min    | max   |
|-------|---|--------|-------|
| Image | y | −2.680 | 0.000 |
|       | x | −0.758 | 0.758 |

The optical system according to Working Example 1 includes, as lenses 30, a first lens, a second lens, a third lens, a fourth lens, and a fifth lens from its magnification side to its reduction side in the stated order. Between the third lens and the fourth lens, an aperture is disposed. In addition, in the optical system according to Working Example 1, a cover glass is disposed between the fifth lens and its reduction conjugate point.

In Working Example 1, the first lens is in a double-concave shape. The second lens is in a double-convex shape. The third lens is in a double-convex shape. The fourth lens is in a negative meniscus shape that is convex toward first rectangular region 10. The fifth lens is in a double-convex shape.

As shown in Table 1, in Working Example 1, surface 4 is first transmissive surface 41. Surface 6 is first reflective surface 42. Surface 10 is second reflective surface 43. Surface 13 is second transmissive surface 44. Surface 14 is a first surface of the first lens. Surface 15 is a second surface of the first lens. Surface 16 is a first surface of the second lens. Surface 17 is a second surface of the second lens. Surface 18 is a first surface of the third lens. Surface 19 is a second surface of the third lens. Surface 20 is the aperture. Surface 21 is a first surface of the fourth lens. Surface 22 is a second surface of the fourth lens. Surface 23 is a first surface of the fifth lens. Surface 24 is a second surface of the fifth lens. Surface 25 is a first surface of the cover glass. Surface 26 is a second surface of the cover glass.

It should be noted that surface 1, surface 2, surface 3, surface 5, surface 7, surface 8, surface 9, surface 11, and surface 12 are virtual surfaces for setting decenter and/or spacing. In addition, the first surface and the second surface of each of the lenses and the cover glass are opposite surfaces one of which functions as an incident surface for light and the other of which functions as an emission surface for light.

Of these surfaces, shape data items on surface 4, surface 10, and surface 13, each of which has a shape of a free-form surface, are shown in Table 3, Table 4, and Table 5, respectively. In each of the tables, terms with no combinations are each shown with a diagonal line. Moreover, there are no terms where an exponent of y is five or greater and where an exponent of x is six or greater. Therefore, tables for these terms are omitted. This holds true for the other tables.

TABLE 3 s4 free-form surface coefficient (Working example 1)

|          | $x^0$         | $x^1$        | $x^2$         | $x^3$        | $x^4$         | $x^5$        |
|----------|---------------|--------------|---------------|--------------|---------------|--------------|
| $y^0$    |               | 0.00000E+00  | −1.27203E−01  | 0.00000E+00  | 5.57049E−04   | 0.00000E+00  |
| $y^1$    | 0.00000E+00   | 0.00000E+00  | 0.00000E+00   | 0.00000E+00  | 0.00000E+00   | 0.00000E+00  |
| $y^2$    | 3.31013E−01   | 0.00000E+00  | −1.21083E−02  | 0.00000E+00  | 8.04922E−04   | 0.00000E+00  |
| $y^3$    | 0.00000E+00   | 0.00000E+00  | 0.00000E+00   | 0.00000E+00  | 0.00000E+00   | 0.00000E+00  |
| $y^4$    | −1.73538E−02  | 0.00000E+00  | 2.06341E−04   | 0.00000E+00  | 0.00000E+00   | 0.00000E+00  |
| $y^5$    | 0.00000E+00   | 0.00000E+00  | 0.00000E+00   | 0.00000E+00  | 0.00000E+00   | 0.00000E+00  |
| $y^6$    | 3.86766E−04   | 0.00000E+00  | 0.00000E+00   | 0.00000E+00  | 0.00000E+00   |              |
| $y^7$    | 0.00000E+00   | 0.00000E+00  | 0.00000E+00   | 0.00000E+00  |               |              |
| $y^8$    | 0.00000E+00   | 0.00000E+00  | 0.00000E+00   |              |               |              |
| $y^9$    | 0.00000E+00   | 0.00000E+00  |               |              |               |              |
| $y^{10}$ | 0.00000E+00   |              |               |              |               |              |

|       | $x^6$         | $x^7$        | $x^8$        | $x^9$        | $x^{10}$     |
|-------|---------------|--------------|--------------|--------------|--------------|
| $y^0$ | −5.00000E−04  | 0.00000E+00  | 0.00000E+00  | 0.00000E+00  | 0.00000E+00  |
| $y^1$ | 0.00000E+00   | 0.00000E+00  | 0.00000E+00  | 0.00000E+00  |              |
| $y^2$ | 0.00000E+00   | 0.00000E+00  | 0.00000E+00  |              |              |
| $y^3$ | 0.00000E+00   | 0.00000E+00  |              |              |              |
| $y^4$ | 0.00000E+00   |              |              |              |              |

TABLE 4 s10 free-form surface coefficient (Working example 1)

|          | $x^0$         | $x^1$        | $x^2$         | $x^3$        | $x^4$         | $x^5$        |
|----------|---------------|--------------|---------------|--------------|---------------|--------------|
| $y^0$    |               | 0.00000E+00  | −9.85484E−02  | 0.00000E+00  | −4.54611E−03  | 0.00000E+00  |
| $y^1$    | 0.00000E+00   | 0.00000E+00  | 0.00000E+00   | 0.00000E+00  | 0.00000E+00   | 0.00000E+00  |
| $y^2$    | −1.45441E−01  | 0.00000E+00  | −3.56076E−03  | 0.00000E+00  | 9.66777E−05   | 0.00000E+00  |
| $y^3$    | 0.00000E+00   | 0.00000E+00  | 0.00000E+00   | 0.00000E+00  | 0.00000E+00   | 0.00000E+00  |
| $y^4$    | −4.76945E−04  | 0.00000E+00  | −3.65566E−05  | 0.00000E+00  | 0.00000E+00   | 0.00000E+00  |
| $y^5$    | 0.00000E+00   | 0.00000E+00  | 0.00000E+00   | 0.00000E+00  | 0.00000E+00   | 0.00000E+00  |
| $y^6$    | −2.88923E−05  | 0.00000E+00  | 0.00000E+00   | 0.00000E+00  | 0.00000E+00   |              |
| $y^7$    | 0.00000E+00   | 0.00000E+00  | 0.00000E+00   | 0.00000E+00  |               |              |
| $y^8$    | 0.00000E+00   | 0.00000E+00  | 0.00000E+00   |              |               |              |
| $y^9$    | 0.00000E+00   | 0.00000E+00  |               |              |               |              |
| $y^{10}$ | 0.00000E+00   |              |               |              |               |              |

TABLE 4-continued s10 free-form surface coefficient (Working example 1)

| | $x^6$ | $x^7$ | $x^8$ | $x^9$ | $x^{10}$ |
|---|---|---|---|---|---|
| $y^0$ | 8.97249E−05 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

TABLE 5 s13 free-form surface coefficient (Working example 1)

| | $x^0$ | $x^1$ | $x^2$ | $x^3$ | $x^4$ | $x^5$ |
|---|---|---|---|---|---|---|
| $y^0$ | | 0.00000E+00 | 3.03205E−01 | 0.00000E+00 | 3.54519E−02 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | 2.45521E−01 | 0.00000E+00 | −5.70483E−02 | 0.00000E+00 | −3.81554E−04 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | −1.65859E−02 | 0.00000E+00 | 6.98672E−03 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | 1.31335E−03 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |

| | $x^6$ | $x^7$ | $x^8$ | $x^9$ | $x^{10}$ |
|---|---|---|---|---|---|
| $y^0$ | 2.96051E−03 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

Working Example 2

Data on principal surfaces of an optical system according to Working Example 2 are shown in Table 6.

TABLE 6

| ex2 | Surface number | Surface type | Y curvature radius | Conic constant | Spacing | nd | vd | Type | X | Y | Z | α | β | γ |
|---|---|---|---|---|---|---|---|---|---|---|---|---|---|---|
| Object | | | | | 1.1000 | 1.40000 | 50.00 | | | | | | | |
| | 1 | | ∞ | | 0.5000 | 1.50000 | 50.00 | Normal | 0.000 | 0.000 | 0.000 | 75.00 | 0.00 | 0.00 |
| | 2 | | ∞ | | 3.4000 | | | | | | | | | |
| | 3 | | ∞ | | 0.0000 | | | Normal | 0.000 | 0.000 | 0.000 | −75.00 | 0.00 | 0.00 |
| | 4 | Free-form | 15.3350 | 0.0000 | 4.8082 | 1.53996 | 59.46 | Decenter and return | 0.000 | −10.000 | 10.000 | 45.00 | 0.00 | 0.00 |
| | 5 | | ∞ | | 0.0000 | 1.53996 | 59.46 | Normal | 0.000 | 0.000 | 0.000 | 0.00 | −45.00 | 0.00 |
| Reflection | 6 | | ∞ | | 0.0000 | 1.53996 | 59.46 | Decenter and return | 0.000 | 0.000 | 0.000 | 0.00 | 0.00 | 0.00 |
| | 7 | | ∞ | | 0.0000 | 1.53996 | 59.46 | Normal | 0.000 | 0.000 | 0.000 | 0.00 | −45.00 | 0.00 |
| | 8 | | ∞ | | −6.0000 | 1.53996 | 59.46 | | | | | | | |
| | 9 | | ∞ | | 0.0000 | 1.53996 | 59.46 | Normal | 0.000 | 0.000 | 0.000 | 0.00 | 0.00 | 0.00 |
| Reflection | 10 | Free-form | 2.6025 | −0.8992 | 0.0000 | 1.53996 | 59.46 | Decenter and return | 0.000 | 3.961 | 0.000 | 0.00 | 0.00 | 0.00 |
| | 11 | | ∞ | | 0.0000 | 1.53996 | 59.46 | Normal | 0.000 | 0.000 | 0.000 | 0.00 | 0.00 | 0.00 |
| | 12 | | ∞ | | 6.0000 | 1.53996 | 59.46 | | | | | | | |
| | 13 | Free-form | 1.6633 | 0.0000 | 0.1763 | | | Normal | 0.000 | 5.393 | 0.000 | 0.00 | 0.00 | 0.00 |
| | 14 | | 6.9281 | | 1.5288 | 1.98613 | 16.48 | | | | | | | |
| | 15 | | 3.1992 | | 0.1117 | | | | | | | | | |
| | 16 | | 3.4561 | | 1.2556 | 1.80420 | 46.50 | | | | | | | |
| | 17 | | −2.6640 | | 0.1000 | | | | | | | | | |
| | 18 | | 2.9492 | | 0.9373 | 1.95375 | 32.32 | | | | | | | |
| | 19 | | 47.3943 | | 0.1037 | | | | | | | | | |

TABLE 6-continued

| ex2 | Surface number | Surface type | Y curvature radius | Conic constant | Spacing | nd | vd | Type | Decentering data | | | | | |
|---|---|---|---|---|---|---|---|---|---|---|---|---|---|---|
| | | | | | | | | | X | Y | Z | α | β | γ |
| Aperture | 20 | | ∞ | | 0.1297 | | | | | | | | | |
| | 21 | | −5.1387 | | 0.5000 | 1.98613 | 16.48 | | | | | | | |
| | 22 | | 22.5343 | | 1.5509 | | | | | | | | | |
| | 23 | | 12.4331 | | 1.2546 | 1.80420 | 46.50 | | | | | | | |
| | 24 | | −16.9155 | | 1.4513 | | | | | | | | | |
| | 25 | | ∞ | | 0.9000 | | | Normal | 0.000 | −0.730 | 0.000 | 0.00 | 0.00 | 0.00 |
| Image | 26 | | ∞ | | 0.0000 | | | | | | | | | |

The aperture diameter is 0.6 mm. A minimum value and a maximum value of the size of an image formed in first rectangular region 10 are shown in Table 7.

TABLE 7

| | | min | max |
|---|---|---|---|
| Image | y | −2.680 | 0.000 |
| | x | −0.758 | 0.758 |

The optical system according to Working Example 2 includes, as lenses 30, a first lens, a second lens, a third lens, a fourth lens, and a fifth lens from its magnification side to its reduction side in the stated order. Between the third lens and the fourth lens, an aperture is disposed.

In Working Example 2, the first lens is in a negative meniscus shape that is convex toward first rectangular region 10. The second lens is in a double-convex shape. The third lens is in a double-convex shape. The fourth lens is in a double-concave shape. The fifth lens is in a double-convex shape.

As shown in Table 6, in Working Example 2, surface 4 is first transmissive surface 41. Surface 6 is first reflective surface 42. Surface 10 is second reflective surface 43. Surface 13 is second transmissive surface 44. Surface 14 is a first surface of the first lens. Surface 15 is a second surface of the first lens. Surface 16 is a first surface of the second lens. Surface 17 is a second surface of the second lens. Surface 18 is a first surface of the third lens. Surface 19 is a second surface of the third lens. Surface 20 is the aperture. Surface 21 is a first surface of the fourth lens. Surface 22 is a second surface of the fourth lens. Surface 23 is a first surface of the fifth lens. Surface 24 is a second surface of the fifth lens. It should be noted that surface 1, surface 2, surface 3, surface 5, surface 7, surface 8, surface 9, surface 11, surface 12, and surface 25 are virtual surfaces for setting decenter and/or spacing.

Of these surfaces, shape data items on surface 4, surface 10, and surface 13, each of which has a shape of a free-form surface, are shown in Table 8, Table 9, and Table 10, respectively.

TABLE 8 s4 free-form surface coefficient (Working example 1)

| | $x^0$ | $x^1$ | $x^2$ | $x^3$ | $x^4$ | $x^5$ |
|---|---|---|---|---|---|---|
| $y^0$ | | 0.00000E+00 | −1.31856E−01 | 0.00000E+00 | −3.13758E−03 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | −4.17143E−02 | 0.00000E+00 | 1.24457E−03 | 0.00000E+00 | 5.35745E−05 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | 1.51304E−04 | 0.00000E+00 | −8.47970E−06 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | −5.72276E−07 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |

| | $x^6$ | $x^7$ | $x^8$ | $x^9$ | $x^{10}$ |
|---|---|---|---|---|---|
| $y^0$ | −2.61229E−04 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

TABLE 9 s10 free-form surface coefficient (Working example 2)

| | $x^0$ | $x^1$ | $x^2$ | $x^3$ | $x^4$ | $x^5$ |
|---|---|---|---|---|---|---|
| $y^0$ | | 0.00000E+00 | −4.58811E−02 | 0.00000E+00 | −6.09623E−03 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | −1.09982E−01 | 0.00000E+00 | −3.14708E−03 | 0.00000E+00 | 2.348995E−04 | 0.00000E+00 |

TABLE 9-continued s10 free-form surface coefficient (Working example 2)

| | $x^0$ (implicit) | | | | | |
|---|---|---|---|---|---|---|
| $y^3$ | 0.00000E+00 | 0.00000E+00 | 0.00000E+00 | 0.00000E+00 | 0.00000E+00 | 0.00000E+00 |
| $y^4$ | 8.47765E-05 | 0.00000E+00 | 3.82494E-06 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | -2.13004E-05 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |

| | $x^6$ | $x^7$ | $x^8$ | $x^9$ | $x^{10}$ |
|---|---|---|---|---|---|
| $y^0$ | 3.60036E-04 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

TABLE 10 s13 free-form surface coefficient (Working example 2)

| | $x^0$ | $x^1$ | $x^2$ | $x^3$ | $x^4$ | $x^5$ |
|---|---|---|---|---|---|---|
| $y^0$ | | 0.00000E+00 | -5.91757E-02 | 0.00000E+00 | -6.81345E-02 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | -2.33635E-01 | 0.00000E+00 | -7.20633E-02 | 0.00000E+00 | 4.02786E-03 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | -1.40504E-02 | 0.00000E+00 | 4.80897E-03 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | 3.02311E-03 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |

| | $x^6$ | $x^7$ | $x^8$ | $x^9$ | $x^{10}$ |
|---|---|---|---|---|---|
| $y^0$ | 3.02520E-02 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

Working Example 3

Data on principal surfaces of an optical system according to Working Example 3 are shown in Table 11.

TABLE 11

| ex3 | Surface number | Surface type | Y curvature radius | Conic constant | Spacing | nd | vd | Decentering data Type | X | Y | Z | α | β | γ |
|---|---|---|---|---|---|---|---|---|---|---|---|---|---|---|
| Object | | | | | 1.1000 | 1.40000 | 50.00 | | | | | | | |
| | 1 | | ∞ | | 0.5000 | 1.50000 | 50.00 | Normal | 0.000 | 0.000 | 0.000 | 75.00 | 0.00 | 0.00 |
| | 2 | | ∞ | | 3.4000 | | | | | | | | | |
| | 3 | | ∞ | | 0.0000 | | | Normal | 0.000 | 0.000 | 0.000 | 75.00 | 0.00 | 0.00 |
| | 4 | Free-form | 9.9183 | 0.0000 | 4.8906 | 1.53113 | 55.75 | Decenter and return | 0.000 | -5.649 | 7.100 | 90.00 | 0.00 | 0.00 |
| | 5 | | ∞ | | 0.0000 | 1.53113 | 55.75 | Normal | 0.000 | 0.000 | 0.000 | 0.00 | -45.00 | 0.00 |
| Reflection | 6 | | ∞ | | 0.0000 | 1.53113 | 55.75 | Decenter and return | | | | | | |
| | 7 | | ∞ | | 0.0000 | 1.53113 | 55.75 | Normal | 0.000 | 0.000 | 0.000 | 0.00 | -45.00 | 0.00 |
| | 8 | | ∞ | | -2.9285 | 1.53113 | 55.75 | | | | | | | |
| | 9 | | ∞ | | 0.0000 | 1.53113 | 55.75 | Normal | 0.000 | 0.000 | 0.000 | 0.00 | 0.00 | 0.00 |
| Reflection | 10 | Free-form | 1.7213 | -0.9807 | 0.0000 | 1.53113 | 55.75 | Decenter and return | 0.000 | 0.452 | 0.000 | 0.00 | 0.00 | 0.00 |
| | 11 | | ∞ | | 0.0000 | 1.53113 | 55.75 | Normal | 0.000 | 0.000 | 0.000 | 0.00 | 0.00 | 0.00 |
| | 12 | | ∞ | | 5.1279 | 1.53113 | 55.75 | | | | | | | |
| | 13 | Free-form | 1.5580 | 0.0000 | 0.1000 | | | Normal | 0.000 | 0.980 | 0.000 | 0.00 | 0.00 | 0.00 |
| | 14 | | 6.3203 | | 0.9012 | 1.84670 | 23.78 | | | | | | | |
| | 15 | | 2.2517 | | 0.1183 | | | | | | | | | |

TABLE 11-continued

| ex3 | Surface number | Surface type | Y curvature radius | Conic constant | Spacing | nd | vd | Decentering data Type | X | Y | Z | α | β | γ |
|---|---|---|---|---|---|---|---|---|---|---|---|---|---|---|
| | 16 | | 2.4029 | | 0.9685 | 1.59841 | 61.52 | | | | | | | |
| | 17 | | −2.3321 | | 0.1000 | | | | | | | | | |
| | 18 | | 3.3294 | | 0.6109 | 1.72910 | 54.67 | | | | | | | |
| | 19 | | −5.3532 | | 0.1000 | | | | | | | | | |
| Aperture | 20 | | ∞ | | 0.1449 | | | | | | | | | |
| | 21 | | −3.3080 | | 0.3000 | 1.84670 | 23.78 | | | | | | | |
| | 22 | | −14.5188 | | 1.6663 | | | | | | | | | |
| | 23 | | 14.4908 | | 1.0358 | 1.72920 | 54.67 | | | | | | | |
| | 24 | | −11.7456 | | 0.8548 | | | | | | | | | |
| | 25 | | ∞ | | 0.9000 | | | Normal | 0.000 | −0.551 | 0.000 | 0.00 | 0.00 | 0.00 |
| Image | 26 | | | | | | | | | | | | | |

The aperture diameter is 0.6 mm. A minimum value and a maximum value of the size of an image formed in first rectangular region 10 are shown in Table 12.

TABLE 12

| | | min | max |
|---|---|---|---|
| Image | y | −2.680 | 0.000 |
| | x | −0.758 | 0.758 |

The optical system according to Working Example 3 includes, as lenses 30, a first lens, a second lens, a third lens, a fourth lens, and a fifth lens from its magnification side to its reduction side in the stated order. Between the third lens and the fourth lens, an aperture is disposed.

In Working Example 3, the first lens is in a negative meniscus shape that is convex toward first rectangular region 10. The second lens is in a double-convex shape. The third lens is in a double-convex shape. The fourth lens is in a negative meniscus shape that is convex toward first rectangular region 10. The fifth lens is in a double-convex shape.

As shown in Table 11, in Working Example 3, surface 4 is first transmissive surface 41. Surface 6 is first reflective surface 42. Surface 10 is second reflective surface 43. Surface 13 is second transmissive surface 44. Surface 14 is a first surface of the first lens. Surface 15 is a second surface of the first lens. Surface 16 is a first surface of the second lens. Surface 17 is a second surface of the second lens. Surface 18 is a first surface of the third lens. Surface 19 is a second surface of the third lens. Surface 20 is the aperture. Surface 21 is a first surface of the fourth lens. Surface 22 is a second surface of the fourth lens. Surface 23 is a first surface of the fifth lens. Surface 24 is a second surface of the fifth lens. It should be noted that surface 1, surface 2, surface 3, surface 5, surface 7, surface 8, surface 9, surface 11, surface 12, and surface 25 are virtual surfaces for setting decenter and/or spacing.

Of these surfaces, shape data items on surface 4, surface 10, and surface 13, each of which has a shape of a free-form surface, are shown in Table 13, Table 14, and Table 15, respectively.

TABLE 13

| s4 free-form surface coefficient (Working example 3) | | | | | | |
|---|---|---|---|---|---|---|
| | $x^0$ | $x^1$ | $x^2$ | $x^3$ | $x^4$ | $x^5$ |
| $y^0$ | | 0.00000E+00 | −1.30787E−01 | 0.00000E+00 | −1.34662E−03 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | 9.33704E−02 | 0.00000E+00 | 5.44212E−03 | 0.00000E+00 | 1.08426E−03 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | −2.46034E−03 | 0.00000E+00 | −4.25943E−04 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | 8.81801E−05 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |
| | $x^6$ | $x^7$ | $x^8$ | $x^9$ | $x^{10}$ | |
| $y^0$ | −1.61314E−03 | 0.00000E+00 | 0.00000E+00 | 0.00000E+00 | 0.00000E+00 | |
| $y^1$ | 0.00000E+00 | 0.00000E+00 | 0.00000E+00 | 0.00000E+00 | | |
| $y^2$ | 0.00000E+00 | 0.00000E+00 | 0.00000E+00 | | | |
| $y^3$ | 0.00000E+00 | 0.00000E+00 | | | | |
| $y^4$ | 0.00000E+00 | | | | | |

TABLE 14 s10 free-form surface coefficient (Working example 3)

| | $x^0$ | $x^1$ | $x^2$ | $x^3$ | $x^4$ | $x^5$ |
|---|---|---|---|---|---|---|
| $y^0$ | | 0.00000E+00 | −8.31592E−02 | 0.00000E+00 | −7.27459E−03 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | −1.50479E−01 | 0.00000E+00 | −3.44476E−03 | 0.00000E+00 | 1.91746E−04 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | 1.49470E−03 | 0.00000E+00 | −5.13801E−05 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | −9.59063E−05 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |

| | $x^6$ | $x^7$ | $x^8$ | $x^9$ | $x^{10}$ |
|---|---|---|---|---|---|
| $y^0$ | 1.12549E−03 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

TABLE 15 s13 free-form surface coefficient (Working example 3)

| | $x^0$ | $x^1$ | $x^2$ | $x^3$ | $x^4$ | $x^5$ |
|---|---|---|---|---|---|---|
| $y^0$ | | 0.00000E+00 | −3.57315E−01 | 0.00000E+00 | −1.73904E−02 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | −4.38301E−01 | 0.00000E+00 | −3.09876E−02 | 0.00000E+00 | 7.42567E−03 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | −6.24071E−03 | 0.00000E+00 | −5.44288E−03 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | −3.87051E−03 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |

| | $x^6$ | $x^7$ | $x^8$ | $x^9$ | $x^{10}$ |
|---|---|---|---|---|---|
| $y^0$ | −1.90917E−03 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

Working Example 4

Data on principal surfaces of an optical system according to Working Example 4 are shown in Table 16.

TABLE 16

| ex4 | Surface number | Surface type | Y curvature radius | Conic constant | Spacing | nd | vd | Decentering data | | | | | | |
|---|---|---|---|---|---|---|---|---|---|---|---|---|---|---|
| | | | | | | | | Type | X | Y | Z | α | β | γ |
| Object | | | | | 1.6000 | 1.40000 | 50.00 | | | | | | | |
| | 1 | | ∞ | | 0.5000 | 1.50000 | 50.00 | Normal | 0.000 | 0.000 | 0.000 | 75.00 | 0.00 | 0.00 |
| | 2 | | ∞ | | 2.5000 | | | | | | | | | |
| | 3 | | ∞ | | 0.0000 | | | Normal | 0.000 | 0.000 | 0.000 | −75.00 | 0.00 | 0.00 |
| | 4 | Free-form | 8.0798 | 0.0000 | 7.1115 | 1.53113 | 55.75 | Decenter and return | 0.000 | −2.830 | 8.000 | 90.00 | 0.00 | 0.00 |
| | 5 | | ∞ | | 0.0000 | 1.53113 | 55.75 | Normal | 0.000 | 0.000 | 0.000 | 45.00 | 0.00 | 0.00 |
| Reflection | 6 | | ∞ | | 0.0000 | 1.53113 | 55.75 | | | | | | | |
| | 7 | | ∞ | | 0.0000 | 1.53113 | 55.75 | Normal | 0.000 | 0.000 | 0.000 | 45.00 | 0.00 | 0.00 |
| | 8 | | ∞ | | −1.6047 | 1.53113 | 55.75 | | | | | | | |
| | 9 | | ∞ | | 0.0000 | 1.53113 | 55.75 | Normal | 0.000 | 0.000 | 0.000 | 0.00 | 0.00 | 0.00 |
| Reflection | 10 | Free-form | 1.9883 | −0.9831 | 0.0000 | 1.53113 | 55.75 | Decenter and return | 0.000 | 2.711 | 0.000 | 0.00 | 0.00 | 0.00 |

TABLE 16-continued

| ex4 | Surface number | Surface type | Y curvature radius | Conic constant | Spacing | nd | vd | Decentering data Type | X | Y | Z | α | β | γ |
|---|---|---|---|---|---|---|---|---|---|---|---|---|---|---|
| | 11 | | ∞ | | 0.0000 | 1.53113 | 55.75 | Normal | 0.000 | 0.000 | 0.000 | 0.00 | 0.00 | 0.00 |
| | 12 | | ∞ | | 8.3739 | 1.53113 | 55.75 | | | | | | | |
| | 13 | Free-form | 2.6958 | 0.0000 | 0.2029 | | | Normal | 0.000 | 3.157 | 0.000 | 0.00 | 0.00 | 0.00 |
| | 14 | | −647.3464 | | 0.7132 | 1.61314 | 36.11 | | | | | | | |
| | 15 | | 3.4787 | | 0.3742 | | | | | | | | | |
| | 16 | | 7.1911 | | 2.1987 | 1.48853 | 70.23 | | | | | | | |
| | 17 | | −3.3963 | | 0.1000 | | | | | | | | | |
| | 18 | | 6.5943 | | 1.8528 | 1.65390 | 58.25 | | | | | | | |
| | 19 | | −4.2171 | | 0.1000 | | | | | | | | | |
| Aperture | 20 | | ∞ | | 0.2255 | | | | | | | | | |
| | 21 | | −4.2680 | | 0.3000 | 1.84670 | 23.78 | | | | | | | |
| | 22 | | −12.9019 | | 2.1171 | | | | | | | | | |
| | 23 | | ∞ | | −0.8000 | | | Normal | 0.000 | 0.000 | 0.000 | 90.00 | 0.00 | 0.00 |
| Reflection | 24 | | ∞ | | 0.0000 | | | | | | | | | |
| | 25 | | ∞ | | 0.0000 | | | Normal | 0.000 | 0.000 | 0.000 | 90.00 | 0.00 | 0.00 |
| | 26 | | ∞ | | −2.0000 | | | | | | | | | |
| | 27 | | −10.5722 | | −2.1711 | 1.8042 | 162.1 | Normal | 0.000 | 0.800 | 0.000 | 0.000 | 0.000 | 0.000 |
| | 28 | | −38.54779 | | −0.4839 | | | | | | | | | |
| | 29 | | −11.00941 | | −0.6469 | −1.487 | 359.5 | | | | | | | |
| | 30 | | −8.451013 | | −1.5497 | | | | | | | | | |
| | 31 | | | | −1.2 | | | Normal | 0.000 | −2.454 | 0.000 | 0.000 | 0.000 | 0.000 |
| Image | 32 | | | | 0 | | | | | | | | | |

The aperture diameter is 0.65 mm. A minimum value and a maximum value of the size of an image formed in first rectangular region 10 are shown in Table 17.

TABLE 17

| Image | | min | max |
|---|---|---|---|
| | y | −2.680 | 0.000 |
| | x | −0.758 | 0.758 |

The optical system according to Working Example 4 includes, as lenses 30, a first lens, a second lens, a third lens, a fourth lens, a fifth lens, and a sixth lens from its magnification side to its reduction side in the stated order. Between the third lens and the fourth lens, an aperture is disposed. Between the fourth lens and the fifth lens, a reflecting mirror is disposed.

In Working Example 4, the first lens is in a double-concave shape. The second lens is in a double-convex shape. The third lens is in a double-convex shape. The fourth lens is in a negative meniscus shape that is convex toward first rectangular region 10. The fifth lens is in a negative meniscus shape that is convex toward first rectangular region 10. The sixth lens is in a positive meniscus shape that is convex toward first rectangular region 10.

As shown in Table 16, in Working Example 4, surface 4 is first transmissive surface 41. Surface 6 is first reflective surface 42. Surface 10 is second reflective surface 43. Surface 13 is second transmissive surface 44. Surface 14 is a first surface of the first lens. Surface 15 is a second surface of the first lens. Surface 16 is a first surface of the second lens. Surface 17 is a second surface of the second lens. Surface 18 is a first surface of the third lens. Surface 19 is a second surface of the third lens. Surface 20 is the aperture. Surface 21 is a first surface of the fourth lens. Surface 22 is a second surface of the fourth lens. Surface 27 is a first surface of the fifth lens. Surface 28 is a second surface of the fifth lens. Surface 29 is a first surface of the sixth lens. Surface 30 is a second surface of the sixth lens. It should be noted that surface 1, surface 2, surface 3, surface 5, surface 7, surface 8, surface 9, surface 11, surface 12, surface 23, surface 24, surface 25, and surface 26 are virtual surfaces for setting decenter and/or spacing.

Of these surfaces, shape data items on surface 4, surface 10, and surface 13, each of which has a shape of a free-form surface, are shown in Table 18, Table 19, and Table 20, respectively.

TABLE 18

| s4 free-form surface coefficient (Working example 4) | | | | | | |
|---|---|---|---|---|---|---|
| | $x^0$ | $x^1$ | $x^2$ | $x^3$ | $x^4$ | $x^5$ |
| $y^0$ | | 0.00000E+00 | −1.06816E−01 | 0.00000E+00 | 8.75698E−04 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | 1.32359E−01 | 0.00000E+00 | 3.91439E−03 | 0.00000E+00 | 1.48066E−03 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | −3.49053E−03 | 0.00000E+00 | −5.63042E−04 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | 1.46736E−04 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |

TABLE 18-continued s4 free-form surface coefficient (Working example 4)

| | $x^6$ | $x^7$ | $x^8$ | $x^9$ | $x^{10}$ |
|---|---|---|---|---|---|
| $y^0$ | −2.28999E−03 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

TABLE 19 s10 free-form surface coefficient (Working example 4)

| | $x^0$ | $x^1$ | $x^2$ | $x^3$ | $x^4$ | $x^5$ |
|---|---|---|---|---|---|---|
| $y^0$ | | 0.00000E+00 | −1.00694E−01 | 0.00000E+00 | −6.29149E−03 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | −1.66724E−01 | 0.00000E+00 | −2.80403E−03 | 0.00000E+00 | 3.01412E−05 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | 1.37439E−03 | 0.00000E+00 | −7.86160E−05 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | −8.45705E−05 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |

| | $x^6$ | $x^7$ | $x^8$ | $x^9$ | $x^{10}$ |
|---|---|---|---|---|---|
| $y^0$ | 1.10492E−03 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

TABLE 20 s13 free-form surface coefficient (Working example 4)

| | $x^0$ | $x^1$ | $x^2$ | $x^3$ | $x^4$ | $x^5$ |
|---|---|---|---|---|---|---|
| $y^0$ | | 0.00000E+00 | −3.42035E−01 | 0.00000E+00 | −1.46450E−02 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | −4.20101E−01 | 0.00000E+00 | −2.33570E−02 | 0.00000E+00 | 8.47914E−03 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | −5.08836E−03 | 0.00000E+00 | −4.59742E−03 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | −3.56393E−03 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |

| | $x^6$ | $x^7$ | $x^8$ | $x^9$ | $x^{10}$ |
|---|---|---|---|---|---|
| $y^0$ | −3.12177E−03 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

Working Example 5

Data on principal surfaces of an optical system according to Working Example 5 are shown in Table 21.

TABLE 21

| ex5 | Surface number | Surface type | Y curvature radius | Conic constant | Spacing | nd | vd | Decentering data Type | X | Y | Z | α | β | γ |
|---|---|---|---|---|---|---|---|---|---|---|---|---|---|---|
| Object | | | | | 1.6000 | 1.40000 | 50.00 | | | | | | | |
| | 1 | | ∞ | | 0.5000 | 1.50000 | 50.00 | Normal | 0.000 | 0.000 | 0.000 | 90.000 | 0.000 | 0.000 |
| | 2 | | ∞ | | 10.5000 | | | | | | | | | |
| | 3 | | ∞ | | 0.0000 | | | Normal | 0.000 | 0.000 | 0.000 | −90.000 | 0.000 | 0.000 |
| | 4 | | 9.0201 | | 6.5276 | 1.53113 | 55.75 | | | | | | | |
| | 5 | | ∞ | | 0.0000 | 1.53113 | 55.75 | Normal | 0.000 | 0.000 | 0.000 | 45.000 | 0.000 | 0.000 |
| Reflection | 6 | | ∞ | | 0.000 | 1.53113 | 55.75 | | | | | | | |
| | 7 | | ∞ | | 0.0000 | 1.53113 | 55.75 | Normal | 0.000 | 0.000 | 0.000 | 45.000 | 0.000 | 0.000 |
| | 8 | | ∞ | | −7.3377 | 1.53113 | 55.75 | | | | | | | |
| | 9 | | ∞ | | 0.0000 | 1.53113 | 55.75 | Normal | 0.000 | 0.000 | 0.000 | 0.000 | 0.000 | 0.000 |
| Reflection | 10 | Free-form | 7.3227 | 0.0000 | 0.0000 | 1.53113 | 55.75 | | | | | | | |
| | 11 | | ∞ | | 0.0000 | 1.53113 | 55.75 | Normal | 0.000 | 0.000 | 0.000 | 0.000 | 0.000 | 0.000 |
| | 12 | | ∞ | | 9.6356 | 1.53113 | 55.75 | | | | | | | |
| | 13 | Free-form | 5.3640 | 0.0000 | 1.0901 | | | | | | | | | |
| | 14 | | −24.6445 | | 0.6013 | 1.82558 | 31.15 | | | | | | | |
| | 15 | | 4.8000 | | 0.8773 | | | | | | | | | |
| | 16 | | −43.8914 | | 2.0308 | 1.81498 | 30.34 | | | | | | | |
| | 17 | | −5.9294 | | 1.7996 | | | | | | | | | |
| | 18 | | −44.0398 | | 1.7123 | 1.49552 | 69.47 | | | | | | | |
| | 19 | | −4.8180 | | 0.5884 | | | | | | | | | |
| | 20 | | 5.5918 | | 1.6027 | 1.76237 | 50.53 | | | | | | | |
| | 21 | | −9.7562 | | 0.1000 | | | | | | | | | |
| Aperture | 22 | | ∞ | | 0.1203 | | | | | | | | | |
| | 23 | | −6.3563 | | 1.0000 | 1.82620 | 24.32 | | | | | | | |
| | 24 | | 6.7941 | | 1.5061 | | | | | | | | | |
| | 25 | | 6.0880 | | 2.5825 | 1.65679 | 58.10 | | | | | | | |
| | 26 | | −10.3892 | | 1.5710 | | | | | | | | | |
| | 27 | Aspheric | 7.5543 | 0.0000 | 2.0525 | 1.53113 | 55.75 | | | | | | | |
| | 28 | Aspheric | −5.1019 | 0.0000 | 0.1169 | | | | | | | | | |
| | 29 | | ∞ | | 1.0000 | | | Normal | 0 | −1.49687 | 0 | 0 | 0 | 0 |
| Image | 30 | | | | 0.0000 | | | | | | | | | |

The aperture diameter is 1.04 mm. A minimum value and a maximum value of the size of an image formed in first rectangular region 10 are shown in Table 22.

TABLE 22

| | | min | max |
|---|---|---|---|
| Image | y | −2.680 | 0.000 |
| | x | −0.758 | 0.758 |

The optical system according to Working Example 5 includes, as lenses 30, a first lens, a second lens, a third lens, a fourth lens, a fifth lens, a sixth lens, and a seventh lens from its magnification side to its reduction side in the stated order. Between the fourth lens and the fifth lens, an aperture is disposed.

In Working Example 5, the first lens is in a double-concave shape. The second lens is in a positive meniscus shape that is convex toward first rectangular region 10. The third lens is in a positive meniscus shape that is convex toward first rectangular region 10. The fourth lens is in a double-convex shape. The fifth lens is in a double-concave shape. The sixth lens is in a double-convex shape. The seventh lens is in a double-convex shape.

As shown in Table 21, in Working Example 5, surface 10 is second reflective surface 43. Surface 13 is second transmissive surface 44. Surface 14 is a first surface of the first lens. Surface 15 is a second surface of the first lens. Surface 16 is a first surface of the second lens. Surface 17 is a second surface of the second lens. Surface 18 is a first surface of the third lens. Surface 19 is a second surface of the third lens. Surface 20 is a first surface of the fourth lens. Surface 21 is a second surface of the fourth lens. Surface 22 is the aperture. Surface 23 is a first surface of the fifth lens. Surface 24 is a second surface of the fifth lens. Surface 25 is a first surface of the sixth lens. Surface 26 is a second surface of the sixth lens. Surface 27 is a first surface of the seventh lens. Surface 28 is a second surface of the seventh lens. It should be noted that surface 1, surface 2, surface 3, surface 4, surface 5, surface 6, surface 7, surface 8, surface 9, surface 11, surface 12, and surface 29 are virtual surfaces for setting decenter and/or spacing.

Of these surfaces, shape data items on surface 10 and surface 13, each of which has a shape of a free-form surface, are shown in Table 23 and Table 24, respectively. That is to say, in the present working example, only two surfaces have a shape of a free-form surface.

TABLE 23 s10 free-form surface coefficient (Working example 5)

| | $x^0$ | $x^1$ | $x^2$ | $x^3$ | $x^4$ | $x^5$ |
|---|---|---|---|---|---|---|
| $y^0$ | | 0.00000E+00 | 1.09596E−02 | 0.00000E+00 | 8.35975E−04 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | −1.02659E−03 | 0.00000E+00 | 7.36436E−04 | 0.00000E+00 | −2.21748E−04 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | 6.11852E−04 | 0.00000E+00 | −9.52163E−05 | 0.00000E+00 | 9.10694E−06 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | −4.09755E−05 | 0.00000E+00 | 3.04680E−06 | 0.00000E+00 | −1.24830E−07 | |
| $y^7$ | 0.00000E+00 | 0.00000E+00 | 0.00000E+00 | 0.00000E+00 | | |
| $y^8$ | 8.85136E−07 | 0.00000E+00 | −4.50608E−08 | | | |
| $y^9$ | 0.00000E+00 | 0.00000E+00 | | | | |
| $y^{10}$ | −9.83259E−09 | | | | | |

| | $x^6$ | $x^7$ | $x^8$ | $x^9$ | $x^{10}$ |
|---|---|---|---|---|---|
| $y^0$ | −2.35816E−04 | 0.00000E+00 | 8.75659E−06 | 0.00000E+00 | 0.00000E+00 |
| $y^1$ | 0.00000E+00 | 0.00000E+00 | 0.00000E+00 | 0.00000E+00 | |
| $y^2$ | 3.44281E−05 | 0.00000E+00 | −1.07423E−06 | | |
| $y^3$ | 0.00000E+00 | 0.00000E+00 | | | |
| $y^4$ | −8.07750E−07 | | | | |

TABLE 24 s13 free-form surface coefficient (Working example 5)

| | $x^0$ | $x^1$ | $x^2$ | $x^3$ | $x^4$ | $x^5$ |
|---|---|---|---|---|---|---|
| $y^0$ | | 0.00000E+00 | 9.50547E−02 | 0.00000E+00 | −1.976076−02 | 0.00000E+00 |
| $y^1$ | 0.00000E+00 | 0.00000E+00 | 0.00000E+00 | 0.00000E+00 | 0.00000E+00 | 0.00000E+00 |
| $y^2$ | 3.09512E−02 | 0.00000E+00 | −2.80964E−02 | 0.00000E+00 | 1.24734E−03 | 0.00000E+00 |
| $y^3$ | 0.00000E+00 | 0.00000E+00 | 0.00000E+00 | 0.00000E+00 | 0.00000E+00 | 0.00000E+00 |
| $y^4$ | −1.40885E−02 | 0.00000E+00 | 1.87230E−03 | 0.00000E+00 | 0.00000E+00 | 0.00000E+00 |
| $y^5$ | 0.00000E+00 | 0.00000E+00 | 0.00000E+00 | 0.00000E+00 | 0.00000E+00 | 0.00000E+00 |
| $y^6$ | 4.30495E−04 | 0.00000E+00 | 0.00000E+00 | 0.00000E+00 | 0.00000E+00 | |
| $y^7$ | 0.00000E+00 | 0.00000E+00 | 0.00000E+00 | 0.00000E+00 | | |
| $y^8$ | 0.00000E+00 | 0.00000E+00 | 0.00000E+00 | | | |
| $y^9$ | 0.00000E+00 | 0.00000E+00 | | | | |
| $y^{10}$ | 0.00000E+00 | | | | | |

| | $x^6$ | $x^7$ | $x^8$ | $x^9$ | $x^{10}$ |
|---|---|---|---|---|---|
| $y^0$ | 1.56554E−03 | 0.00000E+00 | 0.00000E+00 | 0.00000E+00 | 0.00000E+00 |
| $y^1$ | 0.00000E+00 | 0.00000E+00 | 0.00000E+00 | 0.00000E+00 | |
| $y^2$ | 0.00000E+00 | 0.00000E+00 | 0.00000E+00 | | |
| $y^3$ | 0.00000E+00 | 0.00000E+00 | | | |
| $y^4$ | 0.00000E+00 | | | | |

In the present working example, as shown in Table 21, surfaces 27 and 28 are aspheric surfaces. Surfaces 27 and 28 are each an incident surface or an emission surface of one of lenses 30. Shape data items on surface 27 and surface 28 each having an aspheric surface shape are shown in Table 25.

TABLE 25

| Surface number | 27 | 28 |
|---|---|---|
| 4-th order coefficient (A) | −1.53380E−02 | 3.75689E−03 |
| 6-th order coefficient (B) | 0.00000E+00 | 0.00000E+00 |
| 8-th order coefficient (C) | 0.00000E+00 | 0.00000E+00 |
| 10-th order coefficient (D) | 0.00000E+00 | 0.00000E+00 |

The shapes of the aspheric surfaces are defined by the following equation.

$$z = \frac{cr^2}{1 + \sqrt{1 - (1+k)c^2 r^2}} + Ar^4 + Br^6 + Cr^8 + Dr^{10} \quad \text{[Math. 2]}$$

Here, z is a sag of a surface parallel to the z-axis. r is a distance in a radial direction, namely, a square root of $(x^2+y^2)$. c is a curvature at an apex of the surface. k is a conic constant. A, B, C, and D are coefficients of the 4-th order, 6-th order, 8-th order, and 10-th order of r, respectively.

Various Parameters

Various parameters of the optical systems according to Working Example 1 to Working Example 5 are shown in Table 26. The various parameters are parameters relating to condition (a) to condition (k) described in the embodiment. It should be noted that Young's moduli E1 and E2 relating to condition (f) have no relation with optical properties and thus are omitted.

TABLE 26

|  | Working example 1 | Working example 2 | Working example 3 | Working example 4 | Working example 5 |
|---|---|---|---|---|---|
| ωo | 78.128 | 78.4574 | 75.9404 | 76.8266 | 76.0613 |
| ωi | 14.888 | 12.7354 | 14.7878 | 12.5807 | 15.7541 |
| H1o | 11.848 | 14.0519 | 15.1432 | 13.1294 | 16.2124 |
| H1i | 9.178 | 11.3827 | 11.9131 | 7.40704 | 13.7088 |
| H2o | 15.859 | 15.0307 | 15.0297 | 16.2059 | 15.0487 |
| H2I | 2.896 | 3.87148 | 2.66994 | 3.89727 | 5.85448 |
| Vo | 20.012 | 20.0074 | 20.0086 | 20 | 20.8099 |
| Vi | 3.768 | 3.60413 | 4.12031 | 2.22492 | 4.65517 |
| L2 | 2.688 | 2.688 | 2.688 | 2.688 | 2.688 |
| L1 | 1.516 | 1.516 | 1.516 | 1.516 | 1.516 |
| d | 0.50 | 0.73 | 0.55 | 2.45 | 1.50 |
| D | 2.688 | 2.688 | 2.688 | 2.688 | 2.688 |
| X | 6.784 | 6.91762 | 7 | 0 | 0 |
| Y | 6.980 | 9.85538 | 5.18062 | 5.47707 | 9.62445 |
| Z | 10.000 | 10 | 10 | 31.7329 | 36.4371 |
| i4 | 74.612 | 74.4594 | 81.4209 | 32.8057 | 27.8905 |
| i3 | 70.848 | 70.5294 | 74.426 | 22.8392 | 26.2963 |
| i2 | 59.598 | 60.8225 | 63.3597 | 32.8057 | 27.8905 |
| i1 | 35.390 | 41.2545 | 31.5079 | 22.8392 | 26.2963 |
| n2 | 1.5 | 1.5 | 1.5 | 1.5 | 1.5 |
| n1 | 1.4 | 1.4 | 1.4 | 1.4 | 1.4 |
| θo | 1.436 | 1.83105 | 1.48694 | 1.13029 | 1.33684 |
| θi | 7.823 | 7.60456 | 8.73717 | 4.33394 | 1.31252 |
| Lb | 29.619 | 30.1535 | 29.5378 | 36.3256 | 34.9509 |
| La | 2.879 | 3.2578 | 2.83806 | 9.71491 | 5.25482 |
| H1o/H1i · Vi/Vo | 0.243091 | 0.222382 | 0.261762 | 0.19719 | 0.264553 |
| H1o/H1i · H2i/H2o | 0.235695 | 0.317971 | 0.22581 | 0.426273 | 0.460084 |
| d/D | 0.186012 | 0.271577 | 0.204985 | 0.912946 | 0.556871 |
| X/d | 13.56722 | 9.476192 | 12.70417 | 0 | 0 |
| Y/d | 13.96048 | 13.50052 | 9.402214 | 2.231895 | 6.429717 |
| Z/d | 20 | 13.69863 | 18.14882 | 12.93109 | 24.34219 |
| θo/θi | 0.183594 | 0.240783 | 0.170186 | 0.2608 | 1.018529 |
| Lb/La | 10.28902 | 9.255786 | 10.40774 | 3.73916 | 6.651208 |

(MTF Properties)

Here, modulation transfer function (MTF) properties of the optical systems according to Working Example 1 to Working Example 5 will be described.

FIG. 20 to FIG. 24 are graphs illustrating the modulation transfer function (MTF) properties of the optical systems according to Working Example 1 to Working Example 5. In each figure, its horizontal axis indicates defocus value (unit: mm), and its vertical axis indicates contrast ratio. In each figure, graphs with broken lines represent MTF properties in the x-axis direction. Graphs with solid lines represent MTF properties in the y-axis direction. The MTF properties were obtained with a spatial frequency of 60/mm. Each figure illustrates four graphs (f1, f2, f3, and f4) for image heights in each of the x-axis direction and the y-axis direction. The image heights are given as positions in first rectangular region 10. Specific values of x of f1 to f4 are as shown in Table 27.

TABLE 27

|  | x | y |
|---|---|---|
| f1 | 0.000 | 0.000 |
| f2 | 0.000 | −2.688 |
| f3 | 0.758 | 0.000 |
| f4 | 0.758 | −2.688 |

Here, f1 is located closest to optical axis 60 of first rectangular region 10, namely, first point 101. First rectangular region 10 is given as the range of −0.758 to +0.758 in terms of x coordinate and the range of 0 to −0.2688 in terms of y coordinate. First rectangular region 10 has a symmetrical relation between a negative direction and a positive direction of the x-axis. Therefore, the MTF properties only within a range of positive x coordinates are shown.

From the MTF properties shown in the figures, it is found that differences in peak of contrast ratio among the image heights are made small in the working examples. In other words, it is found that curvature of field of the optical system according to each working example can be made small.

[Imaging Device]

Figure 25:
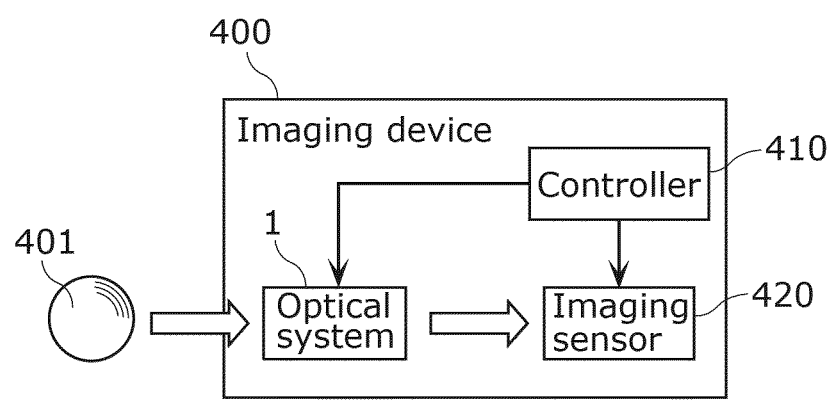
FIG. 25 is a block diagram illustrating an example of an imaging device that includes the optical system according to the embodiment.

Subsequently, a specific example of application of optical system 1 according to the above embodiment will be described. First, an imaging device including optical system 1 will be described with reference to FIG. 25. FIG. 25 is a block diagram illustrating an example of imaging device 400 that includes optical system 1 according to the present embodiment.

Imaging device 400 illustrated in FIG. 25 images subject 401. Imaging device 400 includes optical system 1, controller 410, and imaging sensor 420.

Controller 410 controls the entire imaging device 400 and constituent elements such as imaging sensor 420. Controller 410 is, for example, a central processing unit (CPU) or a microprocessor. Controller 410 includes one or more memories and one or more input-output ports. For example, controller 410 includes, for example, a nonvolatile memory on which a control program and the like are recorded and a volatile memory that is a program working area.

Imaging sensor 420 is a charge coupled device (CCD) image sensor or a complementary metal oxide semiconductor (CMOS) image sensor. An imaging surface of imaging sensor 420 is disposed on first rectangular region 10. Imaging sensor 420 receives light incident on first rectangular region 10 via optical system 1 and converts the light into electrical image signal.

Accordingly, since the size of optical system 1 is reduced as described above, the size of imaging device 400 can be also reduced.

Imaging device 400 is used as a contact sensor that detects contact of subject 401 with transparent body 50 of optical system 1, a tactile sensor, a fingerprint sensor, a sensing camera, or the like. The application makes imaging device 400 also applicable to a robot hand.

Alternatively, the application of imaging device 400 is not limited to tactile-sensor applications, and imaging device 400 can be used in a road surface sensor that detects a road surface condition. For example, imaging device 400 is applicable to an automated driving vehicle. In this case, optical system 1 of imaging device 400 need not include transparent body 50.

[Image-Projecting Device]

Figure 26:
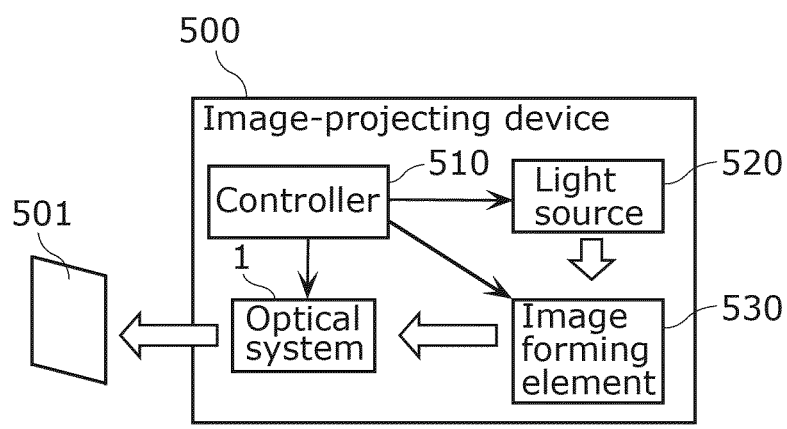
FIG. 26 is a block diagram illustrating an example of an image-projecting device that includes the optical system according to the embodiment.

Next, an image-projecting device including optical system 1 will be described with reference to FIG. 26. FIG. 26 is a block diagram illustrating an example of image-projecting device 500 that includes optical system 1 according to the present embodiment.

Image-projecting device 500 illustrated in FIG. 26 projects an image (or a video) on screen 501. Image-projecting device 500 includes optical system 1, controller 510, light source 520, and image forming element 530.

Controller 510 controls the entire image-projecting device 500 and constituent elements such as light source 520 and image forming element 530. Controller 510 is, for example, a CPU or a microprocessor. Controller 510 includes one or more memories and one or more input-output ports. For example, controller 510 includes, for example, a nonvolatile memory on which a control program and the like are recorded and a volatile memory that is a program working area.

Light source 520 includes a solid light emitting device such as a light emitting device (LED) or a laser device. Light source 520 includes, for example, a fluorescent material and generates and outputs a desired visible light (e.g., RGB light).

Image forming element 530 includes an optical member such as a liquid crystal device or a digital mirror device (DMD). For example, image forming element 530 is a Digital Light Processing (DLP) board including a DMD. Image forming element 530 uses visible light from light source 520 to generate an image (or a video). An image forming surface of image forming element 530 is disposed on first rectangular region 10. Image forming element 530 emits light emitted from first rectangular region 10 toward screen 501 via optical system 1.

Accordingly, since the size of optical system 1 is reduced as described above, the size of image-projecting device 500 can be also reduced.

Image-projecting device 500 is, for example, but not limited to, a projector. For example, image-projecting device 500 may be a transparent display device that performs projection using a window glass as a display surface, or a head up display.

Other Embodiments

Hereinbefore, an optical system, an imaging device, and an image-projecting device according to one or more aspects have been described based on an embodiment, but the present disclosure is not limited to this embodiment. Various modifications of the present embodiment as well as embodiments resulting from combinations of constituent elements from different embodiments that may be conceived by those skilled in the art are intended to be included within the scope of the present disclosure as long as these do not depart from the essence of the present disclosure.

For example, in the above embodiment, first reflective surface 42 need not be a flat surface. First reflective surface 42 may be, for example, in a shape of a free-form surface.

For example, first rectangular region 10 and second rectangular region 20 may be each a square. Furthermore, each of first rectangular region 10 and second rectangular region 20 need not be a rectangle in a strict meaning, and its two facing sides may be different in length or may be nonparallel. In this case, the difference in length is, for example, about several percent of the length of the sides. An angle formed by the two sides may be within the range of about ±5 degrees. Furthermore, sides of each of first rectangular region 10 and second rectangular region 20 may be nonlinear and may be curved. When a side of the sides is curved, an amount of deviation of the side from a straight line connecting two vertices is, for example, within several tens of percent of a distance between the two vertices. Furthermore, second rectangular region 20 need not be a perfectly flat surface and may be in a concave surface shape or a convex surface shape. In the case where second rectangular region 20 is not a flat surface, an amount of deviation of second rectangular region 20 from the flat surface is, for example, within several percent of the length of a line segment connecting two vertices of second rectangular region 20 (e.g., a diagonal line or a side).

For example, the first transmissive surface of the prism need not be in a shape of a free-form surface as described in Working Example 5. Furthermore, disposition of each of the principal surfaces of optical system 1 in either first space 71 or second space 72 may be adjusted as appropriate by, for example, providing an additional reflective surface. Likewise, disposition of each of the principal surfaces of optical system 1 in either third space 81 or fourth space 82 may be adjusted as appropriate by, for example, providing an additional reflective surface.

For example, optical system 1 may include, instead of prism 40, a transparent member including first transmissive surface 41, a reflecting mirror having first reflective surface 42, a reflecting mirror having second reflective surface 43, and a transparent member having second transmissive surface 44. In other words, the surfaces may be provided by separate optical components rather than by a prism as a single component.

Moreover, in each of the embodiments described above, various modifications, replacements, additions, omissions, or the like can be made within the scope of the claims or within a scope equivalent to the scope of the claims.

INDUSTRIAL APPLICABILITY

The present disclosure can be used as a small-size or low-profile optical system. For example, the present disclosure can be used as an imaging device, an image-projecting device, or the like.

The invention claimed is:

1. An optical system including a reduction conjugate point on a reduction side and a magnification conjugate point on a magnification side, the optical system comprising:
   a plurality of lenses; and
   a prism provided on the magnification side with respect to the plurality of lenses,
   wherein the prism includes:
      a first transmissive surface;
      a first reflective surface;

a second reflective surface; and
a second transmissive surface provided on the reduction side with respect to the first transmissive surface,
a first rectangular region at the reduction conjugate point:
has an imaging relationship in which the first rectangular region is conjugate to a second rectangular region at the magnification conjugate point; and
does not intersect with an optical axis that passes through centers of a largest number of lenses among the plurality of lenses,
when a space in which the optical system is disposed is divided into a first space and a second space by using, as a boundary, a first plane that is a virtual plane perpendicular to the first rectangular region and passing through the optical axis and is a virtual plane parallel to a first side whose shortest distance to the optical axis is shortest among four sides of the first rectangular region,
all principal rays passing through the first rectangular region pass through the first rectangular region, the first transmissive surface, and the first reflective surface in the first space, and pass through the second reflective surface and the second transmissive surface in the second space, and
when the space is divided into a third space and a fourth space by using, as a boundary, a second plane that is a virtual plane passing through the optical axis and perpendicular to the first plane,
all principal rays passing through the first rectangular region pass through the second rectangular region and the first transmissive surface in the third space.

2. The optical system according to claim 1,
wherein the first transmissive surface causes a principal ray passing through a first point to diverge in a direction parallel to the optical axis and converge in a direction perpendicular to the optical axis, the first point being a point located closest to the optical axis among points on the first side whose shortest distance to the optical axis is shortest among the four sides of the first rectangular region.

3. The optical system according to claim 1,
wherein the second transmissive surface causes a principal ray passing through a first point to diverge in a direction parallel to the first side and converge in a direction perpendicular to the first side, the first point being a point located closest to the optical axis among points on the first side whose shortest distance to the optical axis is shortest among the four sides of the first rectangular region.

4. The optical system according to claim 1,
wherein an effect, brought about by the second reflective surface, of converging a principal ray passing through a first point is greater in a direction parallel to the first side than in a direction perpendicular to the first side, the first point being a point located closest to the optical axis among points on the first side whose shortest distance to the optical axis is shortest among the four sides of the first rectangular region.

5. The optical system according to claim 1,
wherein the optical system has an intermediate imaging position conjugate to each of the reduction conjugate point and the magnification conjugate point, and
the intermediate imaging position is located between the second reflective surface and the second transmissive surface.

6. The optical system according to claim 1,
wherein, when (i) among points on the first side, a point located farthest from the second rectangular region is determined as a second point, (ii) among the points on the first side, a point located closest to the second rectangular region is determined as a fourth point, (iii) among points on a second side that is parallel to the first side among the four sides of the first rectangular region, a point located farthest from the second rectangular region is determined as a third point, and (iv) among the points on the second side, a point located closest to the second rectangular region is determined as a fifth point,
the optical system satisfies a condition (d) below:

$$i1 < i2 < i3 < i4 \tag{d}$$

where
i1 denotes an incident angle at which a principal ray passing through the second point is incident on the first reflective surface,
i2 denotes an incident angle at which a principal ray passing through the third point is incident on the first reflective surface,
i3 denotes an incident angle at which a principal ray passing through the fourth point is incident on the first reflective surface, and
i4 denotes an incident angle at which a principal ray passing through the fifth point is incident on the first reflective surface.

7. The optical system according to claim 1, comprising:
a transparent body that includes a first surface including the second rectangular region and a second surface,
wherein the optical system causes a principal ray to pass through the transparent body, the principal ray passing through the first rectangular region, the second surface, and the second rectangular region in stated order or reverse order.

8. The optical system according to claim 7,
wherein the transparent body includes:
a first medium including the first surface; and
a second medium including the second surface and being smaller than the first medium, the second medium being in a shape of a plate, and
the second surface is in contact with air, and
the second medium includes a surface opposed to the second surface, the surface opposed to the second surface being in contact with a surface different from the first surface of the first medium.

9. The optical system according to claim 7,
wherein, when (i) among points on a first side whose shortest distance to the optical axis is shortest among four sides of the first rectangular region, a point located closest to the optical axis is determined as a first point, and (ii) among points on a second side that is parallel to the first side among the four sides of the first rectangular region, a point located closest to the optical axis is determined as a sixth point,
the optical system satisfies a condition (g) below:

$$5 < Lb/La < 15 \tag{g}$$

where
La denotes an optical path length, in the transparent body, of a principal ray passing through the first point, and
Lb denotes an optical path length, in the transparent body, of a principal ray passing through the sixth point.

10. The optical system according to claim 7,
wherein, when a principal ray passing through the second rectangular region at a maximum angle with respect to a normal to the second rectangular region passes through the second surface, an angle between the principal ray and a normal to the second surface is less than 30 degrees.

11. The optical system according to claim 7,
wherein an angle between a plane including the second surface and a plane including the first surface is greater than 45 degrees and less than 85 degrees.

12. The optical system according to claim 1,
wherein a maximum angle of a principal ray passing through the second rectangular region is greater than 65 degrees.

13. The optical system according to claim 1,
wherein the optical system satisfies a condition (h) below:

$$L1 < L2 \tag{h}$$

where
L1 denotes a length of the first side whose shortest distance to the optical axis is shortest among the four sides of the first rectangular region, and
L2 denotes a length of a third side orthogonal to the first side among the four sides of the first rectangular region.

14. The optical system according to claim 1,
wherein the optical system satisfies a condition (i) below:

$$0.1 < d/D < 0.3 \tag{i}$$

where
d denotes a shortest distance between the optical axis and the first side whose shortest distance to the optical axis is shortest among the four sides of the first rectangular region, and
D denotes a length of a third side orthogonal to the first side among the four sides of the first rectangular region.

15. The optical system according to claim 1,
wherein, when (i) among points on the first side whose shortest distance to the optical axis is shortest among the four sides of the first rectangular region, a point located closest to the optical axis is determined as a first point, and (ii) a point included in the second rectangular region and having an imaging relationship with the first point is determined as a seventh point,
the optical system satisfies conditions (j1) and (j2) below:

$$5 < X/d < 20 \tag{j1}$$

$$5 < Y/d < 20 \tag{j2}$$

where
d denotes a shortest distance between the optical axis and the first side whose shortest distance to the optical axis is shortest among the four sides of the first rectangular region,
X denotes a distance between the first point and the seventh point in a direction parallel to the first side, and
Y denotes a distance between the first point and the seventh point in a direction orthogonal to each of the first side and the optical axis.

16. The optical system according to claim 1,
wherein the first transmissive surface is in a shape of a free-form surface,
the second transmissive surface is in a shape of a free-form surface, and
the second reflective surface is in a shape of a free-form surface.

17. An imaging device comprising:
the optical system according to claim 1; and
an imaging sensor that receives light passing through the optical system.

18. An optical contact sensor comprising:
the imaging device according to claim 17; and
a light source that emits light toward the second rectangular region,
wherein the optical contact sensor detects contact with the second rectangular region.

19. An image-projecting device comprising:
the optical system according to claim 1; and
an image forming element that projects an image on a screen via the optical system.

* * * * *